(12) United States Patent
Shigaki et al.

(10) Patent No.: US 7,977,570 B2
(45) Date of Patent: Jul. 12, 2011

(54) DYE-SENSITIZED PHOTOELECTRIC CONVERSION DEVICE

(75) Inventors: Koichiro Shigaki, Kita-ku (JP); Masayoshi Kaneko, Kita-ku (JP); Akira Maenosono, Kita-ku (JP); Takayuki Hoshi, Kita-ku (JP); Teruhisa Inoue, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 718 days.

(21) Appl. No.: 11/920,899

(22) PCT Filed: May 23, 2006

(86) PCT No.: PCT/JP2006/310246
§ 371 (c)(1),
(2), (4) Date: Nov. 21, 2007

(87) PCT Pub. No.: WO2006/126538
PCT Pub. Date: Nov. 30, 2006

(65) Prior Publication Data
US 2009/0084441 A1 Apr. 2, 2009

(30) Foreign Application Priority Data
May 24, 2005 (JP) ................................ 2005-151422

(51) Int. Cl.
*H01L 31/00* (2006.01)
*H01L 27/14* (2006.01)

(52) U.S. Cl. ........ 136/263; 136/256; 136/250; 429/111; 257/431

(58) Field of Classification Search .................. 136/263, 136/256, 250; 429/111; 257/431
See application file for complete search history.

(56) References Cited

U.S. PATENT DOCUMENTS

| | | | |
|---|---|---|---|
| 2,803,640 | A | 8/1957 | Heckert |
| 4,927,721 | A | 5/1990 | Gratzel et al. |
| 5,084,365 | A | 1/1992 | Gratzel et al. |
| 5,670,091 | A | 9/1997 | Marder et al. |
| 6,084,176 | A | 7/2000 | Shiratsuchi et al. |
| 6,291,763 | B1 | 9/2001 | Nakamura |
| 6,335,481 | B1 | 1/2002 | Watanabe |
| 6,376,765 | B1 | 4/2002 | Wariishi et al. |
| 7,141,735 | B2 | 11/2006 | Ikeda et al. |
| 7,728,222 | B2 | 6/2010 | Ikeda et al. |
| 7,851,701 | B2 | 12/2010 | Ikeda et al. |
| 2002/0010969 | A1* | 1/2002 | Goettel et al. ............ 8/405 |
| 2003/0152827 | A1 | 8/2003 | Ikeda et al. |
| 2004/0074532 | A1 | 4/2004 | Ikeda et al. |
| 2004/0099306 | A1 | 5/2004 | Hara et al. |
| 2004/0187918 | A1* | 9/2004 | Ikeda et al. ............ 136/263 |
| 2006/0130249 | A1 | 6/2006 | Ikeda et al. |
| 2007/0191455 | A1 | 8/2007 | Hiyoshi et al. |
| 2008/0067476 | A1 | 3/2008 | Shigaki et al. |
| 2008/0087327 | A1 | 4/2008 | Horiuchi et al. |

FOREIGN PATENT DOCUMENTS

| | | |
|---|---|---|
| CN | 1861740 | 11/2006 |
| EP | 0 566 077 A2 | 10/1993 |
| EP | 0 566 081 A2 | 10/1993 |
| EP | 0 566 082 A1 | 10/1993 |
| EP | 0 692 800 A2 | 1/1996 |
| EP | 0 892 411 A2 | 1/1999 |
| EP | 0 911 841 A2 | 4/1999 |
| EP | 0 924 724 A2 | 6/1999 |
| EP | 1 075 005 A2 | 2/2001 |
| EP | 1 311 001 A1 | 5/2003 |
| EP | 1 339 129 A | 8/2003 |
| EP | 1 422 782 A1 * | 5/2004 |

(Continued)

OTHER PUBLICATIONS

The International Search Report dated Sep. 5, 2006.
Chemistry Letters, p. 1241 91998); Wataru Kubo et al.; "Fabrication of Quasi-solid-state Dye-sensitized TiO2 Solar Cells Using Low Molecular Weight Gelators".
International Search Report dated Dec. 20, 2005 in co-pending U.S. Appl. No. 11/661,843.
Solar Energy Materials & Solar Cells 80 (2003) 47-71; K.Sayama et al.; "Efficient sensitization of nanocrystalline TiO2 films with cyanine and merocyanine organic dyes".

(Continued)

*Primary Examiner* — Ling-Siu Choi
(74) *Attorney, Agent, or Firm* — Nields, Lemack & Frame, LLC

(57) ABSTRACT

The invention relates to a photoelectric conversion device, using oxide semiconductor fine particles sensitized with a methine dye represented by the following formula (1) and a solar cell using the same, and a solar cell high in conversion efficiency can be obtained at low cost:

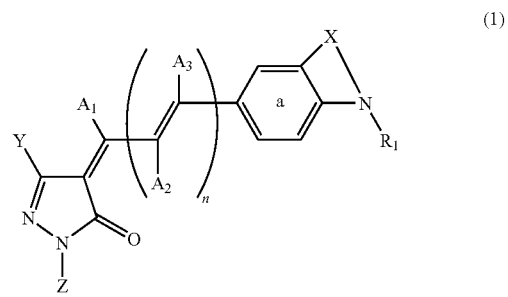

in the formula (1), n represents an integer of 0 to 7; $R_1$ represents an optionally-substituted aromatic residue or optionally-substituted aliphatic hydrocarbon residue, or an acyl group; X represents an optionally-substituted hydrocarbon residue which has 2 to 4 carbon atoms; Y represents a hydrogen atom, an optionally-substituted aromatic residue or aliphatic hydrocarbon residue, a carboxyl group or the like, and preferably represents a carboxyl group; Z represents an optionally-substituted aromatic residue or aliphatic hydrocarbon residue, or an acyl group; $A_1$, $A_2$ and $A_3$ each independently represent a hydrogen atom, an optionally-substituted aromatic residue or aliphatic hydrocarbon residue or the like, and preferably represent a hydrogen atom; and a benzene ring a may have substituent(s) other than those shown in the above formula.

19 Claims, No Drawings

FOREIGN PATENT DOCUMENTS

| | | |
|---|---|---|
| EP | 1 628 356 A1 | 2/2006 |
| JP | 48-3115 | 1/1973 |
| JP | 8-81222 A | 3/1996 |
| JP | 2664194 B2 | 6/1997 |
| JP | 11-67285 A | 3/1999 |
| JP | 11-158395 | 6/1999 |
| JP | 11-163378 | 6/1999 |
| JP | 11-176489 | 7/1999 |
| JP | 11-214731 A | 8/1999 |
| JP | 2000-26487 A | 1/2000 |
| JP | 2000-195569 | 7/2000 |
| JP | 2000-223167 | 8/2000 |
| JP | 2000-268892 A | 9/2000 |
| JP | 2000-285977 | 10/2000 |
| JP | 2000-285978 | 10/2000 |
| JP | 2001-042524 | 2/2001 |
| JP | 2001-52766 A | 2/2001 |
| JP | 2001-064529 | 3/2001 |
| JP | 2002-164089 A | 6/2002 |
| JP | 2003-59547 * | 2/2003 |
| JP | 2004-22222 A | 1/2004 |
| JP | 2004-146421 A | 5/2004 |
| JP | 2004-207224 | 7/2004 |
| JP | 2004-227825 A | 8/2004 |
| JP | 2005-5026 A | 1/2005 |
| JP | 2005-11800 A | 1/2005 |
| JP | 2005-19251 A | 1/2005 |
| JP | 2005-123013 A | 5/2005 |
| JP | 2005-129329 | 5/2005 |
| JP | 2005-129429 | 5/2005 |
| JP | 2005-129430 | 5/2005 |
| JP | 2005-209682 A | 8/2005 |
| JP | 2005-227376 A | 8/2005 |
| JP | 2006-93284 A | 4/2006 |
| JP | 2006-156212 A | 6/2006 |
| JP | 2006-188582 | 7/2006 |
| JP | 2006-190534 | 7/2006 |
| WO | 02/11213 A1 | 2/2002 |
| WO | 2004/011555 A1 | 2/2004 |
| WO | 2004/082061 A1 | 9/2004 |
| WO | 2005/077956 A1 | 8/2005 |
| WO | 2006/028087 A1 | 3/2006 |

OTHER PUBLICATIONS

Supplemental European Search Report dated May 25, 2009 in co-pending foreign application (EP05782209).
Office Action dated Jun. 21, 2010 in co-pending U.S. Appl. No. 11/661,843.
International Search Report dated Sep. 19, 2006 in co-pending U.S. Appl. No. 11/922,062.
Office Action dated Jun. 21, 2010 in co-pending U.S. Appl. No. 11/922,062.
J. Mater. Chem, 2000, 10, 1-25; Yasuhiko Shirota, "Organic Materials for Electronic and Optoelectronic Devices".
J. Am. Chem. Soc. 2006, 128, p. 16701-16707; Sanghoon Kim et al.; "Molecular Engineering of Organic Sensitizers for Solar Cell Applications".
Thin Solid Films 438-439 (2003) p. 147-152; Keiichi Miyairi et al.; "Photovoltaic properties of double layer devices consisting of titanium dioxide and prophyrin dispersed hole transporting material layer".
Chem Commun., 2004, p. 68-69; Sanghoon Kim et al.; "The role of borole in a fully conjugated electron-rich system".
International Search Report dated Sep. 17, 2002 in a co-pending foreign application.
International Search Report dated May 25, 2004 in a co-pending foreign application.
Supplementary European Search Report dated Feb. 13, 2006 in a co-pending foreign application.
Supplementary European Search Report dated Feb. 21, 2007 in a co-pending foreign application.
International Search Report dated May 22, 2007 in a co-pending foreign application.
International Search Report dated Jun. 4, 2002 in a co-pending foreign application.
European Communication dated Jun. 7, 2010 in a co-pending foreign application.
Office Action dated Sep. 17, 2009 in co-pending U.S. Appl. No. 10/548,858.
Office Action dated May 25, 2010 in co-pending U.S. Appl. No. 10/548,858.
Office Action dated May 7, 2010 in co-pending U.S. Appl. No. 12/224,350.
Final Rejection dated Jan. 25, 2011 in co-pending U.S. Appl. No. 12/224,350.
European communication dated Aug. 4, 2010 in co-pending foreign application (EP06757302.2).
Office Action dated Oct. 13, 2010 in co-pending U.S. Appl. No. 11/922,062.
Office Action dated Oct. 7, 2010 in co-pending U.S. Appl. No. 11/661,843.
Final Rejection dated Mar. 16, 2011 in co-pending U.S. Appl. No. 11/661,843.
Final Rejection dated Mar. 15, 2011 in co-pending U.S. Appl. No. 11/922,062.

* cited by examiner

DYE-SENSITIZED PHOTOELECTRIC CONVERSION DEVICE

TECHNICAL FIELD

The present invention relates to a photoelectric conversion device sensitized with an organic dye, and a solar cell, specifically, a photoelectric conversion device characterized by using oxide semiconductor fine particles sensitized with a methine dye having a specific skeleton, and a solar cell using the same.

BACKGROUND ART

Attention has been paid to solar cells using sunshine as an energy resource alternative to fossil fuels such as petroleum and coal. At present, silicon solar cells using crystalline or amorphous silicon, solar cells using a compound semiconductor using gallium, arsenic or the like, or other solar cells are actively developed and investigated about an improvement in the efficiency thereof, and others. However, they have a problem that it is difficult to be widely used since the energy and costs necessary for the production thereof are high. Moreover, photoelectric conversion devices using semiconductor fine particles sensitized with a dye, or solar cells using the same are also known, and materials or producing techniques for producing the same are disclosed (see, Patent Document 1, and Non-Patent Documents 1 and 2). The photoelectric conversion devices are each produced by use of a relatively inexpensive oxide semiconductor such as titanium oxide; thus, there is a possibility that photoelectric conversion devices for which costs are lower than those required for conventional solar cells using silicon or the like are obtained. Moreover, colorful solar cells are obtained. For these reasons, these devices are in the spotlight. However, in order to yield devices high in conversion efficiency, a ruthenium based complex is used as a sensitizing dye. Costs of the dye itself are high, and further problems remain also in the supply thereof. Attempts wherein an organic dye is used as a sensitizing dye have already been made; however, in the present situation, such attempts are not made into practical use since the conversion efficiency, the stability and the durability thereof are low. Thus, a further improvement in the conversion efficiency is desired (see Patent Document 2). So far, an example wherein a methine dye is used to form a photoelectric conversion device has been given. In particular, about coumarin dyes (see Patent Document 3) and melocyanine dyes, examples wherein they are investigated are given in relatively many cases (see Patent Documents 4, 5, 6 and 7), and it has been desired to make costs therefor lower and improve the stability and the conversion efficiency thereof.

Patent Document 1: Japanese Patent No. 2664194
Patent Document 2: WO 2002011213
Patent Document 3: Japanese Patent Application Laid-open No. 2002-164089
Patent Document 4: Japanese Patent Application Laid-open No. 8-81222
Patent Document 5: Japanese Patent Application Laid-open No. 11-214731
Patent Document 6: Japanese Patent Application Laid-open No. 2001-52766
Patent Document 7: Japanese Patent Application Laid-open No. 2003-59547
Non-Patent Document 1: B. O'Regan and M. Graetzel, Nature, vol. 353, p. 737 (1991)
Non-Patent Document 2: M. K. Nazeeruddin, A. Kay, I. Rodicio, R. Humphry-Baker, E. Muller, P. Liska, N. Vlachopoulos, M. Graetzel, J. Am. Chem. Soc., vol. 115, p. 6382 (1993)
Non-Patent Document 3: W. Kubo, K. Murakoshi, T. Kitamura, K. Hanabusa, H. Shirai, and S. Yanagida, Chem. Lett., p. 1241 (1998)

DISCLOSURE OF THE INVENTION

Problems to be Solved by the Invention

About photoelectric conversion devices using a semiconductor sensitized with an organic dye, it has been desired to develop a photoelectric conversion device wherein an inexpensive organic dye is used and stability, high conversion efficiency and high practicability are exhibited.

Means for Solving the Problems

In order to solve the above-mentioned problems, the inventors have made eager efforts, so as to find out that a photoelectric conversion device stable and high in conversion efficiency is obtained by the formation of the photoelectric conversion device by sensitizing semiconductor fine particles by use of a methine dye having a specific structure. Thus, the present invention has been made.

Accordingly, the invention relates to:

(1) A photoelectric conversion device, using oxide semiconductor fine particles sensitized with a methine dye represented by the following formula (1):

[KA 1]

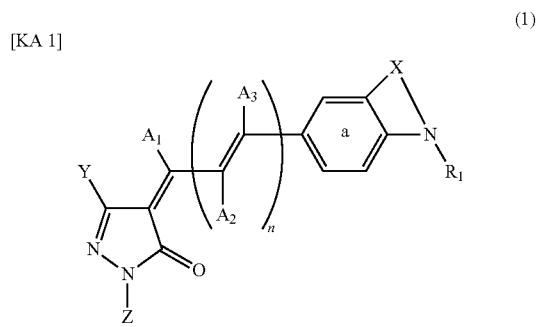

(1)

wherein n represents an integer of 0 to 7; $R_1$ represents an optionally-substituted aromatic residue, an optionally-substituted aliphatic hydrocarbon residue, or an acyl group; X is a linking group which is combined with a nitrogen atom bonded to a benzene ring a to form a heteroring, and represents an optionally-substituted, saturated or unsaturated hydrocarbon residue which has 2 to 4 carbon atoms; Y represents a hydrogen atom, an optionally-substituted aromatic residue, an optionally-substituted aliphatic hydrocarbon residue, a carboxyl group, a phosphoric acid group, a sulfonic acid group, a cyano group, an amide group, or an alkoxycarbonyl group; Z represents an optionally-substituted aromatic residue, an optionally-substituted aliphatic hydrocarbon residue, or an acyl group; $A_1$, $A_2$ and $A_3$ each independently represent an optionally-substituted aromatic residue, an optionally-substituted aliphatic hydrocarbon residue, a hydroxyl group, a phosphoric acid group, a cyano group, a hydrogen atom, a halogen atom, a carboxyl group, a carbonamide group, an alkoxycarbonyl group, an arylcarbonyl group, or an acyl group, provided that when n is 2 or more and plural $A_2$s and $A_3$s are present, each of $A_2$s and $A_3$s may be identical to or different from each other, and when n is a value other than 0, plurals selected from $A_1$ and/or $A_2$ (s) and/or $A_3$ (s) may form an optionally-substituted ring and further they may be combined with the benzene ring a to form an optionally-substituted ring; the benzene ring a is bonded to the carbon atom to which $A_3$ is bonded, and the benzene ring a may have, as substituent(s) other than X and the nitrogen atom shown in the formula (1), 1 to 3 substituents selected from a group consisting of: halogen atoms; amide, hydroxyl, cyano, nitro, alkoxyl, acyl, and substituted or unsubstituted amino groups; and optionally-substituted aliphatic hydrocarbon residues and optionally-substituted aromatic residues, provided that when plural substituents are present, these substituents may be bonded with each other or may be bonded to $A_1$, $A_2(s)$ and $A_3(s)$, thereby forming an optionally-substituted ring.

(2) The photoelectric conversion device according to item 1, wherein Z in the methine dye represented by the formula (1) is an optionally-substituted aromatic residue.

(3) The photoelectric conversion device according to item (2), wherein the methine dye represented by the formula (1) is a methine dye represented by the following formula (2):

[KA 2]

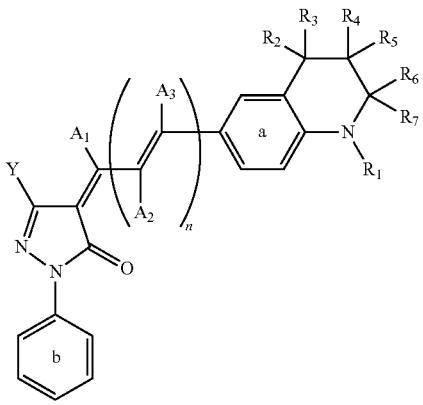

(2)

wherein n, $R_1$, Y, $A_1$, $A_2(s)$, $A_3(s)$, and the benzene ring a are the same as in the formula (1); $R_2$ to $R_7$ each independently represent a hydrogen atom, an optionally-substituted aromatic residue, an optionally-substituted aliphatic hydrocarbon residue, or a halogen atom, or $R_2$ to $R_7$ may be bonded to each other to form an optionally-substituted ring; a benzene ring b may have 1 to 5 substituents selected from a group consisting of: halogenatoms; amide, hydroxyl, cyano, nitro, sulfonic acid, carboxyl, phosphoric acid, alkoxyl, acyl, and substituted or unsubstituted amino groups; optionally-substituted aliphatic hydrocarbon residues and optionally-substituted aromatic residues; provided that when plural substituents are present, these substituents may be bonded to each other to form an optionally-substituted ring.

(4) The photoelectric conversion device according to item (3), wherein the methine dye represented by the formula (2) is a methine dye represented by the following formula (3).

[KA 3]

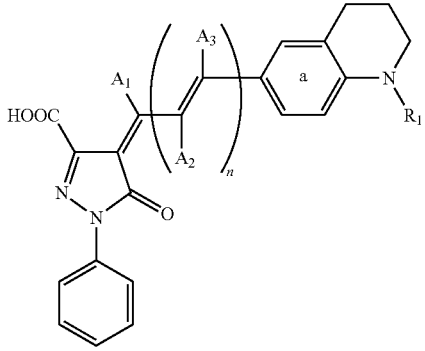

(3)

wherein n, $R_1$, $A_1$, $A_2(s)$, $A_3(s)$ and a benzene ring a are each the same as in the formula (1).

(5) The photoelectric conversion device according to any one of items (1) to (4), wherein n in the formulae (1) to (3) is from 0 to 6.

(6) The photoelectric conversion device according to any one of items (1) to (5), wherein $R_1$ in the formulae (1) to (3) is an optionally-substituted aliphatic hydrocarbon residue.

(7) The photoelectric conversion device according to item (6), wherein the optionally-substituted aliphatic hydrocarbon residue is an optionally-substituted aliphatic hydrocarbon residue having 5 to 36 carbon atoms.

(8) The photoelectric conversion device according to any one of items (1) to (5), wherein $R_1$ in the formulae (1) to (3) is an optionally-substituted aromatic hydrocarbon residue.

(9) The photoelectric conversion device according to item (8), wherein the optionally-substituted aromatic hydrocarbon residue is an aromatic hydrocarbon residue which has, as a substituent, an aliphatic hydrocarbon residue having 1 to 36 carbon atoms.

(10) A photoelectric conversion device, comprising oxide semiconductor fine particles sensitized with one or more methine dyes each represented by the formula (1), and a metal complex and/or an organic dye having a structure other than the formula (1).

(11) The photoelectric conversion device according to any one of items (1) to (10), wherein the oxide semiconductor fine particles comprise titanium dioxide, zinc oxide or tin oxide.

(12) The photoelectric conversion device according to any one of items (1) to (11), wherein the oxide semiconductor fine particles sensitized with the methine dye represented by the formula (1) are a product wherein the methine dye represented by the formula (1) is carried on oxide semiconductor fine particles in the presence of an inclusion compound.

(13) The photoelectric conversion device according to any one of items (1) to (12), wherein the oxide semiconductor fine particles sensitized with the methine dye are a product wherein the dye is carried on a thin film of oxide semiconductor fine particles.

(14) A solar cell, comprising the photoelectric conversion device according to any one of items (1) to (13).

(15) A methine dye represented by the formula (1).

(16) The methine dye according to item (15), wherein the methine dye represented by the formula (1) is a methine dye represented by the formula (2).

(17) The methine dye according to item (16), wherein the methine dye represented by the formula (2) is a methine dye represented by the formula (3).

(18) A photoelectric conversion device, wherein a methine dye represented by the formula (1) is carried on a semiconductor thin film surface of an oxide semiconductor thin film electrode.

(19) The photoelectric conversion device according to item 1, wherein in the formula (1), n is from 0 to 6; $R_1$ is an aliphatic hydrocarbon residue having 5 to 36 carbon atoms, a phenyl group having, as a substituent, a hydrocarbon residue having 1 to 36 carbon atoms, or an aromatic hydrocarbon residue of 9 to 14 carbon atoms, comprising two or three 5-membered or 6-membered rings comprising an aromatic ring (preferably, a benzene ring), the residue may contain one nitrogen atom in the rings and may be substituted with an alkyl group having 1 to 8 carbon atoms as a substituent; X is —$CH_2CH_2$— or —$(CH_2)_3$—, cyclopentane-1,2-di-yl, or benzene-1,2-di-yl; Y is a carboxyl group; Z is a phenyl group; $A_1$, $A_2(s)$ and $A_3(s)$ are each a hydrogen atom, or $A_1$ and $A_3$ are bonded to each other or adjacent ones out of $A_2$s or adjacent ones out of $A_3$s are bonded to each other to become a linking group having 2 to 3 carbon atoms or a linking group of an aliphatic chain having 2 carbon atoms and an oxygen atom, thereby forming a single 5- to 6-membered ring (which may have a methyl group as a substituent) and the remaining $A_1$, $A_2(s)$ and $A_3(s)$ are each a hydrogen atom, or $A_2$ and the next A₃ but the adjacent A₃ are bonded to each other to become a linking group consisting of one heteroatom selected from a group consisting of sulfur, nitrogen and oxygen atoms, thereby forming a 5-membered ring, and the number of the 5-membered ring is one to three, and the remaining $A_1$, $A_2(s)$ and $A_3(s)$ are each a hydrogen atom; and the benzene ring a does not have any other substituent than X and nitrogen atom described in the formula (1).

(20) The photoelectric conversion device according to item (19), wherein n is from 0 to 4; $R_1$ is an alkyl group having 6 to 18 carbon atoms, a phenyl group having a hydrocarbon residue having 1 to 8 carbon atoms as a substituent, carbazole-2-yl (being bonded to the nitrogen atom at the 2-position) having a hydrocarbon residue having 1 to 8 carbon atoms as a substituent on its nitrogen atom, fluorene-2-yl which may have a 9,9-dimethyl substituent; and $A_1$, $A_2(s)$ and $A_3(s)$ are each a hydrogen atom, or $A_2$ and the next $A_3$ but the adjacent $A_3$ are bonded to each other to become a linking group comprising a sulfur atom, thereby forming a single thiophene ring, and the remaining $A_1$, $A_2(s)$ and $A_3(s)$ are each a hydrogen atom.

(21) The photoelectric conversion device according to item (19), wherein n is from 0 to 2; $R_1$ is an alkyl group having 6 to 18 carbon atoms, a phenyl group having an alkyl group having 1 to 8 carbon atoms as a substituent, fluorene-2-yl (being bonded to the nitrogen atom at the 2-position) which may have a 9,9-dimethyl substituent; X is —CH₂CH₂— or —(CH₂)₃—; and $A_1$, $A_2(s)$ and $A_3(s)$ are each a hydrogen atom, or $A_2$ and the next $A_3$ but the adjacent $A_3$ are bonded to each other to become a linking group comprising a sulfur atom, thereby forming a single thiophene ring, and the remaining $A_1$, $A_2(s)$ and $A_3(s)$ are each a hydrogen atom.

(22) A new aldehyde represented by the following formula (1a):

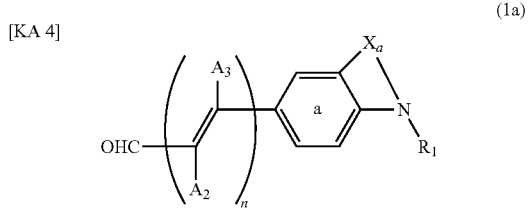

wherein n is an integer of 0 to 2; $X_a$ is —CH₂CH₂— or —(CH₂)₃—; $R_1$ is an alkyl group having 6 to 18 carbon atoms, or a fluorene-2-yl group which may have a 9,9-dimethyl substituent; $A_2(s)$ and $A_3(s)$ are each a hydrogen atom, or when n is 2 and the first $A_2$ and the last $A_3$ are bonded to each other to become a linking group comprising a sulfur atom provided that a thiophene ring is formed, the remaining $A_2$ and $A_3$ each represent a hydrogen atom; and a benzene ring a does not have any other substituent than $X_a$ and the nitrogen atom shown in the formula (1a).

Effect of the Invention

By use of the photoelectric conversion device of the invention, which comprises oxide semiconductor fine particles sensitized by carrying a methine dye of the formula (1), a solar cell having a high photoelectric conversion efficiency and a good stability can be obtained. Moreover, the photoelectric conversion efficiency can be further improved by sensitizing the oxide semiconductor fine particles by use of the methine dye essential for the invention together with a dye other than this dye. The methine dye of the formula (1) used in the invention is a new compound, and is a useful compound for the preparation of a dye-sensitized photoelectric conversion device, or the like.

BEST MODE FOR CARRYING OUT THE INVENTION

The present invention will be described in detail hereinafter. In the photoelectric conversion device of the invention, there is used an oxide semiconductor sensitized with a new methine dye represented by the following formula (1):

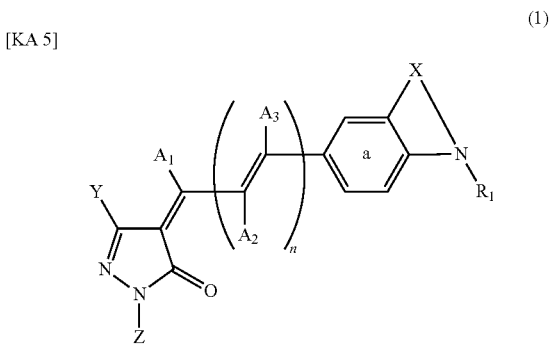

In the formula (1), n represents an integer of 0 to 7. n is preferably from 0 to 6, more preferably from 0 to 4. n is most preferably from 0 to 2 in some cases.

In the formula (1), $R_1$ represents an optionally-substituted aromatic residue, an optionally-substituted aliphatic hydrocarbon residue, or an acyl group, and is preferably an optionally-substituted aromatic residue, or an optionally-substituted aliphatic hydrocarbon residue. $R_1$ is more preferably a group selected from a group consisting of: a phenyl group which may have, as a substituent, a hydrocarbon residue having 1 to 36 carbon atoms; aromatic hydrocarbon residues which have 9 to 14 carbon atoms and comprise two or three 5-membered or 6-membered rings comprising an aromatic ring (preferably, a benzene ring), one nitrogen atom being allowable to be contained in the rings and the rings being allowable to be substituted with an alkyl group having 1 to 8 carbon atoms as a substituent; and aliphatic hydrocarbon residues having 5 to 36 carbon atoms.

In the above description, the aromatic residue in the "optionally-substituted aromatic residue" means a group obtained by removing one hydrogen atom from an aromatic ring. Examples of the aromatic ring include aromatic hydrocarbon rings such as benzene, naphthalene, anthracene, phenanthrene, pyrene, perylene, and terrylene; heterocyclic aromatic rings such as indene, azulene, pyridine, pyrazine, pyrimidine, pyrazole, pyrazolidine, thiazolidine, oxazolidine, pyran, chromene, pyrrole, pyrrolidine, benzimidazole, imidazoline, imidazolidine, imidazole, pyrazole, triazole, triazine, diazole, indoline, thiophene, thienothiophene, furan, oxazole, oxadiazole, thiazine, thiazole, indole, benzothiazole, benzothiadiazole, naphthothiazole, benzoxazole, naphthoxazole, indolenine, benzoindolenine, pyrazine, quinoline, and quinazoline; and condensation type aromatic rings such as fluorene, and carbazole. The aromatic residue is preferably an aromatic residue having an aromatic ring (an aromatic ring or a condensed ring which contains an aromatic ring) having 5 to 6 carbon atoms. Specific preferred examples thereof include a benzene ring; and heterocyclic type or condensation type aromatic rings comprised of two or three rings out of the above-exemplified aromatic rings. In the case of the benzene ring, the ring may be unsubstituted. The benzene ring is preferably a benzene ring having thereon a hydrocarbon residue, preferably an aliphatic hydrocarbon residue, having 1 to 36 carbon atoms, as a substituent. The optionally-substituted aromatic residue is preferably an aromatic group corresponding to each of the above-mentioned preferred aromatic rings. An example thereof is a phenyl group which may have, as a substituent, a hydrocarbon residue having 1 to 36 carbon atoms; or an aromatic hydrocarbon residue which has 9 to 14 carbon atoms and comprises two or three 5-membered or 6-membered rings comprising an aromatic ring (preferably, a benzene ring), one nitrogen atom being allowable to be contained in the rings and the rings being allowable to be substituted with an alkyl group having 1 to 8 carbon atoms as a substituent.

Preferred examples of the above-mentioned phenyl group include a phenyl group having, as a substituent, hydrocarbon residues which are aliphatic hydrocarbon residues having 1 to 36 carbon atoms, and more preferably, saturated or unsaturated, linear or branched chain, aliphatic hydrocarbon residues having 1 to 18 carbon atoms. As the case may be, preferred is a phenyl group substituted by an alkyl group having 1 to 8 carbon atoms or 1 to 4 carbon atoms from the viewpoint of easiness of the production thereof, the stability thereof, and others.

The above-mentioned aromatic hydrocarbon residue having 9 to 14 carbon atoms is preferably fluorene-2-yl which may have a 9,9-dimethyl substituent, carbazole having, on its nitrogen atom, an alkyl substituent having 1 to 8 carbon atoms, or the like.

In the above description, the aliphatic hydrocarbon residue in the "optionally-substituted aliphatic hydrocarbon residue" may be a saturated or unsaturated, linear or branched chain alkyl group or a cyclic alkyl group. The residue is preferably a saturated or unsaturated, linear or branched chain alkyl group having 1 to 36 carbon atoms, more preferably a saturated or unsaturated, linear or branched chain alkyl group having 6 to 18 carbon atoms. The cyclic alkyl group is, for example, a cycloalkyl having 3 to 8 carbon atoms. Specific examples thereof include methyl, ethyl, n-propyl, iso-propyl, n-butyl, iso-butyl, ter-butyl, octyl, ocatadecyl, cyclopropyl, cyclohexyl, vinyl, propenyl, pentenyl, butenyl, hexenyl, hexadienyl, isopropenyl, isohexenyl, cyclohexenyl, cyclopentadienyl, ethynyl, propynyl, pentynyl, hexynyl, isohexynyl, and cyclohexynyl groups.

$R_1$ is preferably an aliphatic hydrocarbon residue having 5 to 36 carbon atoms, more preferably a saturated or unsaturated, linear or branched chain aliphatic hydrocarbon residue having 6 to 18 carbon atoms. $R_1$ may be such an aliphatic hydrocarbon residue having a substituent which will be described below. Usually, $R_1$ is preferably an unsubstituted residue, more preferably an unsubstituted alkyl group.

In the above description, the acyl group is, for example, an alkylcarbonyl group having 1 to 10 carbon atoms, or an arylcarbonyl group such as a phenylcarbonyl group or naphthylcarbonyl group. The acyl group is preferably an alkylcarbonyl group having 1 to 4 carbon atoms. Specific examples thereof include acetyl, trifluoromethylcarbonyl, pentafluoroethylcarbonyl, and propionyl groups.

The substituent in the "optionally-substituted aromatic residue" and the substituent in the "optionally-substituted aliphatic hydrocarbon residue" are not particularly limited, and the substituent may be a sulfonic acid group, a sulfamoyl group, a cyano group, an isocyano group, a thiocyanate group, an isothiocyanate group, a nitro group, a nitrosyl group, a halogen atom, a hydroxyl group, a phosphoric acid group, a phosphoric ester group, a substituted or unsubstituted amino group, an optionally-substituted mercapto group, an optionally-substituted amide group, an optionally-substituted alkoxy group, an optionally-substituted aryloxy group, a carboxyl group, a carbamoyl group, an acyl group, an aldehyde group, a substituted carbonyl group such as an alkoxycarbonyl group including a methoxycarbonyl group, ethoxycarbonyl or butoxycarbonyl group, an optionally-substituted aromatic residue, an optionally-substituted aliphatic hydrocarbon residue, or the like.

Examples of the halogen atom include fluorine, chlorine, bromine and iodine atoms. Examples of the phosphoric ester group include phosphoric ($C_1$ to $C_4$) alkyl esters. Examples of the substituted or unsubstituted amino group include an amino group; alkyl-substituted amino groups such as a mono- or di-methylamino group, a mono- or di-ethylamino group, and a mono- or di-propylamino group; aryl-substituted amino groups such as a mono- or di-phenyl amino group, and a mono- or di-naphthylamino group; amino groups substituted with one alkyl group and one aromatic hydrocarbon residue, such as monoalkylmonophenylamine groups; a benzylamino group; an acetylamino group; and a phenylacetylamino group. Examples of the optionally-substituted mercapto group include a mercapto group, alkylmercapto groups, and a phenylmercapto group. Examples of the optionally-substituted amide group include an amide group, alkylamide groups, and arylamide groups. Herein, the alkoxy group means a group composed of the above-mentioned aliphatic hydrocarbon residue and an oxygen atom, and examples thereof include methoxy, ethoxy, butoxy, and tert-butoxy groups. Examples of the optionally-substituted aryloxy group include phenoxy and naphthoxy groups. These may have the same substituent(s) as described in the item "optionally-substituted aromatic residue". Examples of the acyl group include alkylcarbonyl groups having 1 to 10 carbon atoms, and arylcarbonyl groups. The acyl group is preferably an alkylcarbonyl group having 1 to 4 carbon atoms. Specific examples include acetyl, trifluoromethylcarbonyl, pentafluoroethylcarbonyl, and propionyl groups. The alkoxycarbonyl group may be, for example, an alkoxycarbonyl group having 1 to 10 carbon atoms.

X represents a linking group having 2 to 4 carbon atoms, and the linking group may have a substituent, and is combined with the benzene ring a and the nitrogen atom bonded to the benzene ring a to form a heteroring. The linking group is preferably an optionally-substituted, saturated or unsaturated hydrocarbon residue having 2 to 4 carbon atoms, more preferably an optionally-substituted, saturated or unsaturated hydrocarbon residue having 2 to 3 carbon atoms, further preferably 3 carbon atoms.

Preferred specific examples of X include —$CH_2CH_2$—, —$(CH_2)_3$—, cyclopentane-1,2-di-yl (cases denoted by Compound Numbers 192 and so on), or benzene-1,2-di-yl (cases denoted by Compound Numbers 205 to 207, and others). More preferred are —$CH_2CH_2$—, or —$(CH_2)_3$—.

Y represents a hydrogen atom, an optionally-substituted aromatic residue, an optionally-substituted aliphatic hydrocarbon residue, a carboxyl group, a phosphoric acid group, a sulfonic acid group, a cyano group, or an optionally-substituted amide group or alkoxycarbonyl group. Y is preferably a carboxyl group, a phosphoric acid group, a sulfonic acid group, an optionally-substituted amide group or an alkoxycarbonyl group, more preferably a carboxyl group or a phosphoric acid group, in particular preferably a carboxyl group. The optionally-substituted aromatic residue, the optionally-substituted aliphatic hydrocarbon residue, the optionally-substituted amide and the alkoxycarbonyl group each represent the same substituent as in the above-mentioned "optionally-substituted aromatic residue" and "optionally-substituted aliphatic hydrocarbon residue".

Z represents an optionally-substituted aromatic residue, an optionally-substituted aliphatic hydrocarbon residue, or an acyl group, and is preferably an optionally-substituted aromatic residue, more preferably an optionally-substituted phenyl group, most preferably an unsubstituted phenyl group.

$A_1$, $A_2$ and $A_3$ each independently represent an optionally-substituted aromatic residue, an optionally-substituted aliphatic hydrocarbon residue, a hydroxyl group, a phosphoric acid group, a cyano group, a hydrogen atom, a halogen atom, a carboxyl group, a carbonamide group, an alkoxycarbonyl group, an arylcarbonyl group, or an acyl group, and are each preferably a hydrogen atom, an optionally-substituted aromatic residue, an optionally-substituted aliphatic hydrocarbon residue, a cyano group, or a halogen atom, more preferably a hydrogen atom. The optionally-substituted aromatic residue, the optionally-substituted aliphatic hydrocarbon residue, the halogen atom, the alkoxycarbonyl group, the arylcarbonyl group, and the acyl group each represent the same substituent as the above-mentioned "optionally-substituted aromatic residue" and "optionally-substituted aliphatic hydrocarbon residue". When n is 2 or more and plural $A_2$s and $A_3$s are present, each of $A_2$s and $A_3$s may be identical to or different from each other.

When n is a value other than 0, plurals selected from $A_1$ and/or $A_2$(s) and/or $A_3$(s) may form an optionally-substituted ring and further they may be combined with the benzene ring a to form an optionally-substituted ring. An example of the ring which can be formed is an unsaturated hydrocarbon ring or heteroring. The ring formed with plurals out of any of $A_1$, $A_2$(s) and $A_3$(s) may be a 5-membered ring formed by use of a linking group formed by bonding plurals out of any of $A_1$, $A_2$(s) and $A_3$(s) and consisting of an aliphatic hydrocarbon chain having 2 to 3 carbon atoms, a linking group of an aliphatic hydrocarbon chain having 2 carbon atoms and an oxygen atom, or a linking group consisting of a heteroatom such as a sulfur, nitrogen or oxygen atom. Specific examples thereof include 5- to 6-membered aliphatic hydrocarbon rings consisting only of carbon atoms and heterorings such as 6-membered rings having one oxygen atom which are included in Compound Numbers 150 to 158, and 5-membered rings formed by use of a linking group comprising one heteroatom which are included in Compound Numbers 171 to 183. Examples of the optionally-substituted ring formed by combining any one from $A_1$, $A_2$(s) and $A_3$(s) with the benzene ring a, include 6-membered rings containing one oxygen atom which are each comprised of $A_3$ and the benzene ring a, have an oxygen atom as a substituent, and are included in Compound Numbers 184 to 190.

Examples of the unsaturated hydrocarbon ring include benzene, naphthalene, anthracene, phenanthrene, pyrene, indene, azulene, fluorene, cyclobutene, cyclohexene, cyclopentene, cyclohexadiene, and cyclopentadiene rings. Examples of the heteroring include pyridine, pyrazine, piperidine, indoline, furan, thiophene, pyran, oxazole, thiazole, thiadiazole, oxadiazole, indole, benzothiazole, benzoxazole, quinoline, carbazole, and benzopyran rings. Out of these, preferred are benzene, cyclobutene, cyclopentene, cyclohexene, pyran, furan, thiophene, and soon. These may have a substituent, as described above. The substituent may be the same as described in the item of the substituent in the above-mentioned "optionally-substituted aromatic residue" and "optionally-substituted aliphatic hydrocarbon residue". When the ring which can be formed is a heteroring and it has a carbonyl group, a thiocarbonyl group or the like, a cyclic ketone, a cyclic thioketone or the like may be formed and these rings may further have a substituent. The substituent in this case may be the same as described in the item of the substituent in the above-mentioned "optionally-substituted aromatic residue" and "optionally-substituted aliphatic hydrocarbon residue".

The combination of $A_1$, $A_2$(s) and $A_3$(s) may be preferably (1) a case wherein $A_1$, $A_2$(s) and $A_3$(s) are each a hydrogen atom, (2) a case wherein $A_1$ and $A_3$, adjacent ones out of $A_2$s or adjacent ones out of $A_3$s are bonded to each other through a linking group having 2 to 3 carbon atoms or a linking group of an aliphatic chain having 2 carbon atoms and an oxygen atom so as to form a single 5- to 6-membered ring (which may have a methyl group as a substituent) and the remaining $A_1$, $A_2$ (s) and $A_3$ (s) are each a hydrogen atom, or (3) a case wherein $A_2$ and the next $A_3$ but the adjacent $A_3$ are bonded to each other through a heteroatom selected from a group consisting of sulfur, nitrogen and oxygen atoms to form one to three 5-membered rings, and the remaining $A_1$, $A_2$(s) and $A_3$(s) are each a hydrogen atom. The combination is more preferably the above-mentioned case (1), that is, the case wherein $A_1$, $A_2$(s) and $A_3$(s) are each a hydrogen atom, or the above-mentioned case (3), that is, the case wherein $A_2$ and the next $A_3$ but the adjacent $A_3$ are bonded to each other through a sulfur atom to form one or two 5-membered rings, and the remaining $A_1$, $A_2$(s) and $A_3$(s) are each a hydrogen atom (specifically, cases of Compound Numbers 171, 179, 312 and others). It is preferred that the formed ring has no substituent.

The benzene ring a may have, as substituent (s) other than X and N shown in the formula (1), 1 to 3 substituents selected from a group consisting of: halogen atoms; amide, hydroxyl, cyano, nitro, alkoxyl, acyl, and substituted or unsubstituted amino groups; and optionally-substituted aliphatic hydrocarbon residues and optionally-substituted aromatic residues. The halogen atoms, the amide, alkoxyl, acyl and substituted or unsubstituted amino groups, and the optionally-substituted aliphatic hydrocarbon residues and the optionally-substituted aromatic residues each represent the same substituent as in the above-mentioned "optionally-substituted aromatic residue", and "optionally-substituted aliphatic hydrocarbon residue". When plural substituents are present, these substituents may each be bonded with $A_1$ and/or $A_2$ (s) and/or $A_3$ (s), thereby forming a ring equivalent to the optionally-substituted ring. The substituent in the optionally-substituted ring represents the same substituent as in the above-mentioned "optionally-substituted aromatic residue", and "optionally-substituted aliphatic hydrocarbon residue".

Usually, it is preferred that the benzene ring a does not have any substituent other than X and the nitrogen atom shown in the formula (1).

About methine dyes represented by the formula (1), the dyes wherein any one of the preferred examples in the description of each of the above-mentioned symbols is selected, or the dyes wherein two or more from the preferred examples of the symbols are combined are preferred compounds. The dyes wherein one or more from the more preferred examples thereof and one or more from the preferred examples are combined are more preferred compounds, and the dyes wherein two or more from the more preferred examples are combined are even more preferred compounds.

Out of methine dyes represented by the formula (1), preferred is a methine dye represented by the following formula (2):

[KA 6]

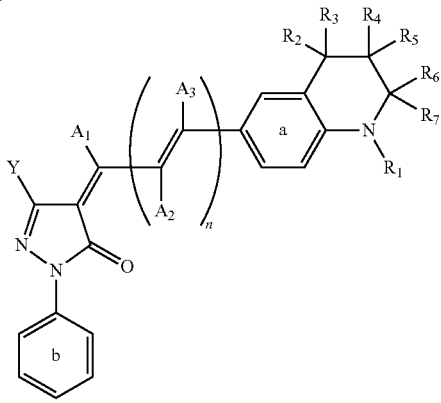

(2)

In the formula (2), n, $R_1$, Y, $A_1$, $A_2$, $A_3$ and the benzene ring a each represent the same as in the formula (1), and preferred cases thereof, and more preferred cases thereof are also the same. $R_2$ to $R_7$ each independently represent a hydrogen atom, an optionally-substituted aromatic residue, an optionally-substituted aliphatic hydrocarbon residue, or a halogen atom, and are each preferably a hydrogen atom or an optionally-substituted aliphatic hydrocarbon residue. A case in which $R_2$ to $R_7$ are each a hydrogen atom or a case in which $R_2$ and $R_3$ are each an optionally-substituted aliphatic hydrocarbon residue and $R_4$ to $R_7$ are each a hydrogen atom is more preferred. Usually, a case in which $R_2$ to $R_7$ are each a hydrogen atom is most preferred. The optionally-substituted aromatic residue and the optionally-substituted aliphatic hydrocarbon residue herein are the same as the above-mentioned "optionally-substituted aromatic residue" and "optionally-substituted aliphatic hydrocarbon residue", respectively. Examples of the halogen atom include fluorine, chlorine, bromine and iodine atoms. $R_2$ to $R_7$ may be bonded to each other to form an optionally-substituted ring. The substituent in the optionally-substituted ring represents the same as described in the item of the substituent in the above-mentioned "optionally-substituted aromatic residue" and "optionally-substituted aliphatic hydrocarbon residue".

The benzene ring b may have 1 to 5 substituents selected from a group consisting of: halogen atoms; optionally-substituted amide, hydroxyl, cyano, nitro, sulfonic acid, carboxyl, phosphoric acid, alkoxyl, acyl, and substituted or unsubstituted amino groups; and optionally-substituted aliphatic hydrocarbon residues and optionally-substituted aromatic residues. Herein, the halogen atoms, the optionally-substituted amide groups, the alkoxyl groups, the acyl groups, the substituted or unsubstituted amino groups each represent the same substituent as in the above-mentioned "optionally-substituted aromatic residue" and "optionally-substituted aliphatic hydrocarbon residue". Moreover, the optionally-substituted aromatic residue and the optionally-substituted aliphatic hydrocarbon residue represent the same as the above-mentioned "optionally-substituted aromatic residue" and "optionally-substituted aliphatic hydrocarbon residue", respectively. When plural substituents are present, these substituents may be bonded to each other to form an optionally-substituted ring.

The substituent in the optionally-substituted ring represents the same substituent as in the above-mentioned "optionally-substituted aromatic residue" and "optionally-substituted aliphatic hydrocarbon residue". Usually, the benzene ring b is more preferably an unsubstituted ring.

About methine dyes represented by the formula (2), the dyes wherein any one of the preferred examples in the description of each of the above-mentioned symbols is selected, or the dyes wherein two or more from the preferred examples of the symbols are combined are preferred compounds. The dyes wherein one or more from the more preferred examples thereof and one or more from the preferred examples are combined are more preferred compounds, and the dyes wherein two or more from the more preferred examples are combined are even more preferred compounds.

For example, it is more preferred that the methine dye represented by the formula (2) is a methine dye represented by the following formula (3):

[KA 7]

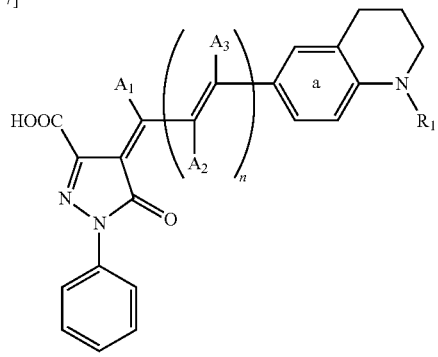

(3)

In the formula (3), n, $R_1$, $A_1$, $A_2$, $A_3$ and the benzene ring a are each the same as in the formula (1), and preferred cases thereof and more preferred cases thereof are also the same.

When the methine dyes represented by the formulae (1) to (3) have, as a substituent, an acidic group such as a carboxyl, phosphoric acid, hydroxyl, or sulfonic acid group, the dyes may each form a salt. Examples of the salt include a salt thereof with an alkali metal or alkaline earth metal such as lithium, sodium, potassium, magnesium or calcium, and a salt thereof with a quaternary ammonium salt such as tetramethylammonium, tetrabutylammonium, pyridium, imidazolium, piperadinium, and piperidinium.

The methine dyes represented by the formulae (1) to (3) may each be a structural isomer such as a cis-isomer, a trans-isomer, or a racemic body. However, the dyes are each not limited to any specific structural isomer. Any one of the isomers can be satisfactorily used as the light sensitizing dye in the invention.

The methine dye represented by the formula (1) can be produced by, for example, a process represented by a reaction formula described below. Specifically, a compound represented by a formula (4) which has active methylene, and a carbonyl compound represented by a formula (5) are condensed in a solvent such as an alcohol such as methanol, ethanol, isopropanol or butanol, an aprotonic polar solvent such as dimethylformamide or N-methylpyrrolidone, toluene, acetic anhydride, or acetonitrile, in the presence of a basic catalyst such as sodium hydroxide, sodium methylate, sodium acetate, diethylamine, triethylamine, piperidine, piperazine, or diazabicycloundecene, if necessary, at 20 to 180° C., preferably to 150° C., thereby yielding the methine dye of the formula (1). The compound represented by the formula (4), which has active methylene, is commercially available with ease. In the case of the carbonyl compound which is represented by the formula (5) and is not commercially available, the compound can be yielded as follows: For example, a compound wherein X is trimethylene can be yielded by known methods such as subjecting 1,2,3,4-tetrahydroquinoline to N-alkylation to introduce an alkyl group to $R_1$, and then subjecting the resultant to formylaton. Other compounds can also be yielded in accordance with this case.

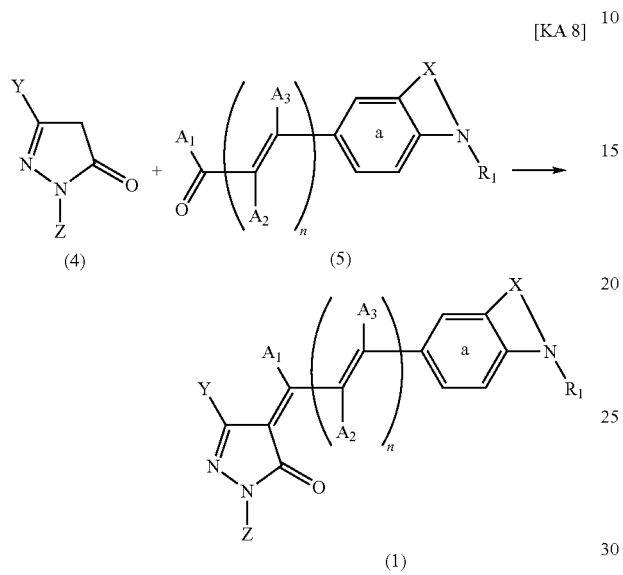

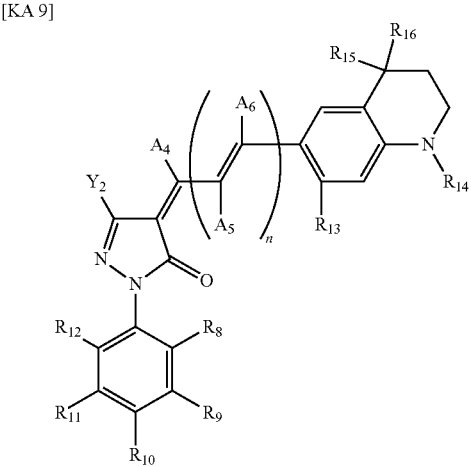

Examples of the compound represented by the formula (4) include 1-phenyl-2-carboxyl-5-pyrrazolone, 1-phenyl-2-methoxycarbonyl-5-pyrrazolone, 1-phenyl-3-carboxyl-5-pyrrazolone, 1-(4-sulfophenyl)-3-methyl-5-pyrrazolone, 1-(4-sulfophenyl)-3-carboxy-5-pyrrazolone, and 1-phenyl-3-carboethoxy-5-pyrrazolone. Typical examples of the compound represented by the formula (5) include 1-octyl-6-tetrahydroquinolinealdehyde, 3-(1-octadecyl-tetrahydroquinoline-6-yl)vinylaldehyde, 1,2,3,4-tetrahydro-1-(9,9-dimethyl-9H-fluorene-2-yl)quinoline-6-acrylaldehyde, 5-{1-(9,9-dimethyl-9H-fluorene-2-yl)indoline-5-yl}thiophene-2-carboaldehyde, 3-(1,2,3,4-tetrahydro-1-p-tolylquinoline-6-yl)acrylaldehyde, and 1,2,3,4-tetrahydro-1-(9,9-dimethyl-9H-fluorene-2-yl)quinoline-6-carboaldehyde.

Out of methine dyes represented by the formula (1), specific examples of the number of n and those of each of substituents in a dye represented by a formula (6) illustrated below are shown in Tables 1 and 2. In Tables 1 and 2, Ph means a phenyl group.

wherein n is an integer of 0 to 7; $Y_2$ represents a hydrogen atom, a lower (C1 to C4) alkyl group, a carboxyl group, a phosphoric acid group, a sulfonic acid group, or a lower (C1 to C4) alkoxycarbonyl group (when an acidic group is selected, $Y_2$ may be a salt thereof, for example, an alkali metal salt thereof), and $Y_2$ is preferably a carboxyl group; $A_4$ represents a hydrogen atom, a lower (C1 to C4) alkyl group, preferably a methyl group, or a phenyl group, and is preferably a hydrogen atom; $A_5$ and $A_6$ each independently represent a hydrogen atom, a (C1 to C8) alkyl group, a phenyl group, a halogen atom, preferably a chlorine atom or bromine atom, or a cyano group, and are each preferably a hydrogen atom; $R_8$ to $R_{12}$ each independently represent a hydrogen atom, a (C1 to C8) alkyl group, a phenyl group, a halogen atom, preferably a chlorine atom or bromine atom, a cyano group, a carboxyl group, a phosphoric acid group, a sulfonic acid group, a lower (C1 to C4) alkoxy group, preferably a methoxy group, a lower (C1 to C4) acyl group, preferably an acetyl group, an amide group, an amino group, a mono or di(C1 to C4)alkylamino group, or a nitro group, and $R_8$ to $R_{12}$ are each preferably a hydrogen atom; $R_{13}$ represents a hydrogen atom, a lower (C1 to C4) alkyl group, a halogen atom, a (C1 to C8) alkoxy group, or a hydroxyl group, and is preferably a hydrogen atom; $R_{14}$ represents a hydrogen atom, a (C1 to C18) alkyl group, or a phenyl group, and is preferably a (C6 to C18) alkyl group; and $R_{15}$ and $R_{16}$ each independently represent a hydrogen atom, or a (C1 to C8) alkyl group, and are each preferably a hydrogen atom.

TABLE 1

| Compound | n | $Y_2$ | $A_4$ | $A_5$ | $A_6$ | $R_8$ | $R_9$ | $R_{10}$ | $R_{11}$ | $R_{12}$ | $R_{13}$ | $R_{14}$ | $R_{15}$ | $R_{16}$ |
|---|---|---|---|---|---|---|---|---|---|---|---|---|---|---|
| 1 | 0 | H | H | — | — | H | H | H | H | H | H | H | H | H |
| 2 | 0 | H | H | — | — | H | H | H | H | H | H | $CH_3$ | H | H |
| 3 | 0 | $CH_3$ | H | — | — | H | H | H | H | H | H | $CH_3$ | H | H |
| 4 | 0 | $CH_3$ | H | — | — | H | H | H | H | H | H | H | $CH_3$ | $CH_3$ |
| 5 | 0 | COOH | H | — | — | H | H | H | H | H | H | $CH_3$ | H | H |
| 6 | 0 | $PO(OH_2)$ | H | — | — | H | H | H | H | H | H | $CH_3$ | H | H |
| 7 | 0 | $SO_3H$ | H | — | — | H | H | H | H | H | H | $CH_3$ | H | H |
| 8 | 0 | COOH | H | — | — | H | H | H | H | H | H | $C_2H_5$ | H | H |
| 9 | 0 | COOH | H | — | — | H | H | H | H | H | H | $C_3H_7$ | H | H |
| 10 | 0 | COOH | H | — | — | H | H | H | H | H | H | $C_4H_9$ | H | H |
| 11 | 0 | COOH | H | — | — | H | H | H | H | H | H | $C_6H_{13}$ | H | H |
| 12 | 0 | COOH | H | — | — | H | H | H | H | H | H | $C_8H_{17}$ | H | H |
| 13 | 0 | COOH | H | — | — | H | H | $OCH_3$ | H | H | H | $C_{12}H_{25}$ | H | H |

TABLE 1-continued

| Compound | n | Y₂ | A₄ | A₅ | A₆ | R₈ | R₉ | R₁₀ | R₁₁ | R₁₂ | R₁₃ | R₁₄ | R₁₅ | R₁₆ |
|---|---|---|---|---|---|---|---|---|---|---|---|---|---|---|
| 14 | 0 | COOH | H | — | — | H | H | H | H | H | H | $C_{18}H_{37}$ | H | H |
| 15 | 0 | COOH | H | — | — | H | H | H | H | H | H | $C_8H_{17}$ | $CH_3$ | $CH_3$ |
| 16 | 0 | COOLi | H | — | — | H | H | H | H | H | H | $C_8H_{17}$ | H | H |
| 17 | 0 | COONa | H | — | — | H | H | H | H | H | H | $C_8H_{17}$ | H | H |
| 18 | 0 | COOK | H | — | — | H | H | H | H | H | H | $C_8H_{17}$ | H | H |
| 19 | 0 | COOH | H | — | — | H | H | H | H | H | H | Ph | H | H |
| 20 | 0 | COOH | $CH_3$ | — | — | H | H | H | H | H | H | $C_8H_{17}$ | H | H |
| 21 | 0 | COOH | H | — | — | Cl | Cl | Cl | Cl | Cl | H | $C_8H_{17}$ | H | H |
| 22 | 0 | COOH | H | — | — | H | H | $CONH_2$ | H | H | OH | $C_8H_{17}$ | H | H |
| 23 | 0 | COOH | H | — | — | H | H | OH | H | H | $OCH_3$ | $C_8H_{17}$ | H | H |
| 24 | 1 | COOH | H | H | H | H | H | H | H | H | H | $CH_3$ | H | H |
| 25 | 1 | COOH | H | H | H | H | H | H | H | H | H | $C_2H_5$ | $CH_3$ | $CH_3$ |
| 26 | 1 | COOH | H | H | H | H | H | H | H | H | H | $C_4H_9$ | H | H |
| 27 | 1 | COOH | H | H | H | H | H | H | H | H | H | $C_8H_{17}$ | H | H |
| 28 | 1 | COOH | H | H | H | H | H | $NH_2$ | H | H | H | $C_8H_{17}$ | $CH_3$ | $CH_3$ |
| 29 | 1 | COOH | H | H | H | H | H | H | H | H | H | Ph | H | H |
| 30 | 1 | COONa | H | H | H | H | H | CN | H | H | H | $C_8H_{17}$ | H | H |
| 31 | 1 | COONa | $CH_3$ | H | H | H | H | $NO_2$ | H | H | H | $C_8H_{17}$ | H | H |
| 32 | 1 | COOH | H | H | CN | H | H | H | H | H | H | $C_8H_{17}$ | H | H |
| 33 | 1 | COOH | $CH_3$ | $CH_3$ | $CH_3$ | H | H | H | H | H | H | $C_8H_{17}$ | H | H |
| 34 | 1 | COOH | H | H | H | H | H | $SO_3H$ | H | H | H | $C_8H_{17}$ | H | H |
| 35 | 1 | COOH | H | H | H | H | H | $SO_3Na$ | H | H | H | $C_8H_{17}$ | H | H |
| 36 | 1 | COOH | H | H | H | H | H | $CH_3$ | H | H | H | $C_8H_{17}$ | H | H |
| 37 | 1 | COOH | H | H | H | H | H | H | H | H | H | $C_8H_{17}$ | $C_8H_{17}$ | $C_8H_{17}$ |
| 38 | 1 | COOH | H | H | H | H | H | $COCH_3$ | H | H | $CH_3$ | $C_8H_{17}$ | H | H |
| 39 | 1 | COOH | H | H | H | H | H | H | H | H | $OC_8H_{17}$ | $C_8H_{17}$ | H | H |
| 40 | 1 | COOH | H | H | H | H | H | COOH | H | H | Cl | $C_8H_{17}$ | H | H |
| 41 | 1 | COOH | H | H | H | H | H | $PO(OH)_2$ | H | H | Br | $C_8H_{17}$ | H | H |
| 42 | 1 | COOH | H | H | H | H | H | $C_2H_5$ | H | H | H | $C_8H_{17}$ | H | H |
| 43 | 1 | COOH | H | H | H | H | H | Ph | H | H | H | $C_8H_{17}$ | H | H |
| 44 | 1 | COOH | H | H | H | H | H | $C_8H_{17}$ | H | H | H | $C_8H_{17}$ | H | H |
| 45 | 1 | COOH | H | H | H | H | H | Cl | H | H | H | $C_8H_{17}$ | H | H |

TABLE 2

| Compound | n | Y₂ | A₄ | A₅ | A₆ | R₈ | R₉ | R₁₀ | R₁₁ | R₁₂ | R₁₃ | R₁₄ | R₁₅ | R₁₆ |
|---|---|---|---|---|---|---|---|---|---|---|---|---|---|---|
| 46 | 2 | COOH | H | H | H | H | H | H | H | H | H | $C_8H_{17}$ | H | H |
| 47 | 2 | COOLi | H | H | H | H | H | H | H | H | H | $C_8H_{17}$ | H | H |
| 48 | 2 | COONa | H | H | H | H | H | H | H | H | H | $C_8H_{17}$ | H | H |
| 49 | 2 | COOK | H | H | H | H | H | H | H | H | H | $C_8H_{17}$ | H | H |
| 50 | 2 | $COOCH$ | H | H | H | H | H | H | H | H | H | $C_8H_{17}$ | H | H |
| 51 | 2 | COOH | H | H | H | H | H | H | H | H | H | $CH_3$ | H | H |
| 52 | 2 | COOH | H | H | H | H | H | H | H | H | H | $C_2H_5$ | H | H |
| 53 | 2 | COOH | H | H | H | H | H | H | H | H | H | $C_4H_9$ | H | H |
| 54 | 2 | COOH | H | H | H | H | H | H | H | H | H | $C_{18}H_{37}$ | H | H |
| 55 | 2 | COOH | H | H | H | H | H | H | H | H | H | Ph | H | H |
| 56 | 2 | COOH | $CH_3$ | H | H | H | H | H | H | H | H | $C_8H_{17}$ | H | H |
| 57 | 2 | COOH | H | H | H | H | H | H | H | H | H | $C_8H_{17}$ | $CH_3$ | $CH_3$ |
| 58 | 2 | COOH | H | $CH_3$ | $CH_3$ | H | H | H | H | H | H | $C_8H_{17}$ | $C_8H_{17}$ | $C_8H_{17}$ |
| 59 | 2 | COOH | $CH_3$ | $CH_3$ | $CH_3$ | H | H | H | H | H | H | $C_8H_{17}$ | H | H |
| 60 | 2 | COOH | H | H | H | Cl | Cl | Cl | Cl | Cl | H | $C_8H_{17}$ | H | H |
| 61 | 2 | COOH | H | H | H | H | H | $N(CH_3)_2$ | H | H | $CH_3$ | $CH_3$ | H | H |
| 62 | 2 | COOH | H | H | H | H | H | H | H | H | OH | $C_2H_5$ | H | H |
| 63 | 2 | COOH | H | H | H | H | H | H | H | H | ONa | $C_4H_9$ | H | H |
| 64 | 2 | COOH | H | H | H | Br | Br | Br | Br | Br | H | $C_{18}H_{37}$ | H | H |
| 65 | 2 | COOH | Ph | H | H | H | H | H | H | H | H | Ph | H | H |
| 66 | 2 | $PO(OH)_2$ | H | H | H | H | H | H | H | H | H | $C_8H_{17}$ | H | H |
| 67 | 2 | $SO_3H$ | H | H | H | H | H | H | H | H | H | $C_8H_{17}$ | H | H |
| 68 | 2 | $PO(ONa)_2$ | H | H | H | H | H | H | H | H | H | $C_8H_{17}$ | H | H |
| 69 | 2 | $SO_3Na$ | H | H | H | H | H | H | H | H | H | $C_8H_{17}$ | H | H |
| 70 | 2 | $PO(OH)_2$ | H | H | H | H | H | H | H | H | H | $C_8H_{17}$ | $CH_3$ | $CH_3$ |
| 71 | 2 | COOH | H | H | CN | H | H | H | H | H | H | $C_8H_{17}$ | H | H |
| 72 | 2 | COOH | H | H | H | H | H | Ph | H | H | H | $C_8H_{17}$ | H | H |
| 73 | 2 | COOH | H | H | H | H | $CH_3$ | H | $CH_3$ | H | H | $C_8H_{17}$ | H | H |
| 74 | 2 | COOH | H | H | H | H | $C_2H_5$ | H | $C_2H_5$ | H | H | $C_8H_{17}$ | H | H |
| 75 | 2 | COOH | H | H | H | H | H | Cl | H | H | H | $C_8H_{17}$ | H | H |
| 76 | 2 | COOH | H | H | H | H | H | Br | H | H | H | $C_8H_{17}$ | H | H |
| 77 | 2 | COOH | H | H | H | H | H | $C_8H_{17}$ | H | H | H | $C_8H_{17}$ | H | H |
| 78 | 2 | COOH | H | H | H | H | H | OH | H | H | H | $C_8H_{17}$ | H | H |
| 79 | 2 | COOH | H | H | H | H | H | COOH | H | H | H | $C_8H_{17}$ | H | H |
| 80 | 2 | COOH | H | H | H | H | H | $SO_3Na$ | H | H | H | $C_8H_{17}$ | H | H |
| 81 | 3 | COOH | H | H | H | H | H | H | H | H | H | $C_8H_{17}$ | H | H |
| 82 | 3 | COOH | H | H | H | H | H | H | H | H | H | Ph | H | H |

TABLE 2-continued
| Compound | n | $Y_2$ | $A_4$ | $A_5$ | $A_6$ | $R_8$ | $R_9$ | $R_{10}$ | $R_{11}$ | $R_{12}$ | $R_{13}$ | $R_{14}$ | $R_{15}$ | $R_{16}$ |
|---|---|---|---|---|---|---|---|---|---|---|---|---|---|---|
| 83 | 4 | COOH | H | H | H | H | H | H | H | H | H | $C_8H_{17}$ | H | H |
| 84 | 4 | COOH | H | H | H | H | H | H | H | H | H | Ph | H | H |
| 85 | 5 | COOH | H | H | H | H | H | H | H | H | H | $C_8H_{17}$ | H | H |
| 86 | 5 | COOH | H | H | H | H | H | H | H | H | H | Ph | H | H |
| 87 | 6 | COOH | H | H | H | H | H | H | H | H | H | $C_8H_{17}$ | H | H |
| 88 | 6 | COOH | H | H | H | H | H | H | H | H | H | Ph | H | H |
| 89 | 7 | COOH | H | H | H | H | H | H | H | H | H | $C_8H_{17}$ | H | H |
| 90 | 7 | COOH | H | H | H | H | H | H | H | H | H | Ph | H | H |
Other specific examples of the methine dye represented by the formula (1) are illustrated below.
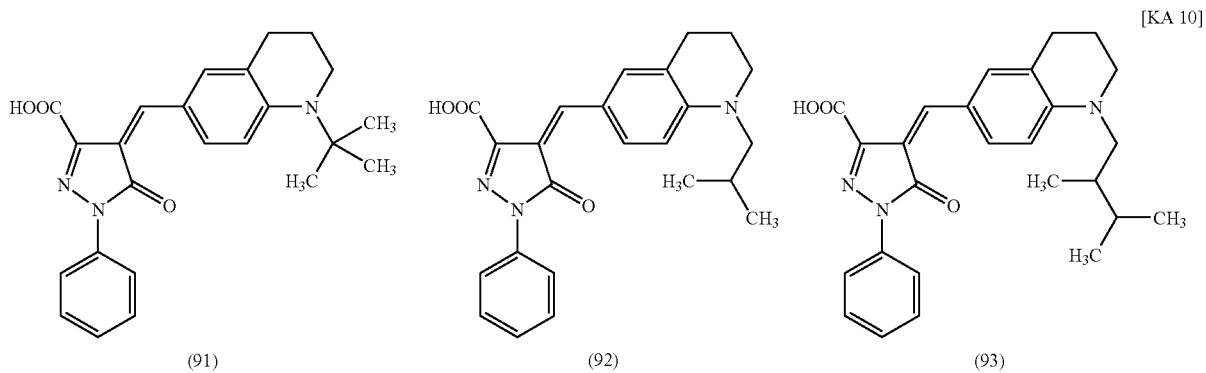
(91)  (92)  (93)
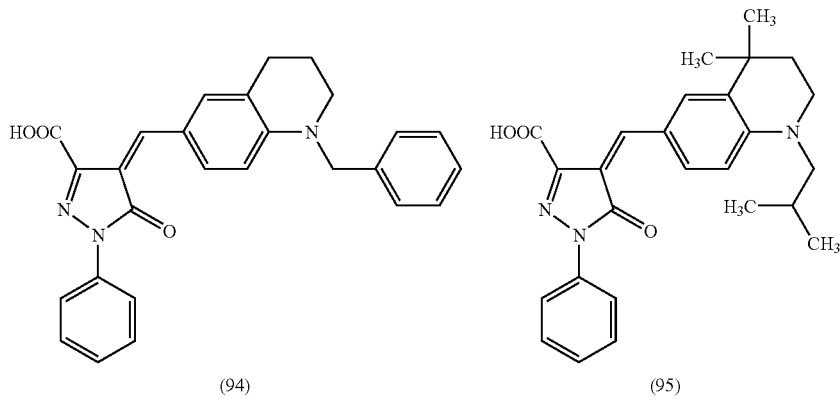
(94)  (95)
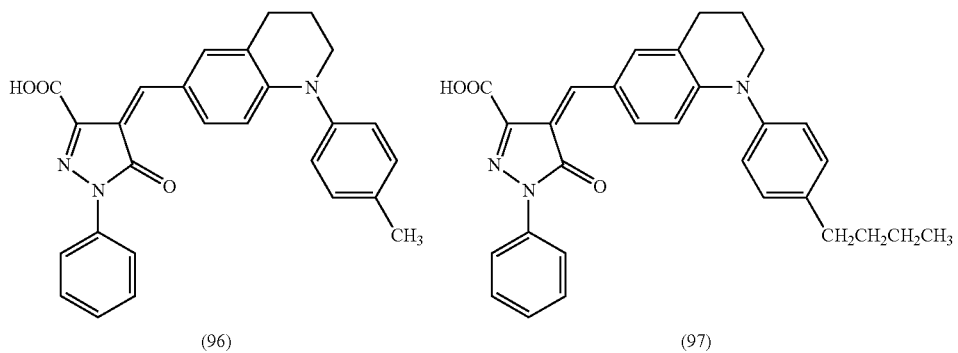
(96)  (97)

-continued
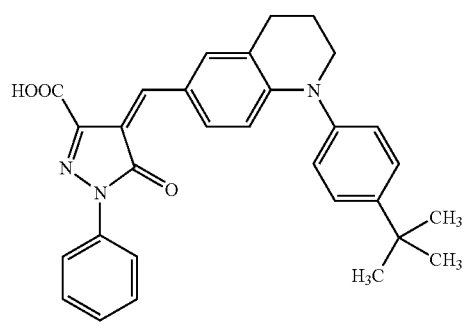
(98)
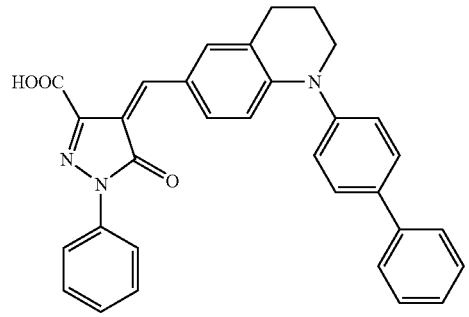
(99)
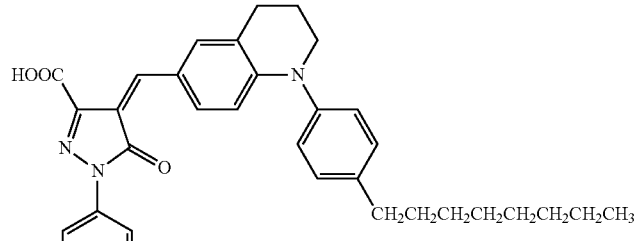
(100)
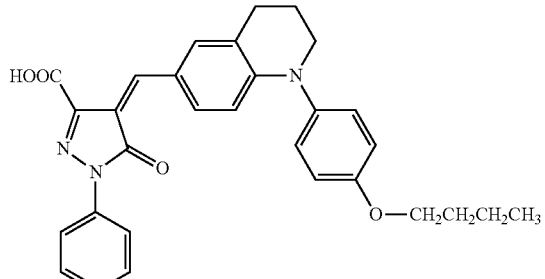
(101)
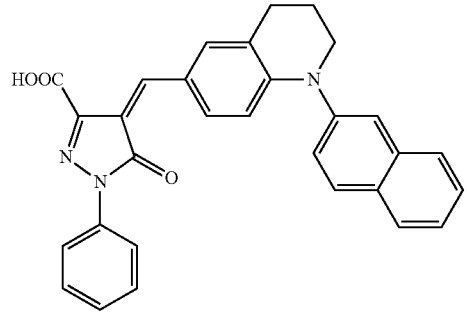
(102)
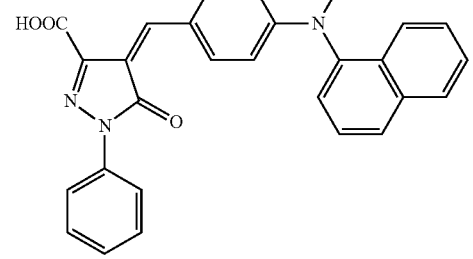
(103)
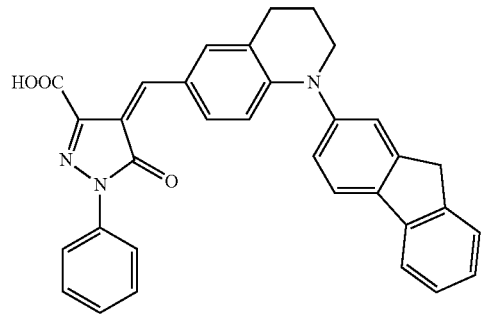
(104)
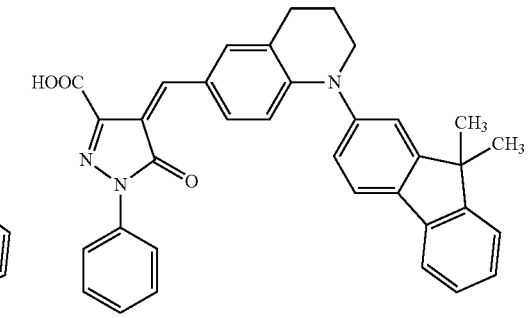
(105)
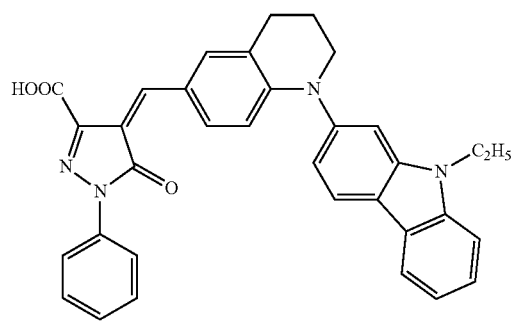
(106)
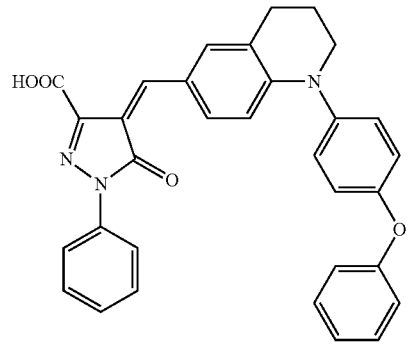
(107)

-continued
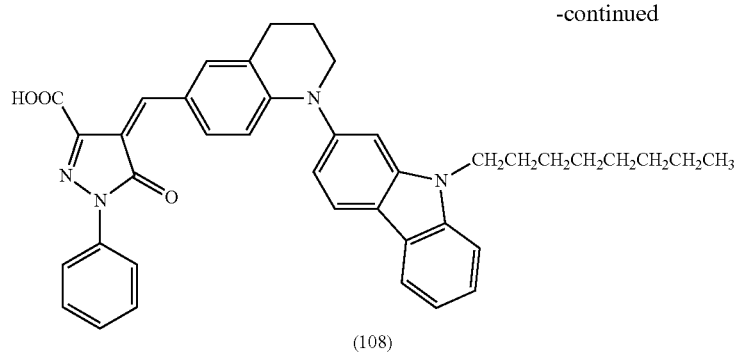
(108)
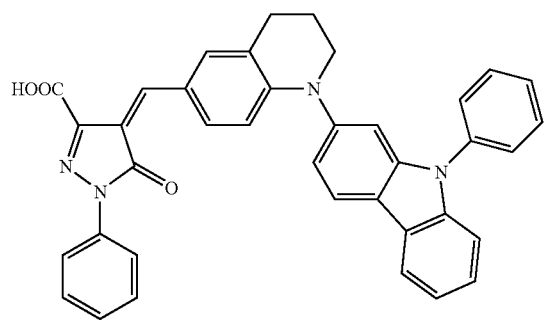
(109)
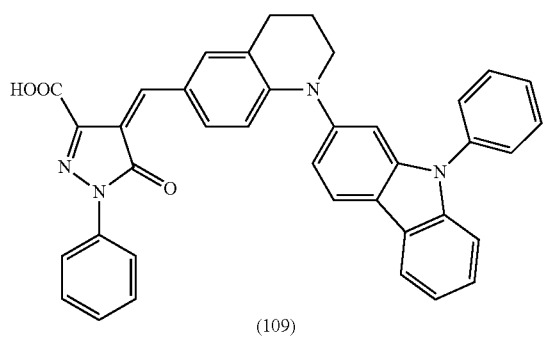
(109)
[KA 11]
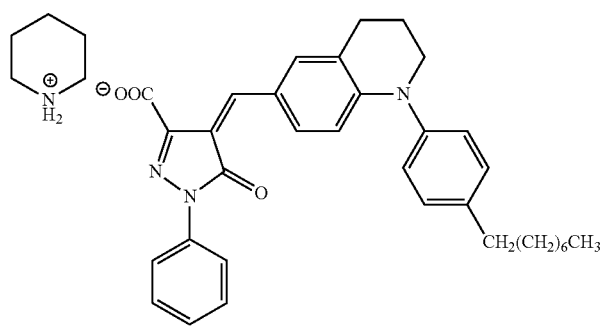
(110)

-continued
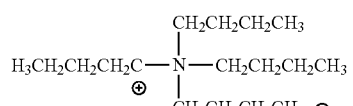
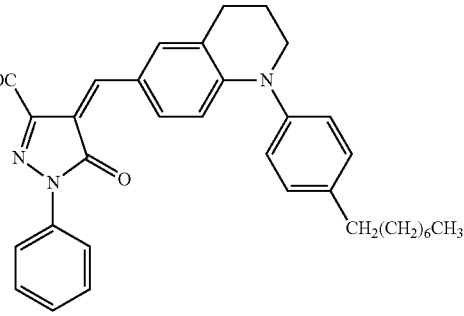
(111)
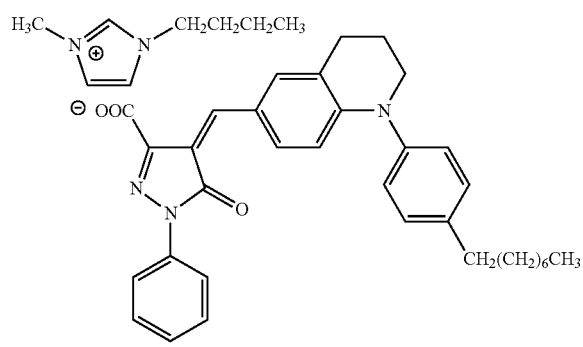
(112)
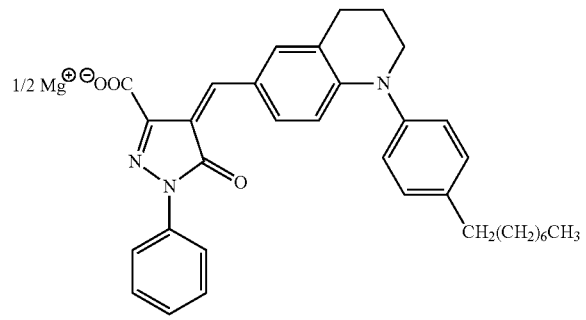
(113)
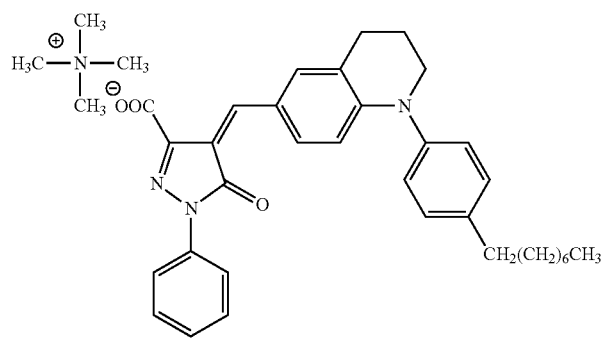
(114)
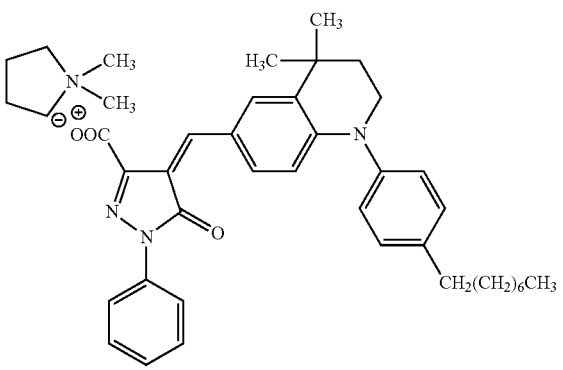
(115)
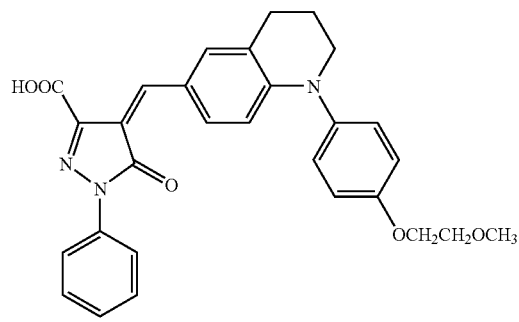
(116)
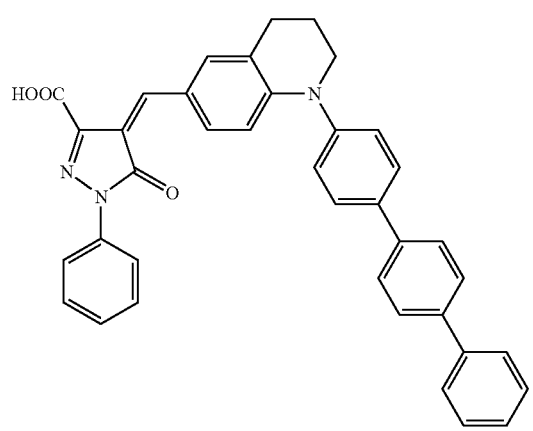
(117)

-continued
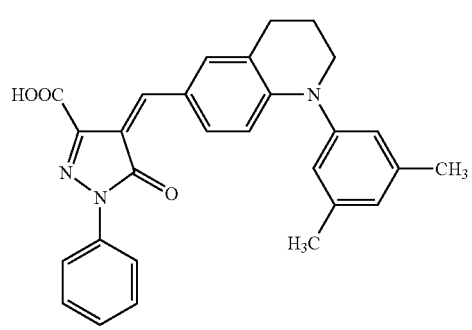
(118)
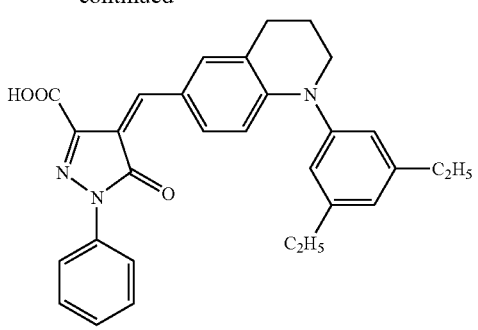
(119)
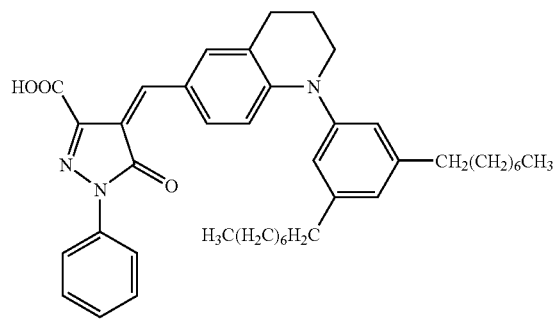
(120)
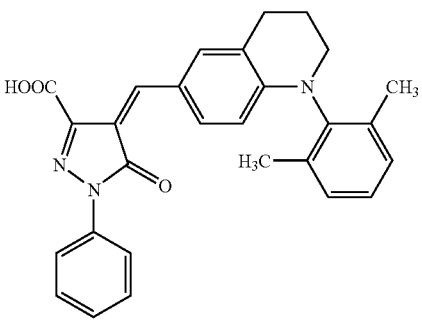
(121)
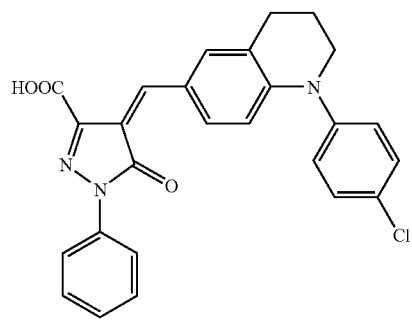
(122)
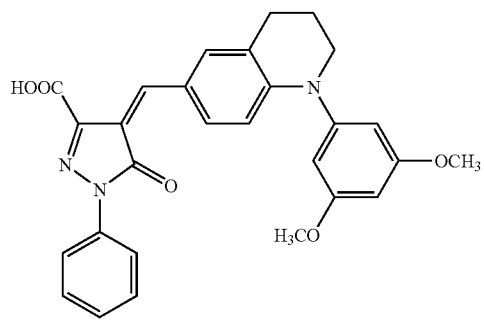
(123)
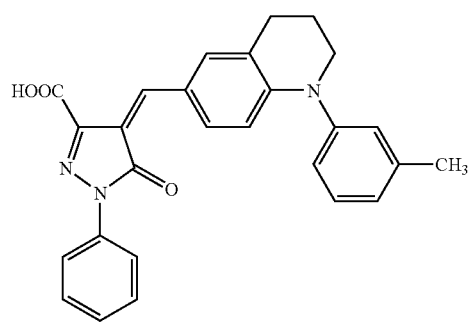
(124)

-continued
[KA 12]
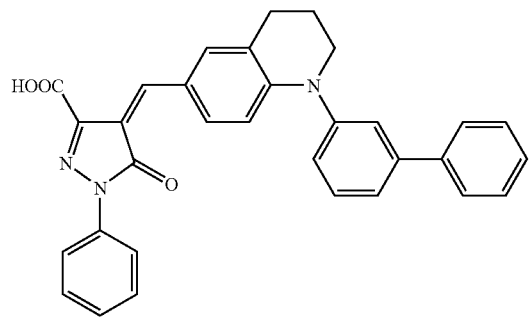
(125)
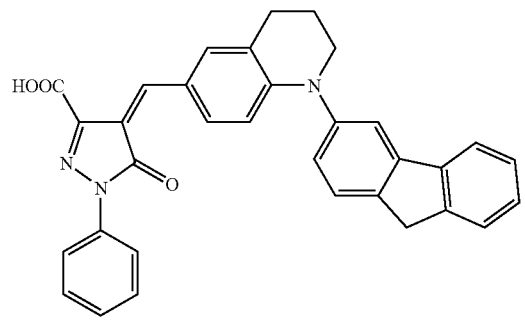
(126)
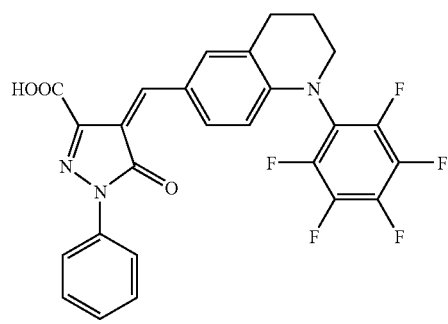
(127)
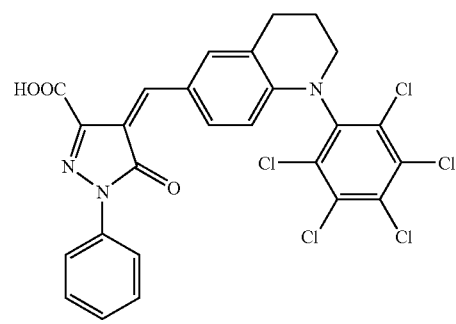
(128)
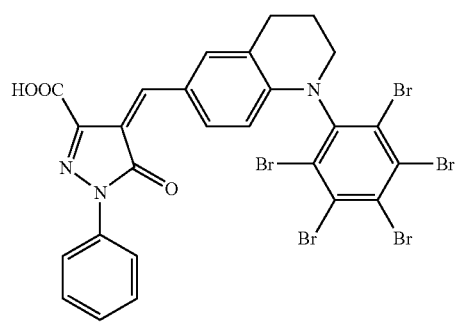
(129)
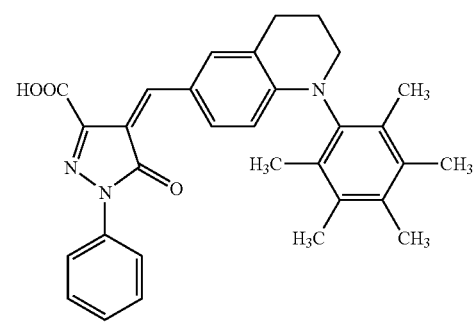
(130)
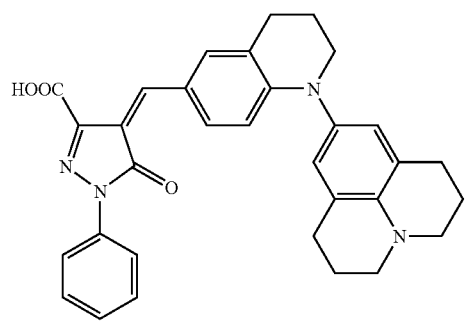
(131)
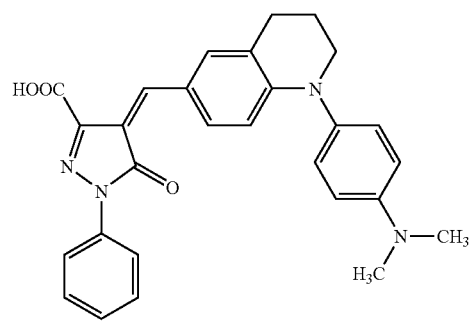
(132)

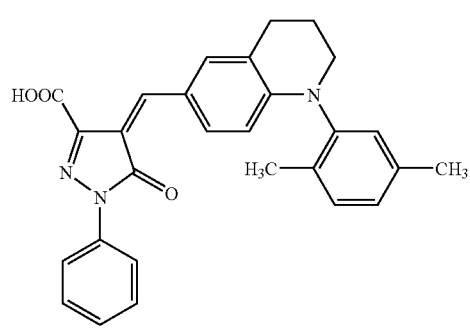
(133)
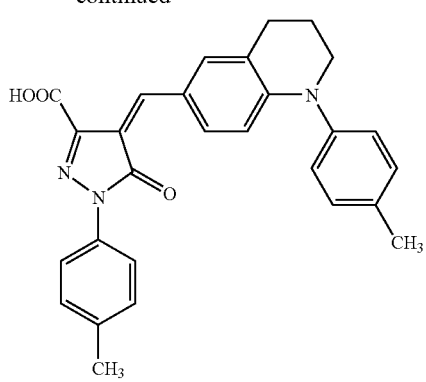
(134)
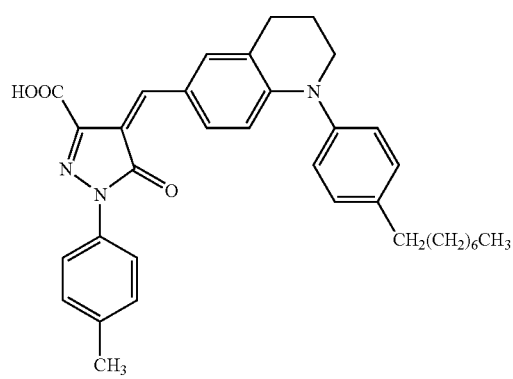
(135)
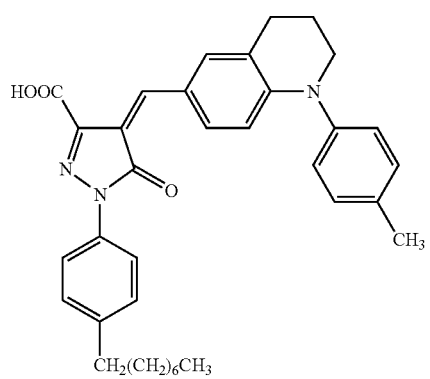
(136)
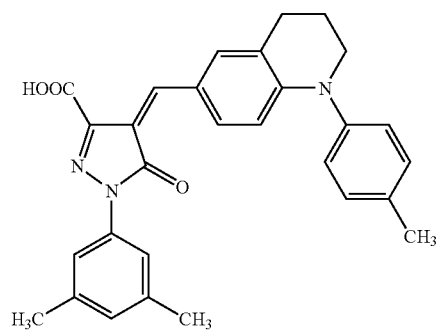
(137)
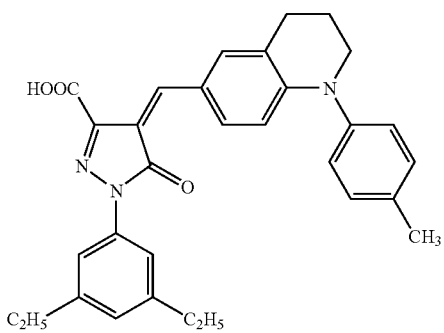
(138)
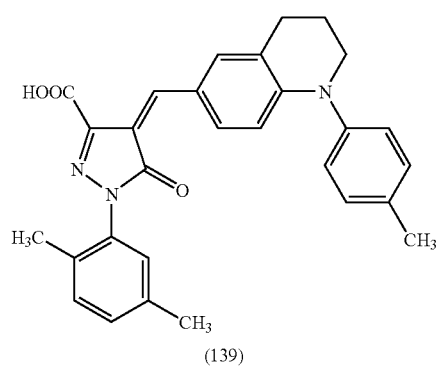
(139)
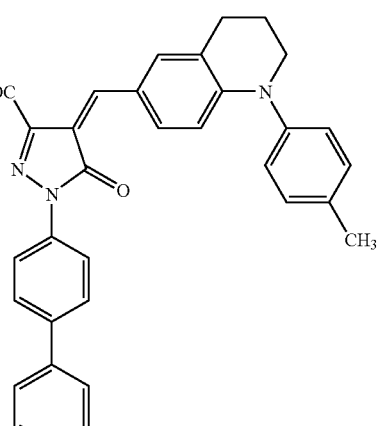
(140)

-continued
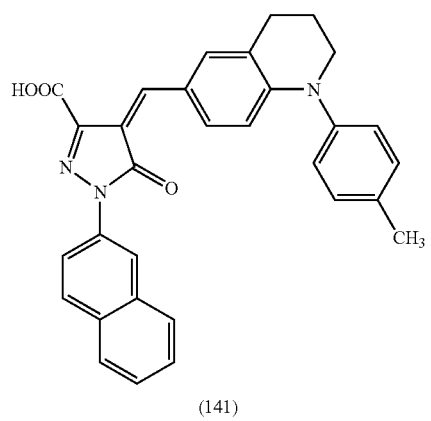
(141)
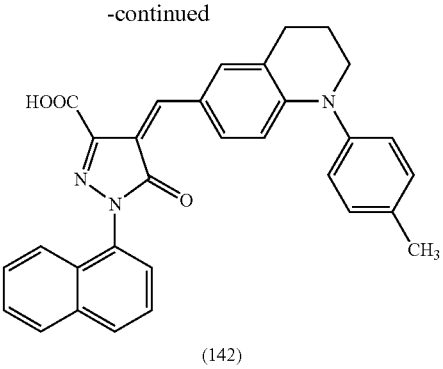
(142)
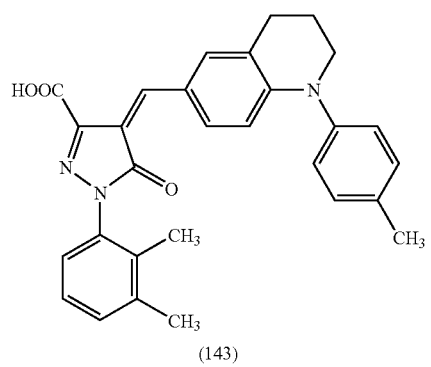
(143)
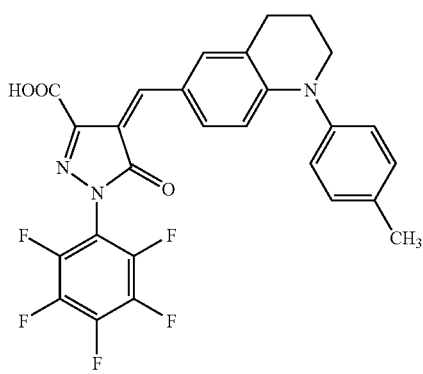
(144)
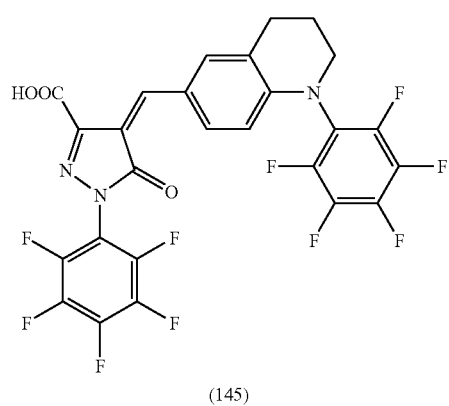
(145)
[KA 13]
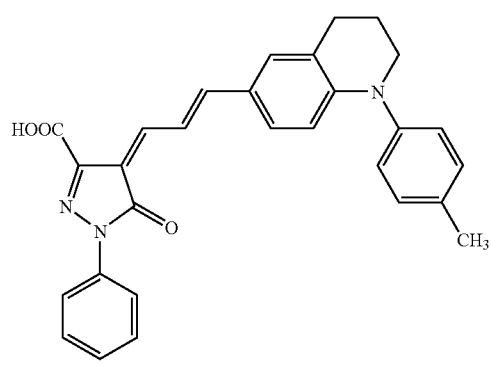
(146)
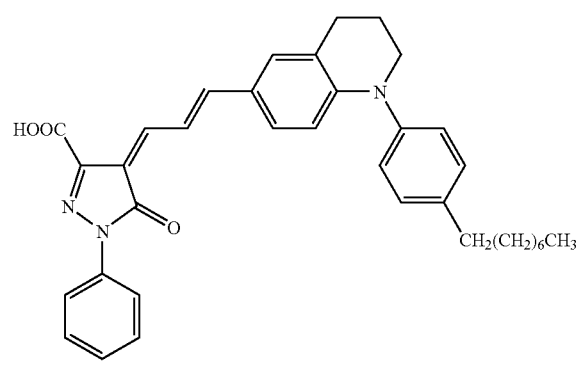
(147)

-continued
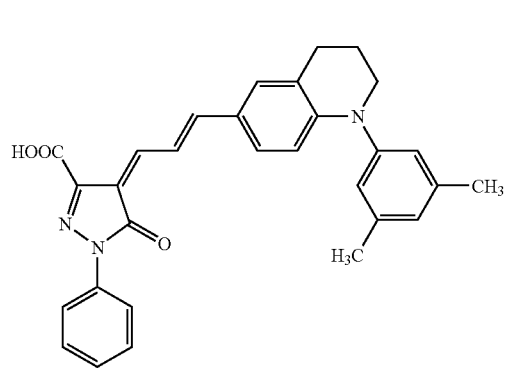
(148)
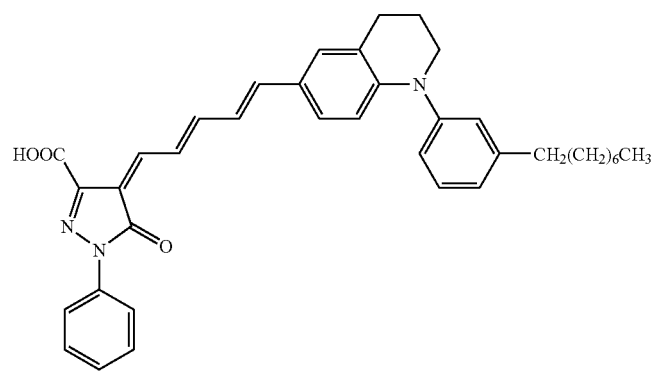
(149)
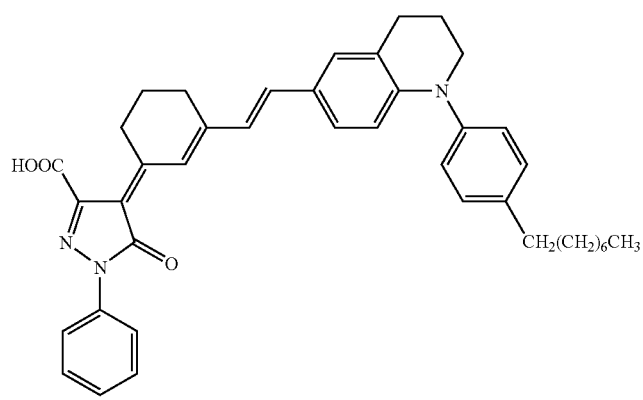
(150)
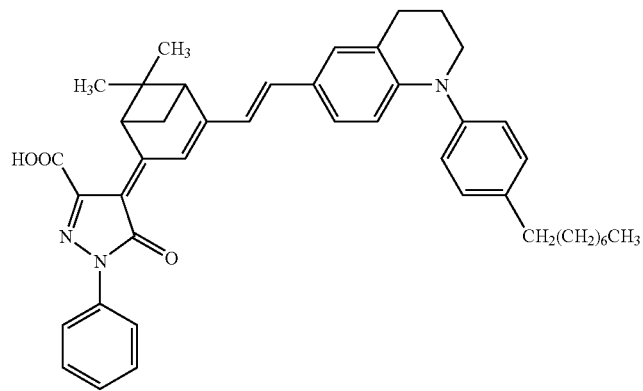
(151)
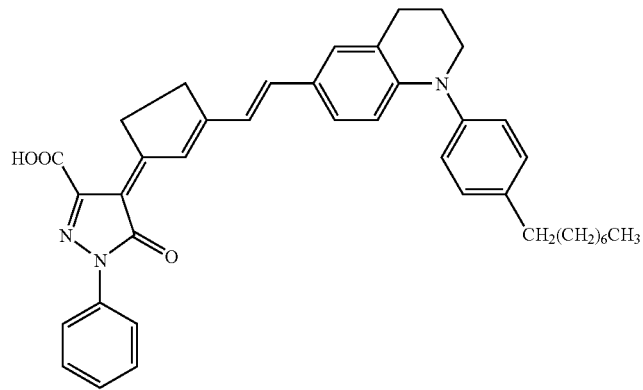
(152)

-continued
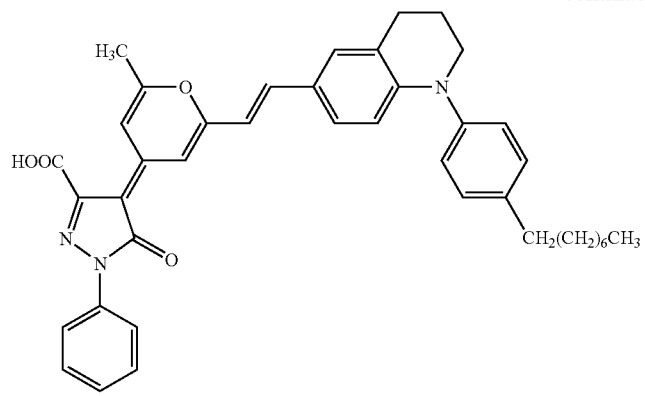
(153)
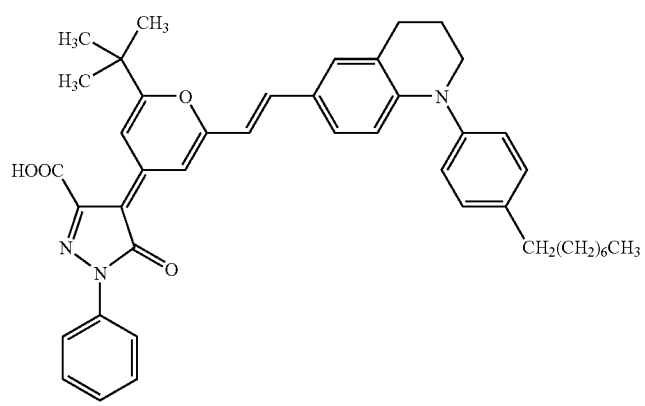
(154)
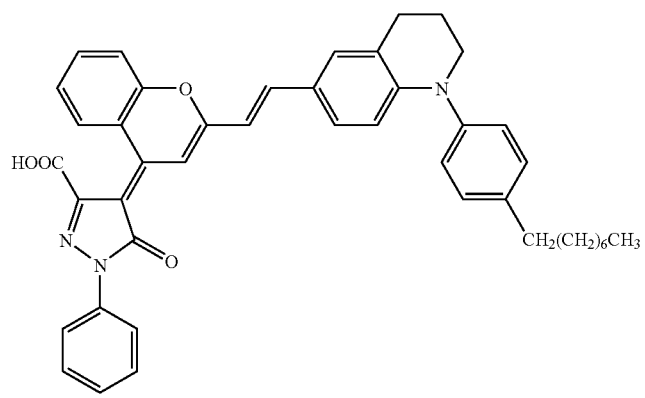
(155)
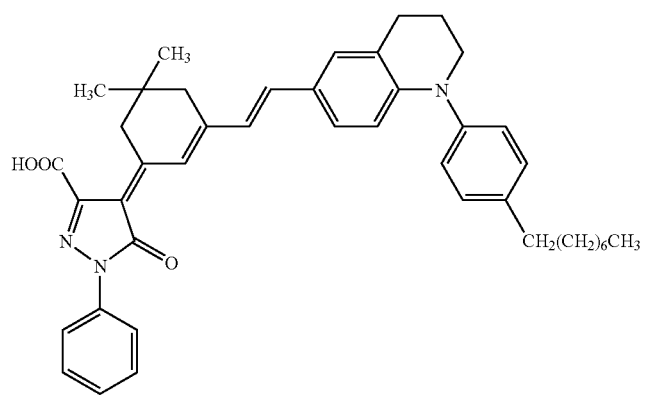
(156)

-continued
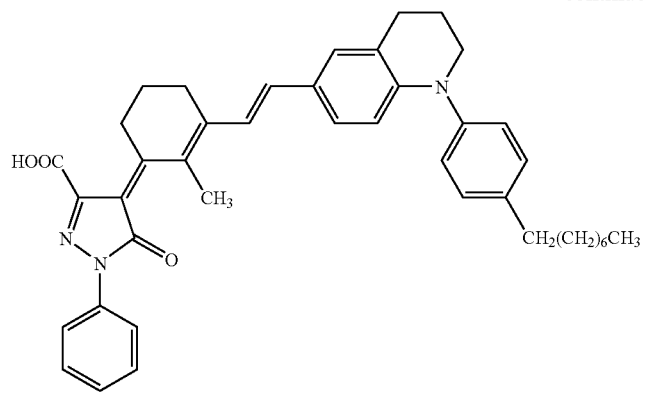
(157)
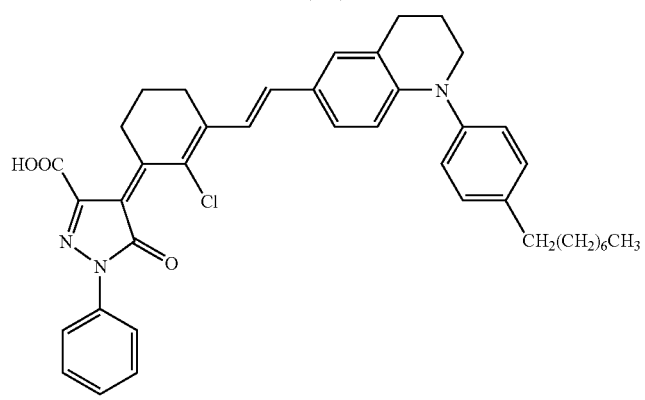
(158)
[KA 14]
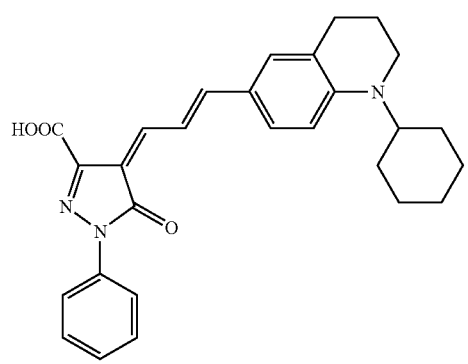
(159)
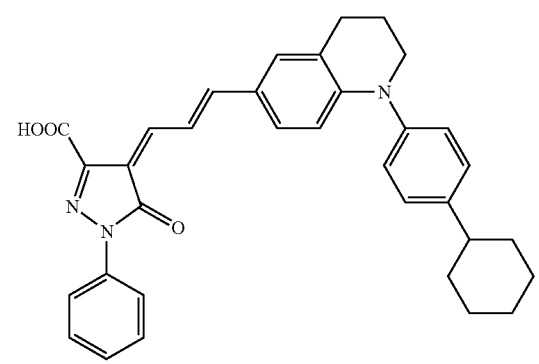
(160)
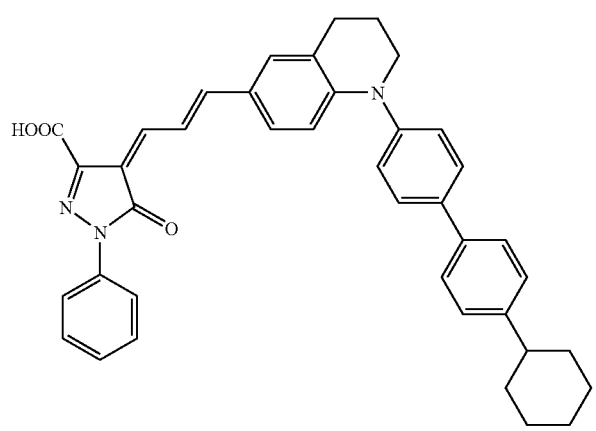
(161)
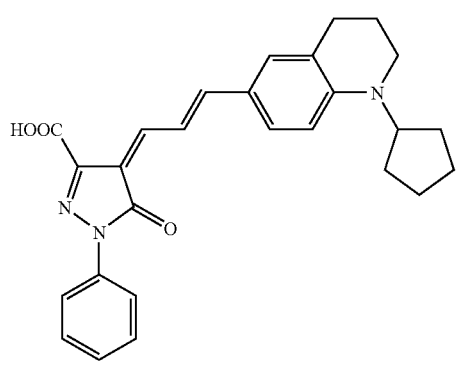
(162)

-continued
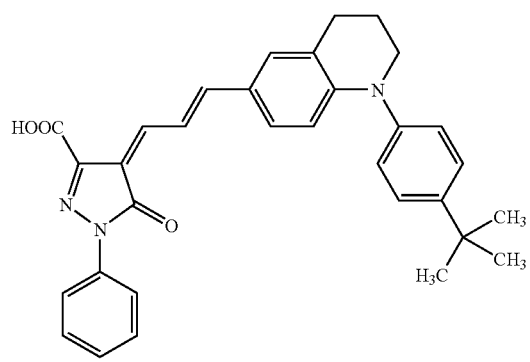
(163)
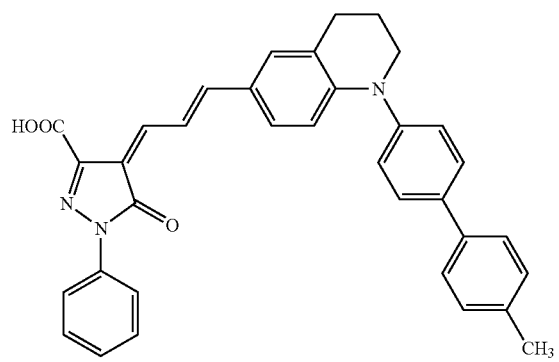
(164)
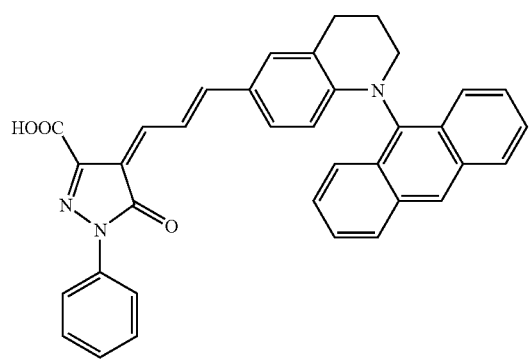
(165)
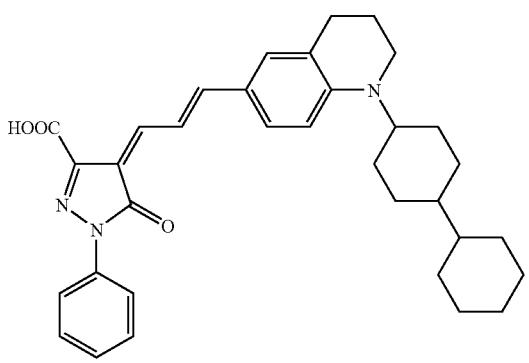
(166)
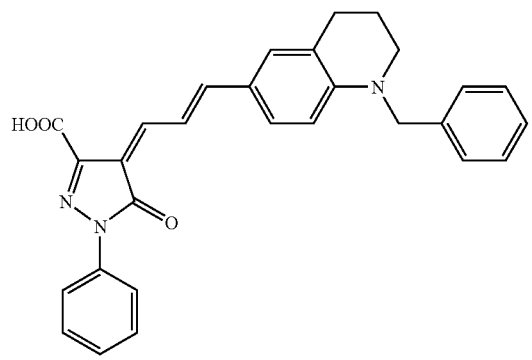
(167)
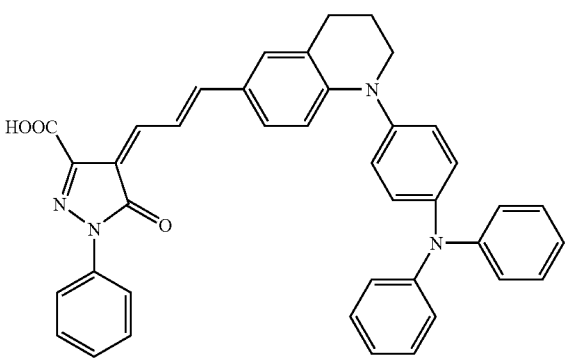
(168)
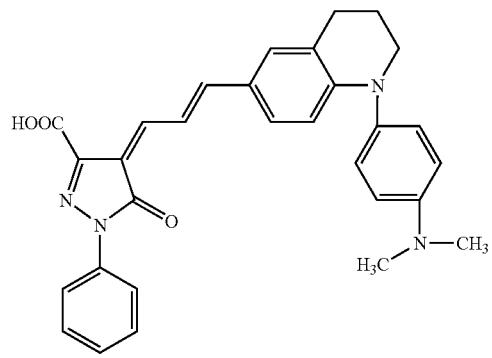
(169)
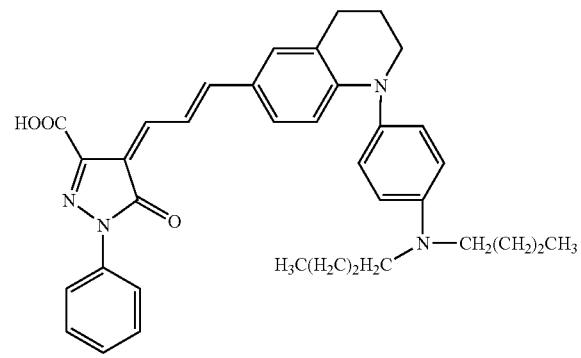
(170)

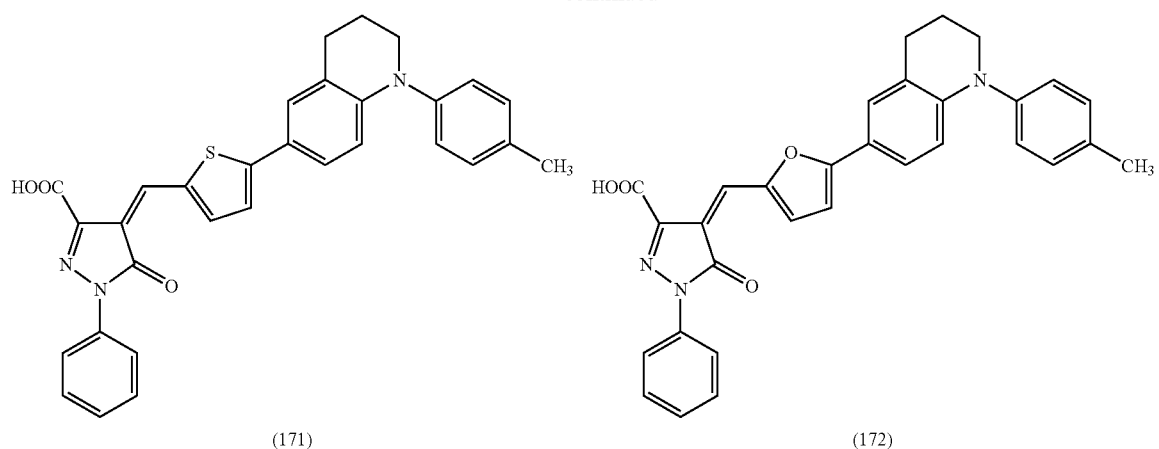
(171) (172)
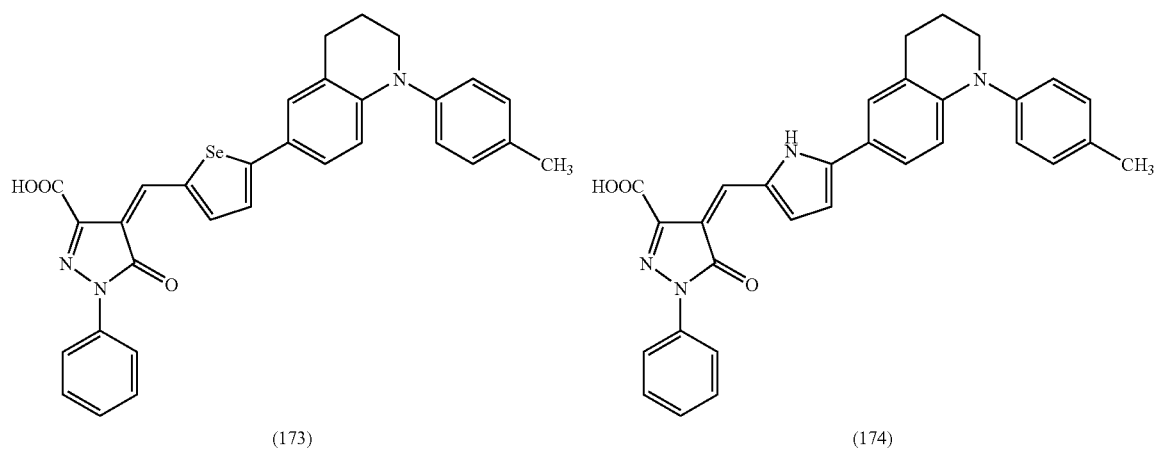
(173) (174)
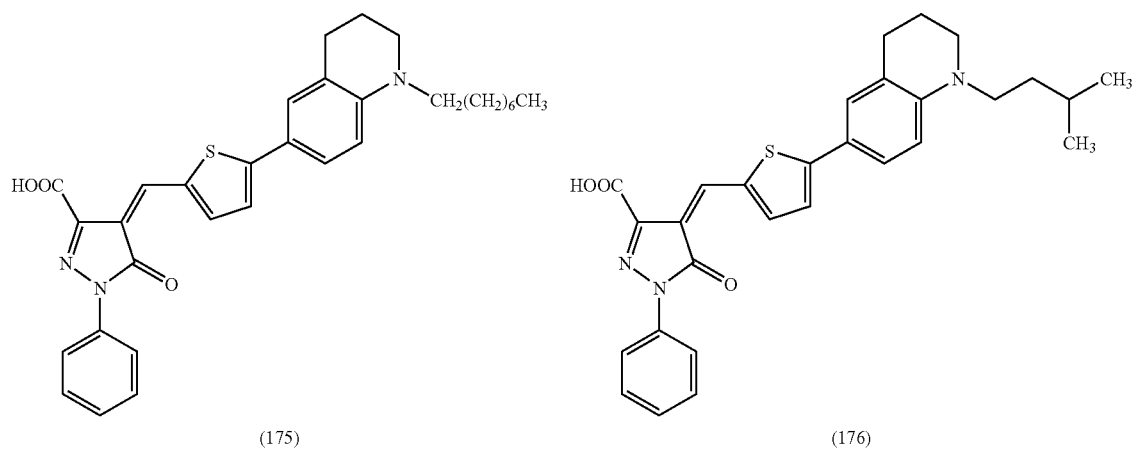
(175) (176)

-continued
[KA 15]
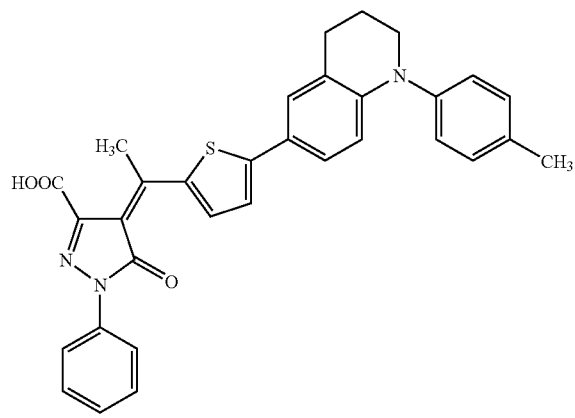
(177)
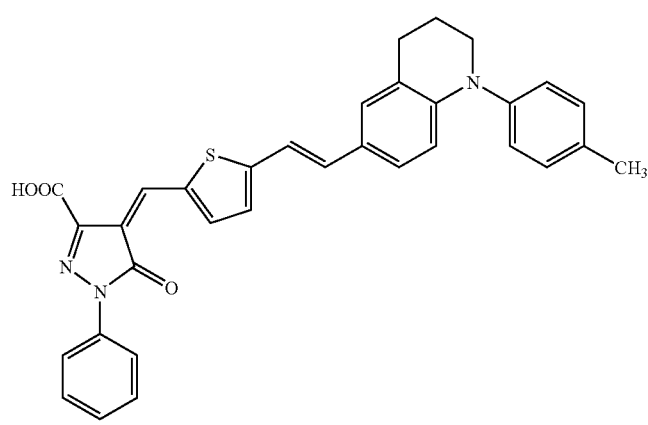
(178)
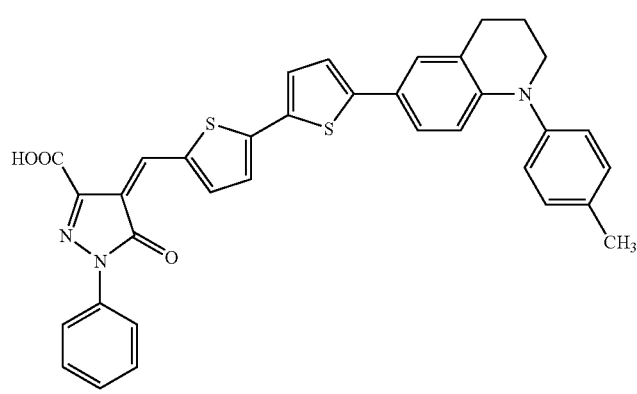
(179)

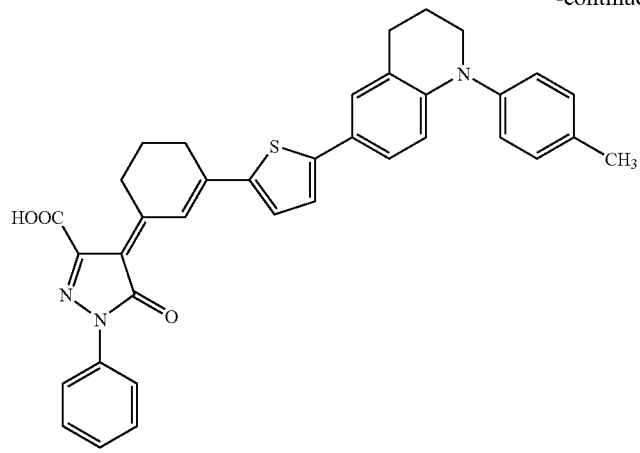
(180)
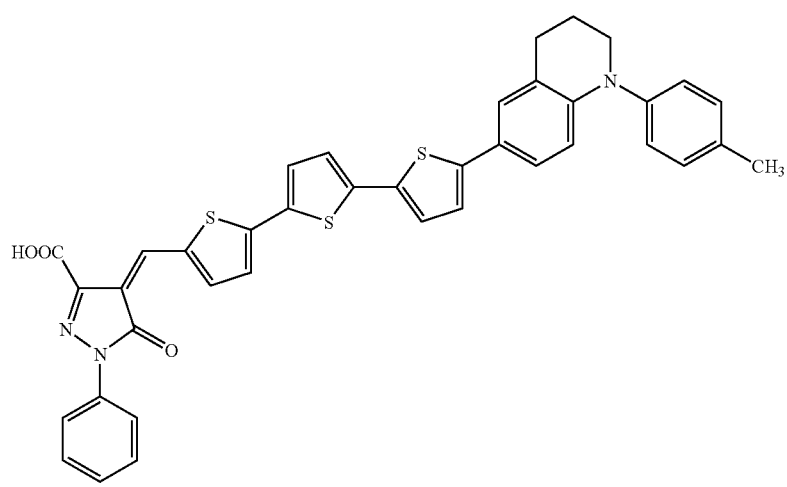
(181)
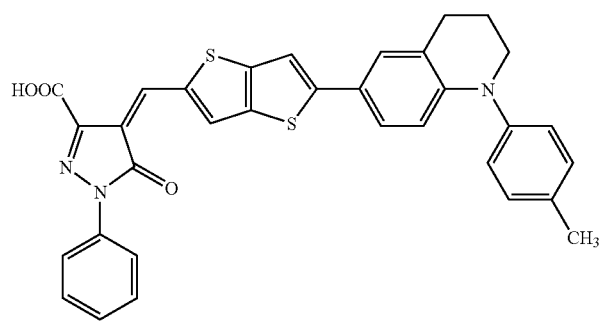
(182)

-continued
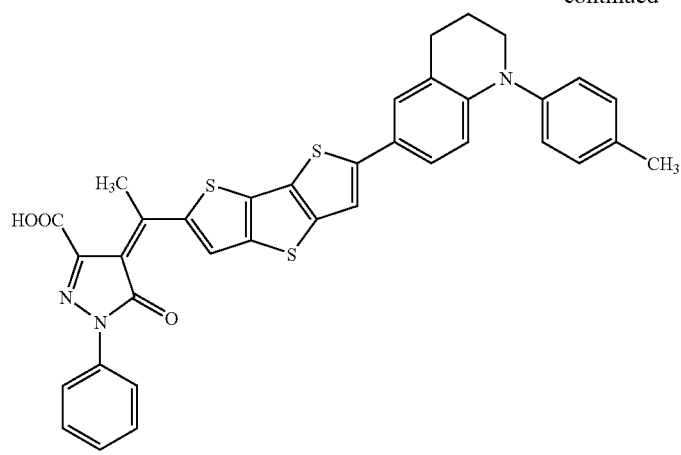
(183)
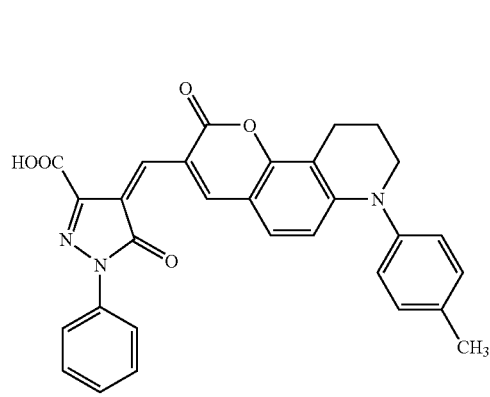
(184)
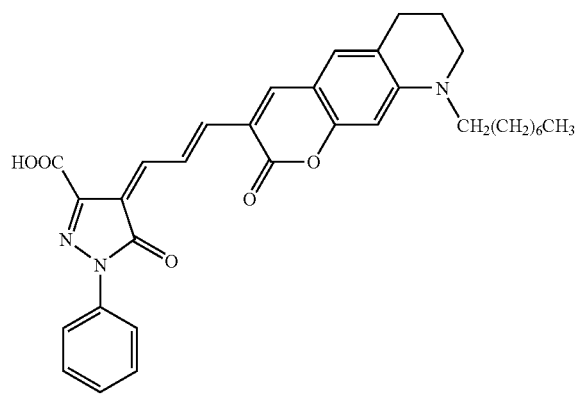
(185)
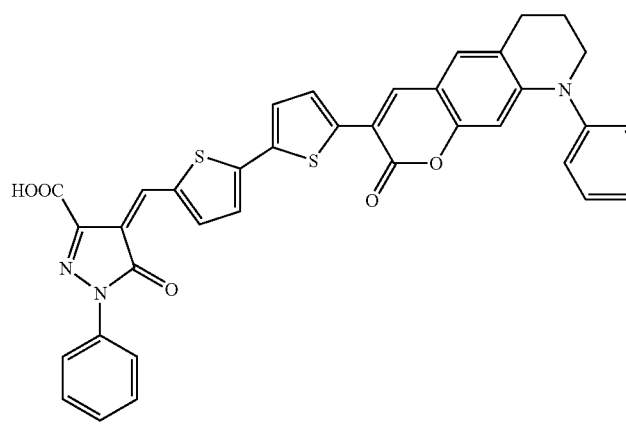
(186)
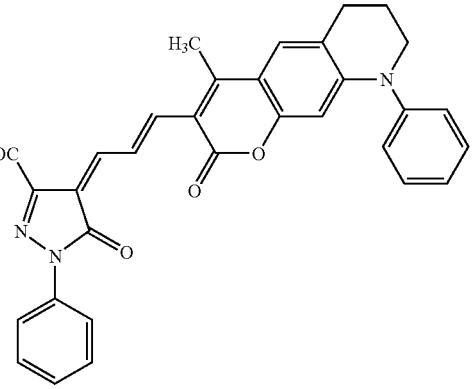
(187)

-continued
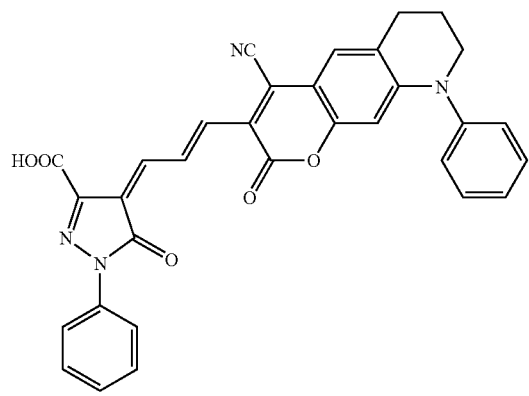
(188)
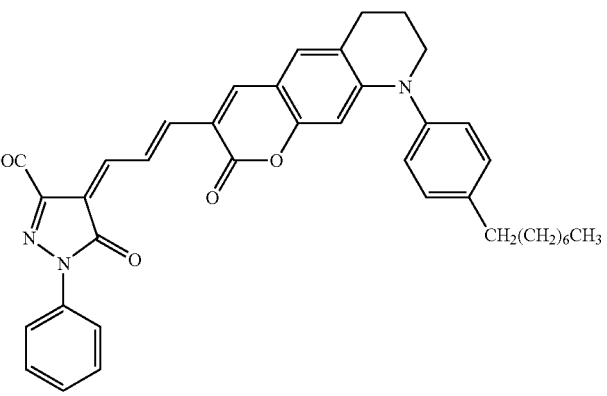
(189)
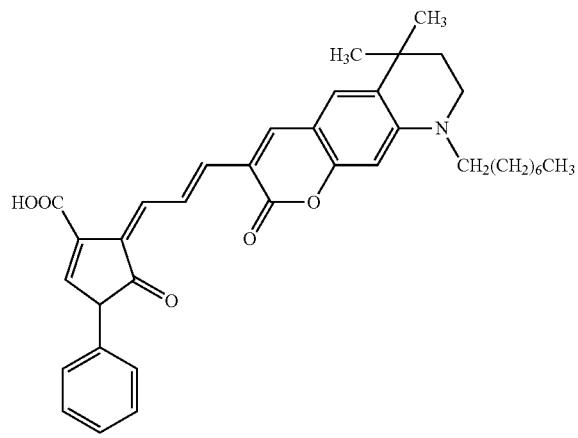
(190)
[KA 16]
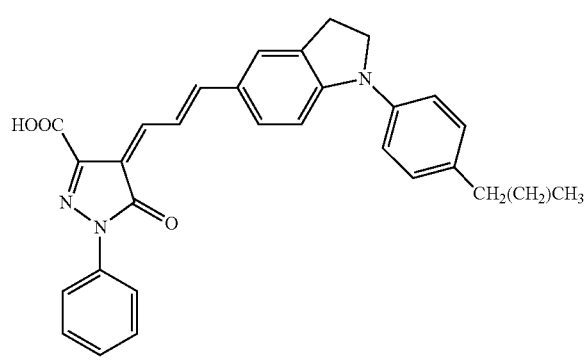
(191)
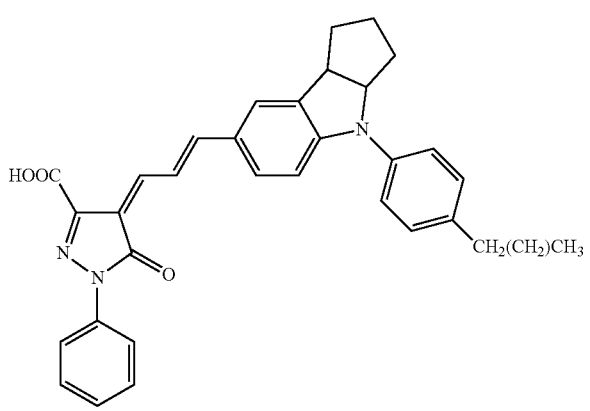
(192)

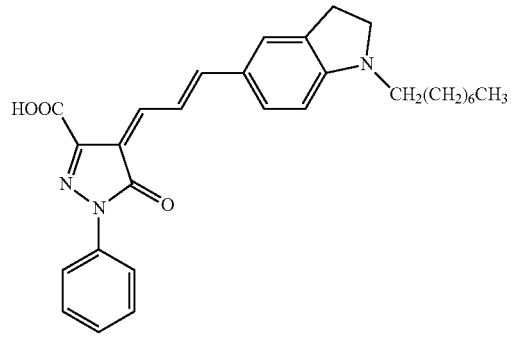
(193)
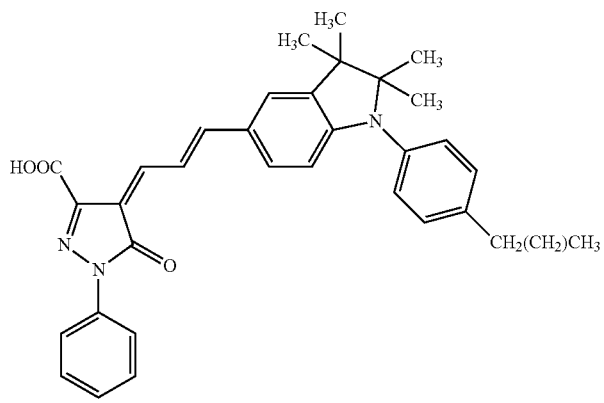
(194)
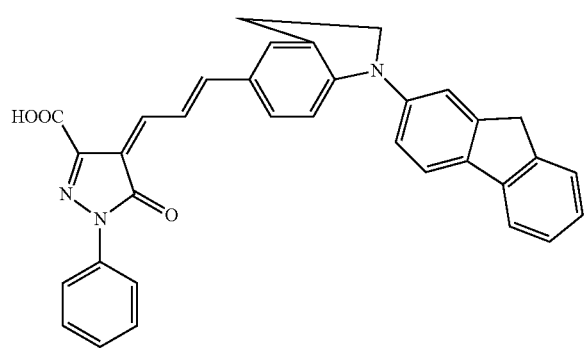
(195)
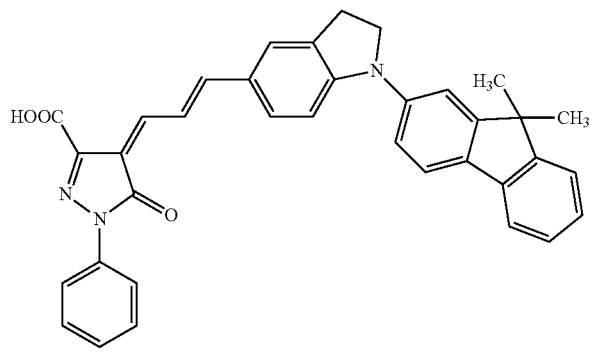
(196)
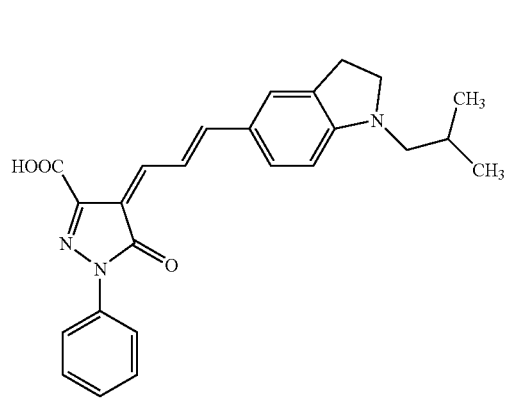
(197)
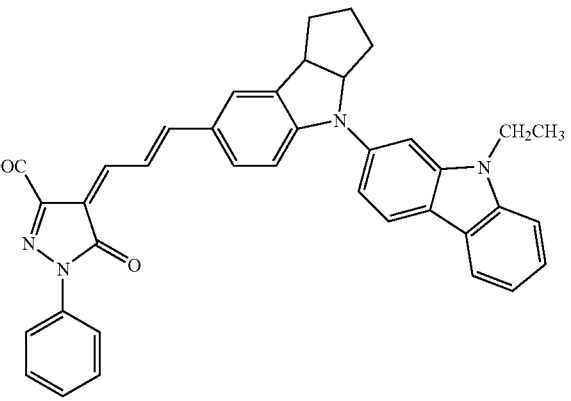
(198)
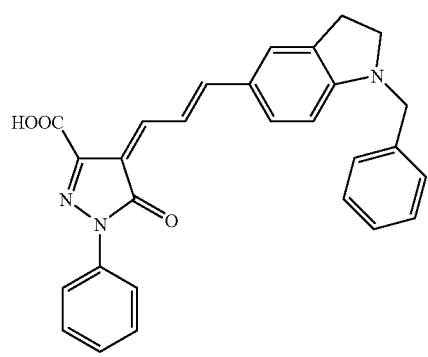
(199)
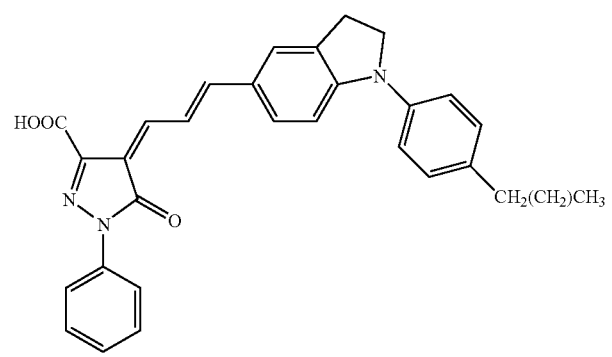
(200)

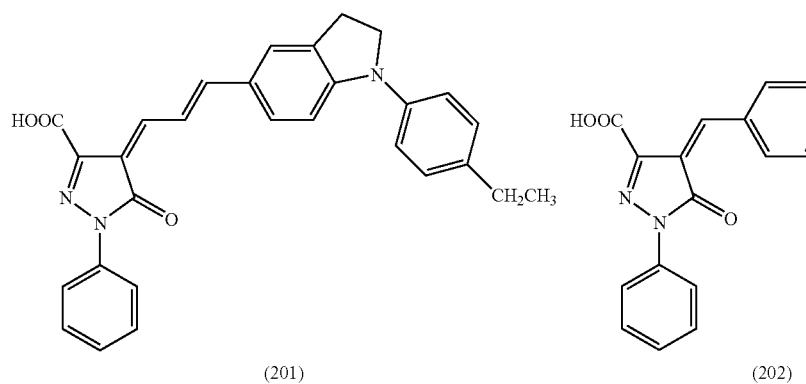
(201) (202)
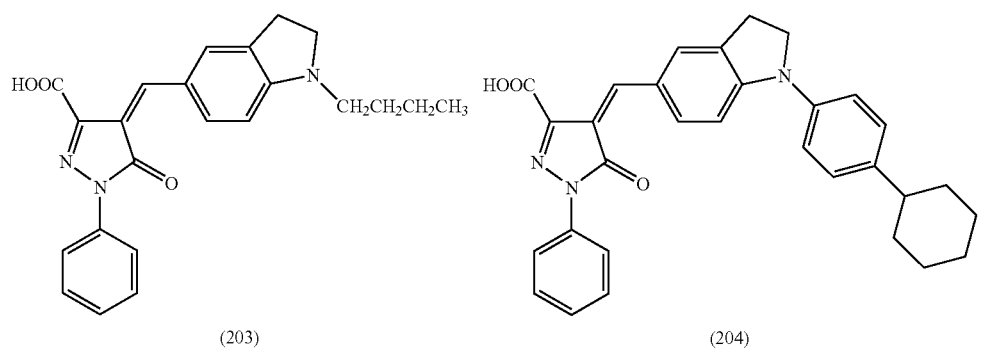
(203) (204)
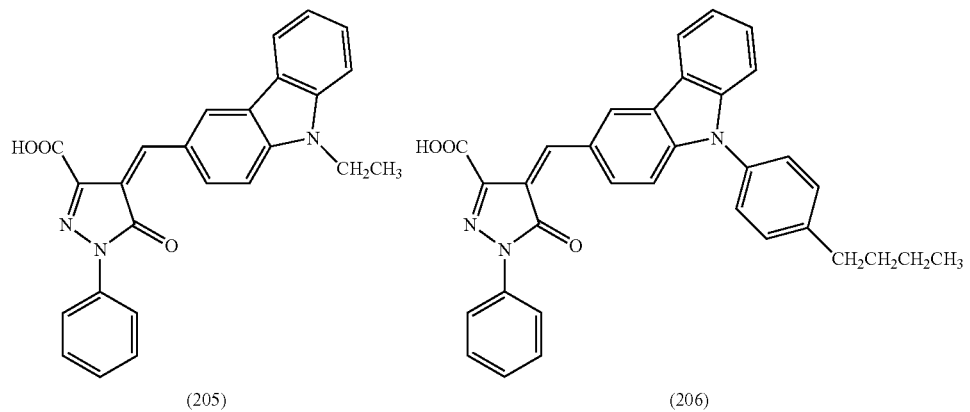
(205) (206)
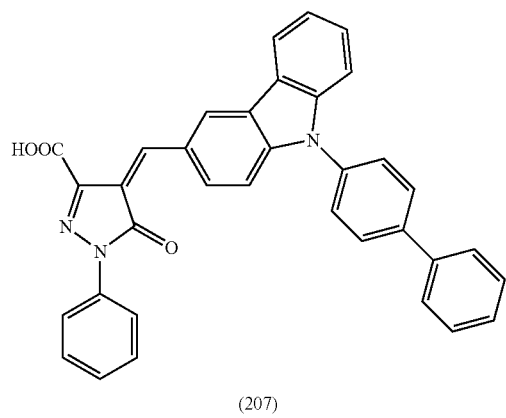
(207)

[KA 17]
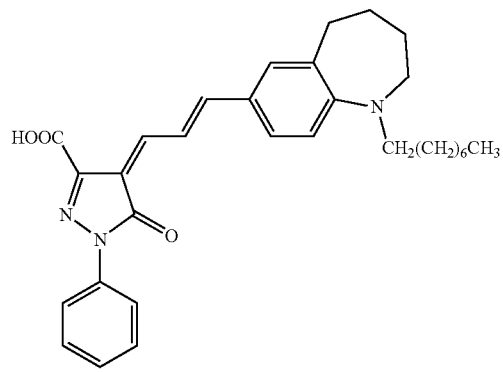
(208)
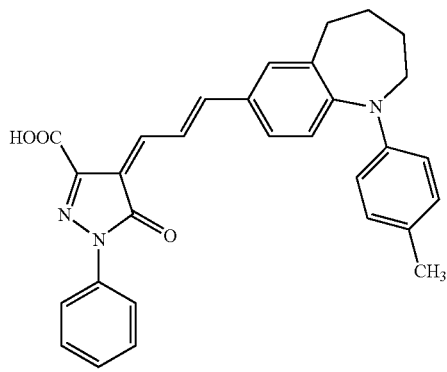
(209)
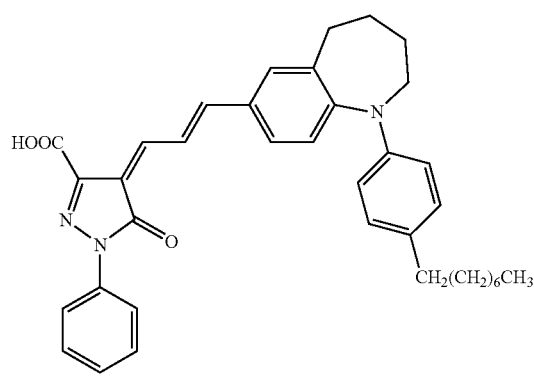
(210)
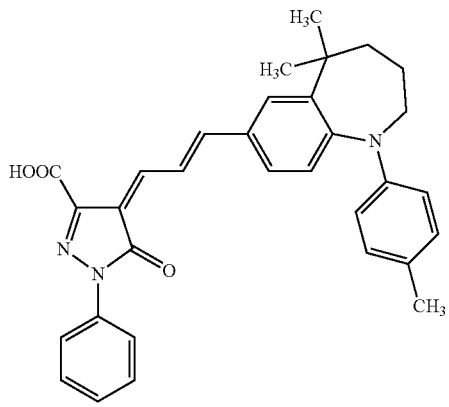
(211)
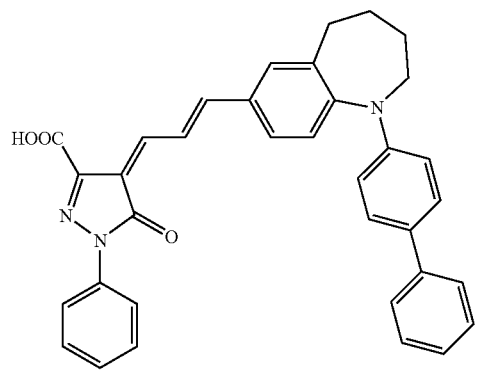
(212)
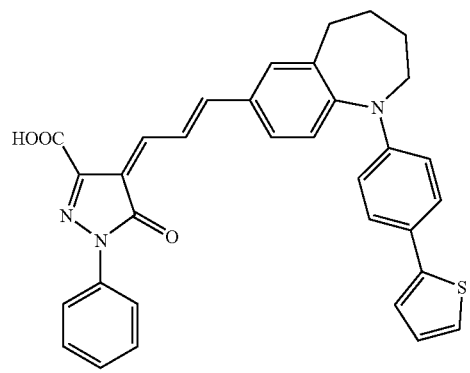
(213)
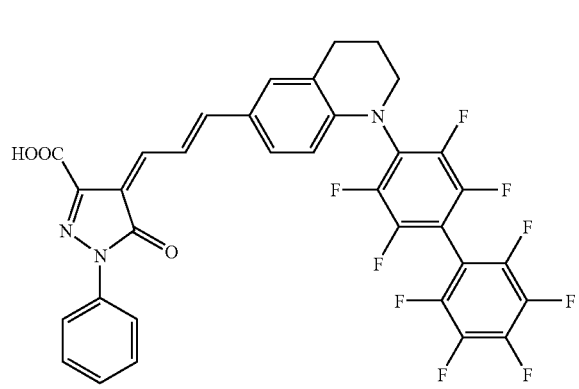
(214)
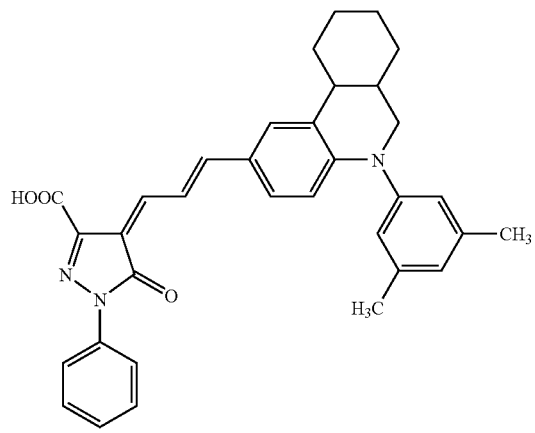
(215)

-continued
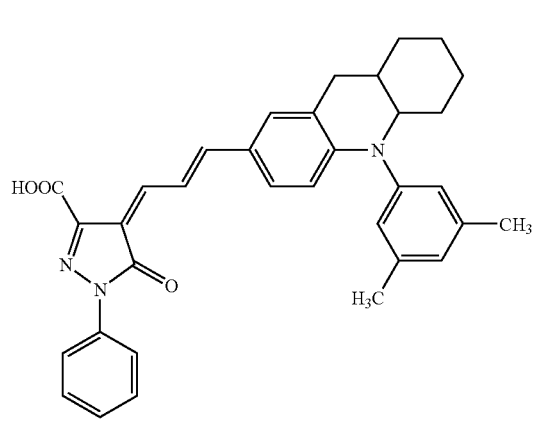
(216)
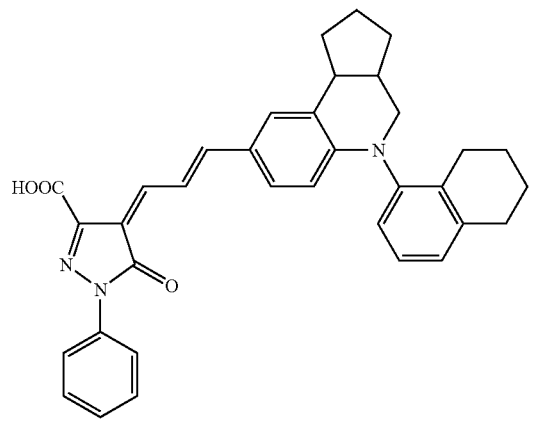
(217)
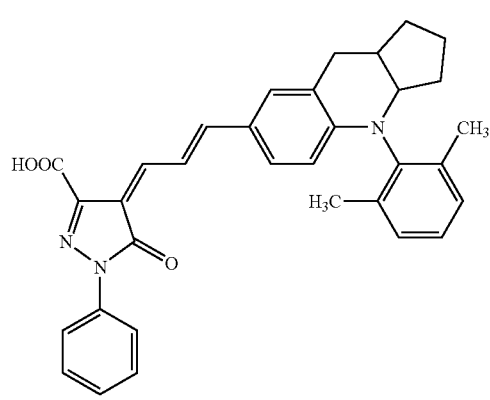
(218)
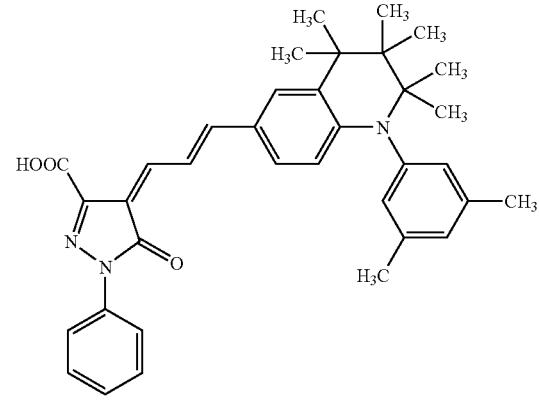
(219)
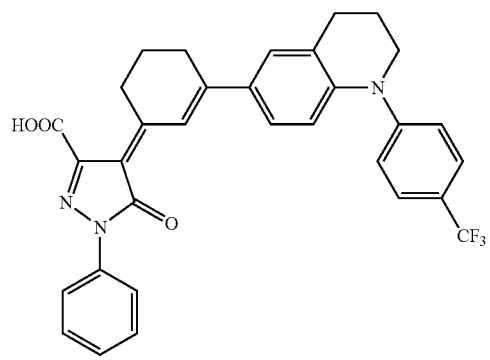
(220)
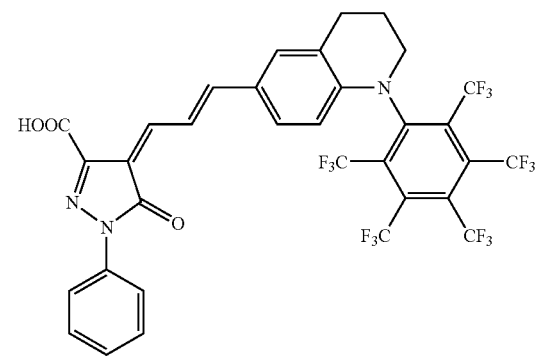
(221)
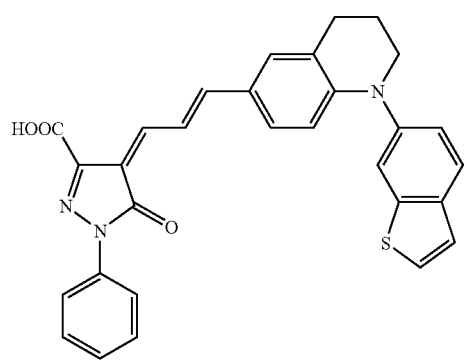
(222)
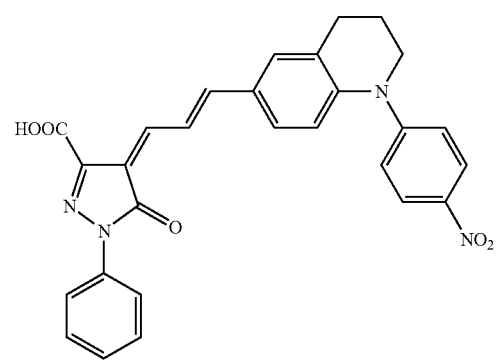
(223)

-continued
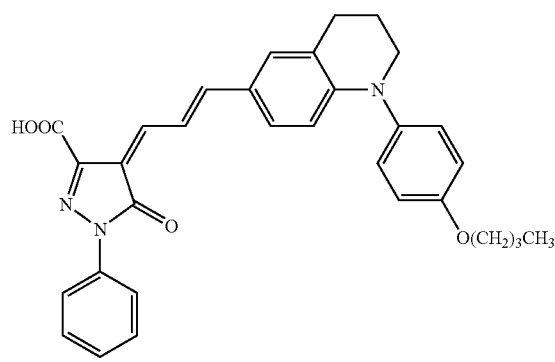
(224)
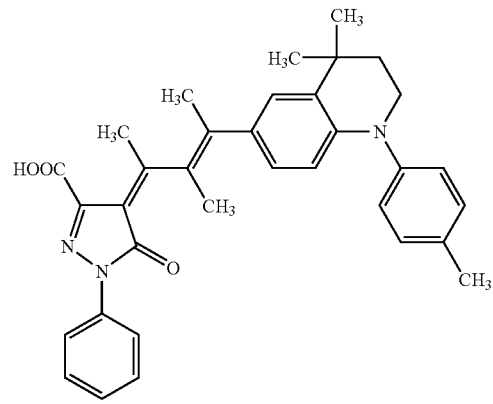
(225)
[KA 18]
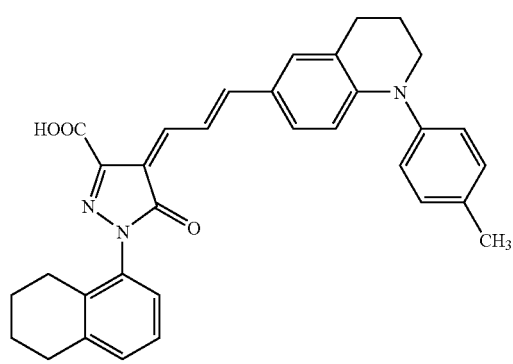
(226)
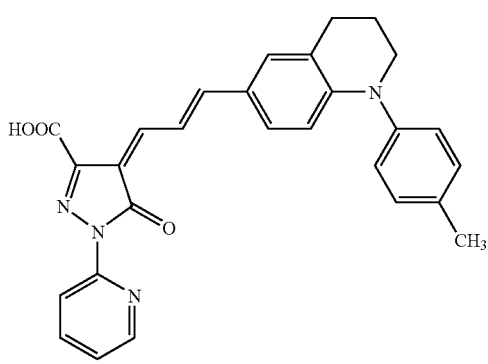
(227)
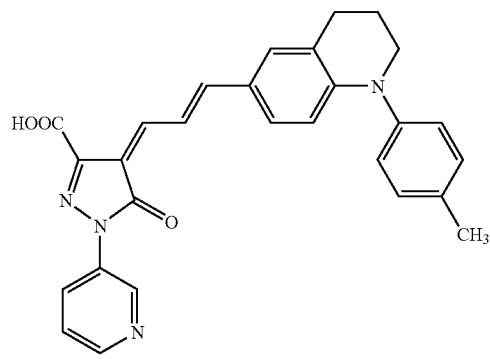
(228)
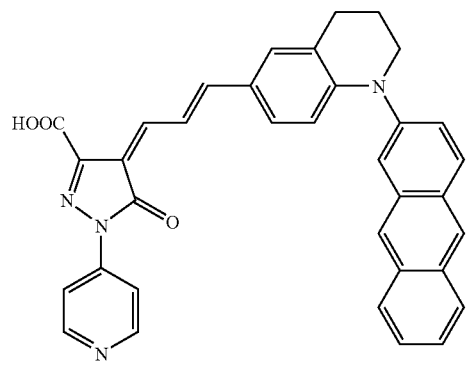
(229)
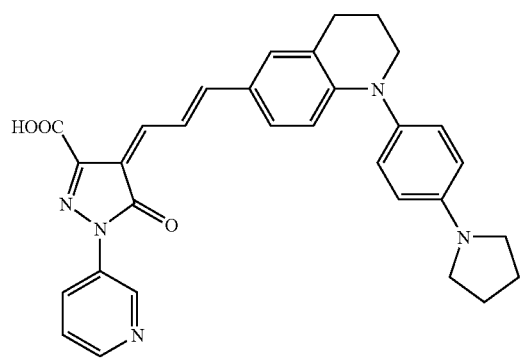
(230)
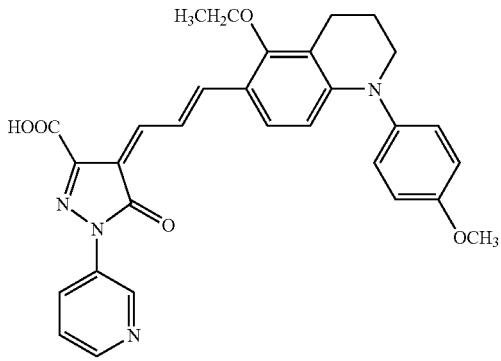
(231)

-continued
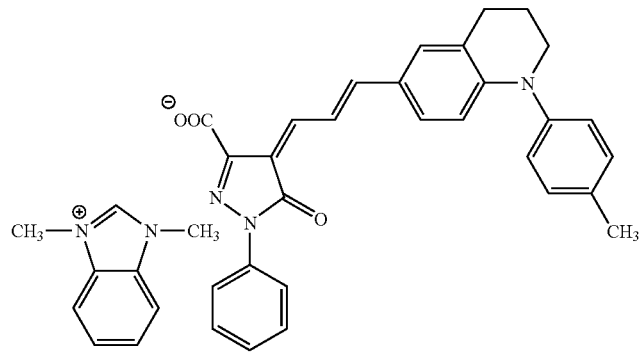
(232)
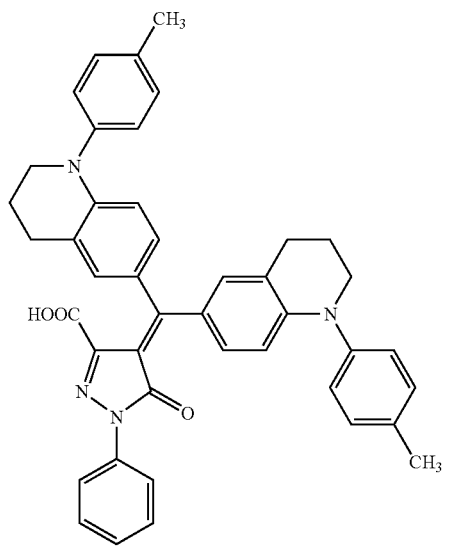
(233)
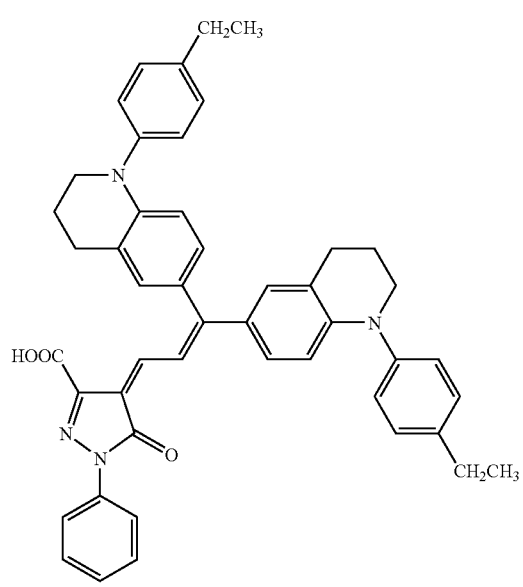
(234)
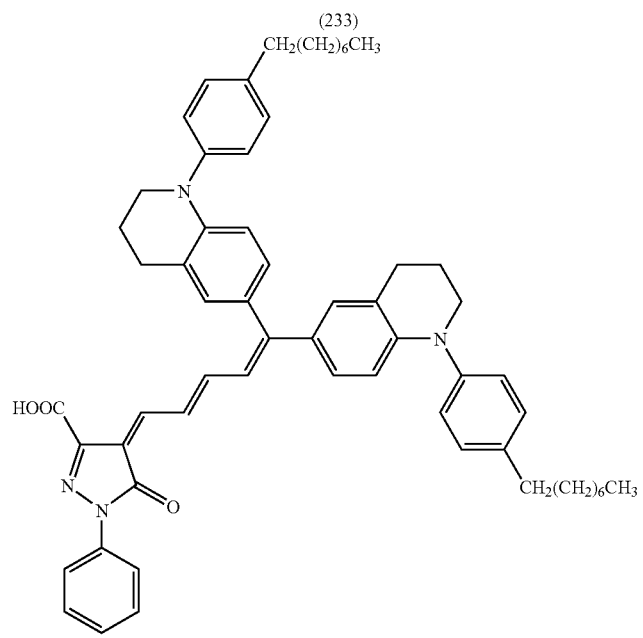
(235)
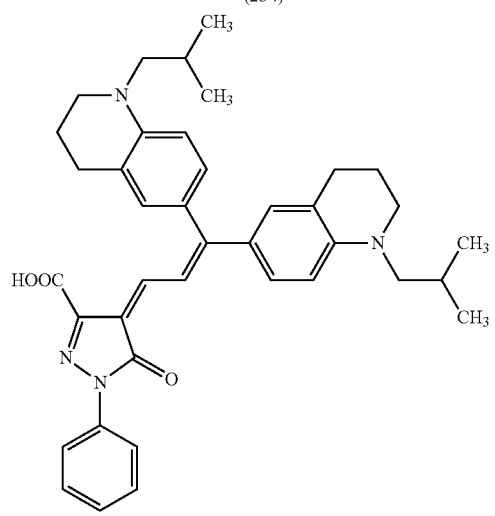
(236)
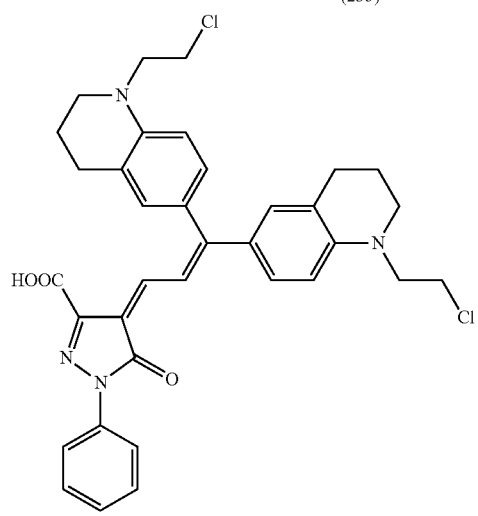
(237)

-continued
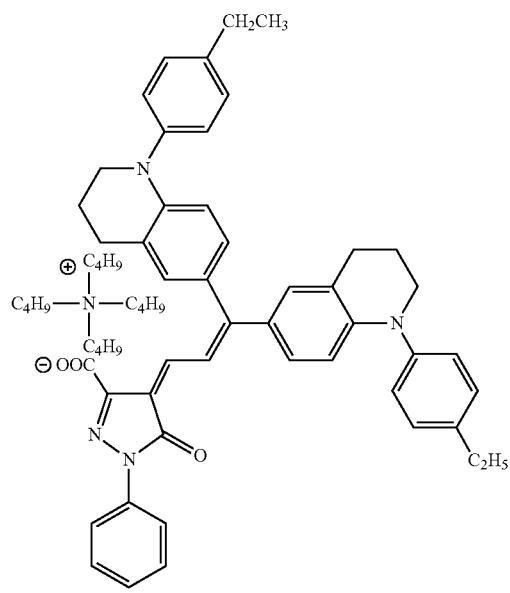
(238)
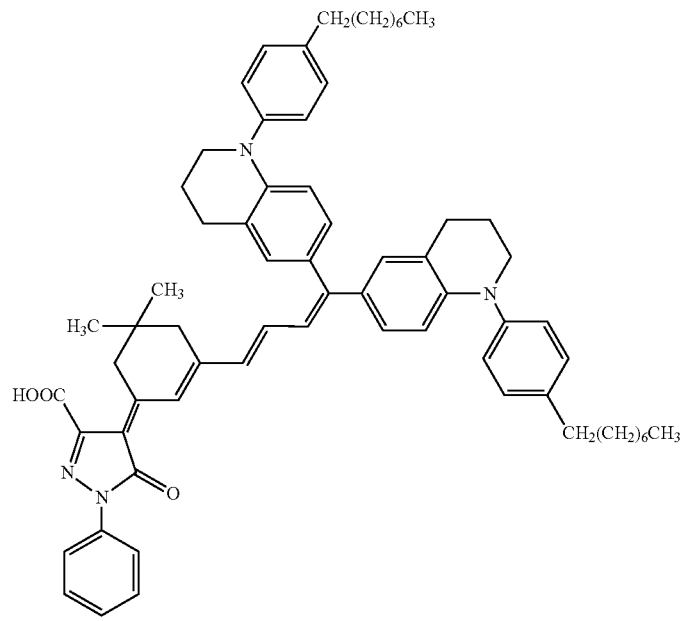
(239)
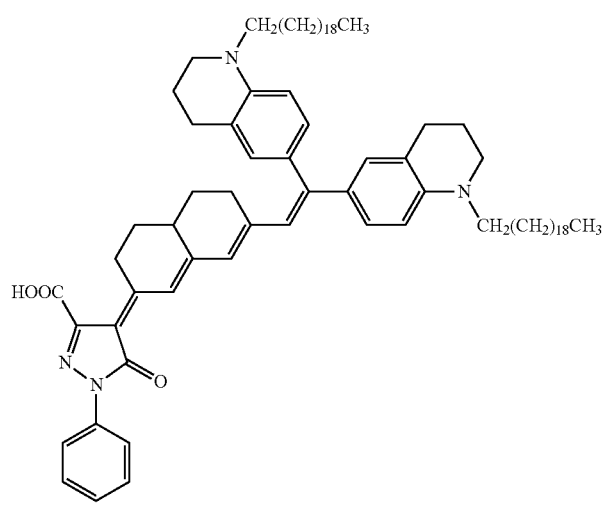
(240)
[KA 19]
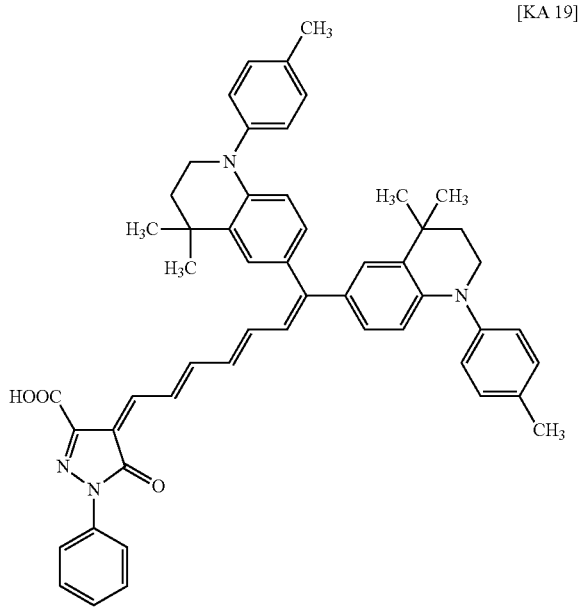
(241)
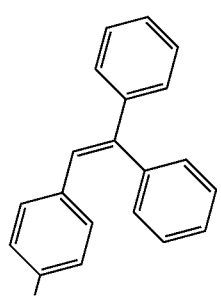

-continued
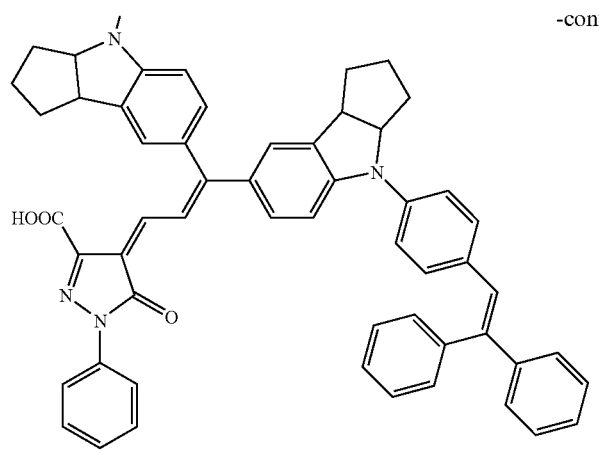
(242)
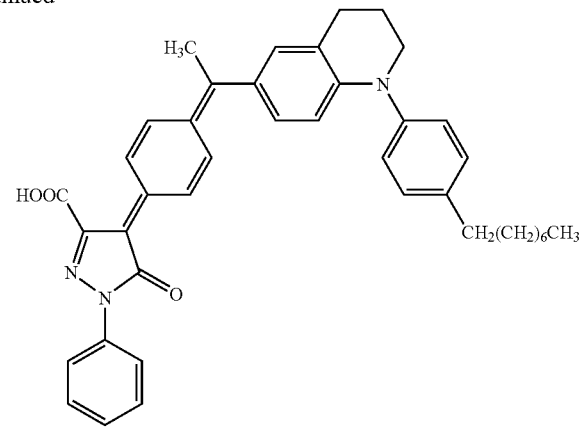
(243)
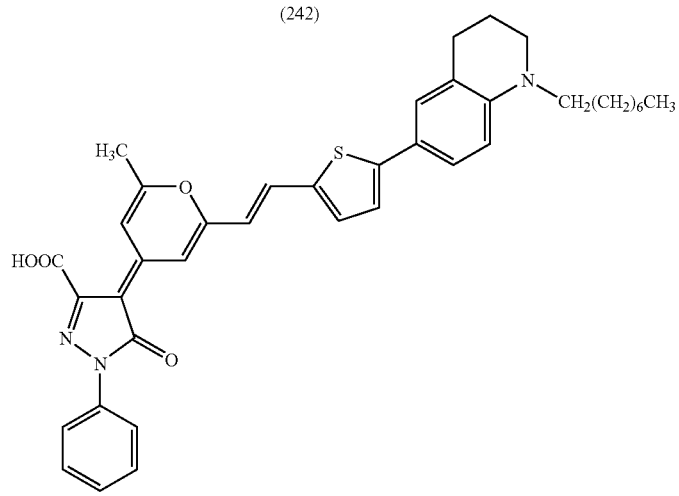
(244)
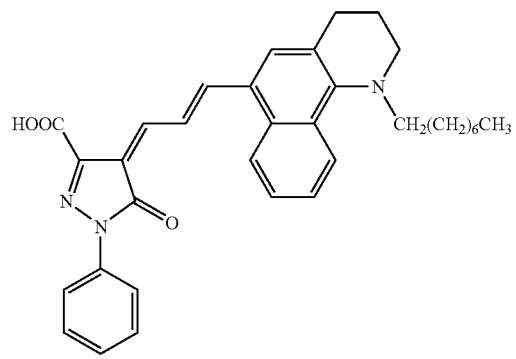
(245)
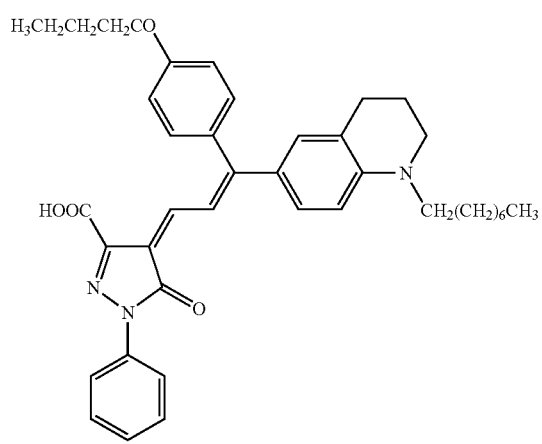
(246)
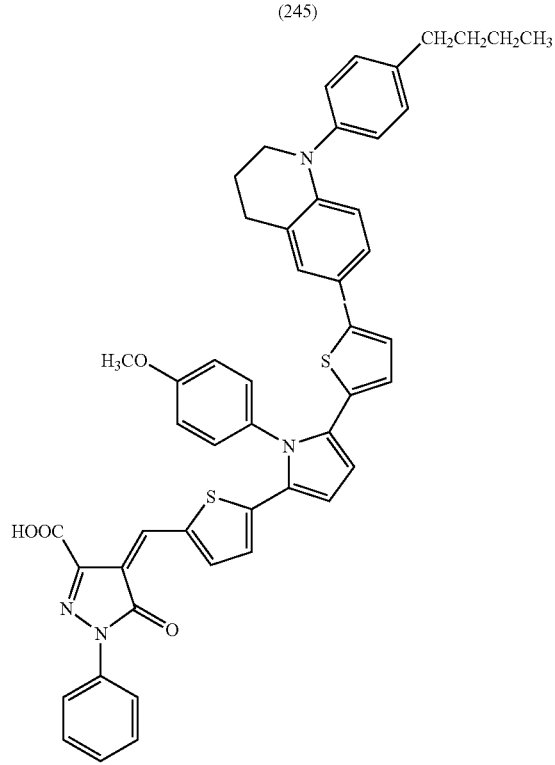
(247)

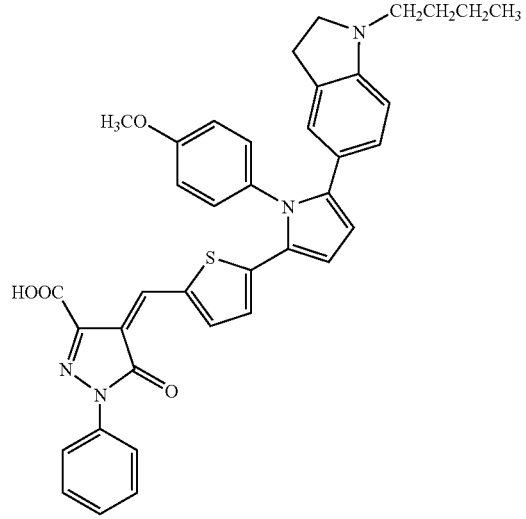
(248)
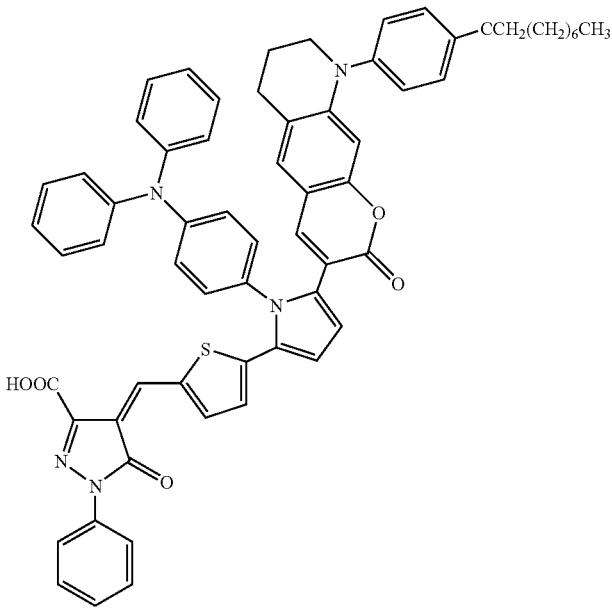
(249)
[KA 20]
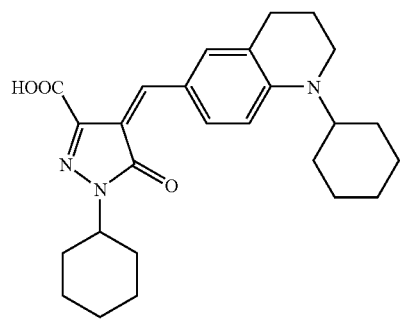
(250)
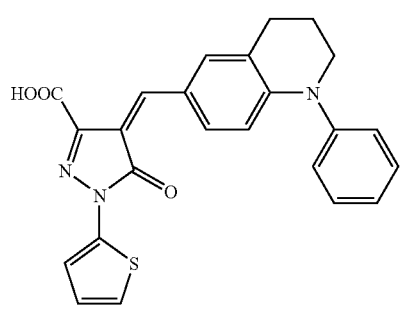
(251)
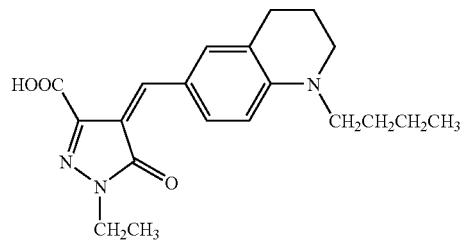
(252)
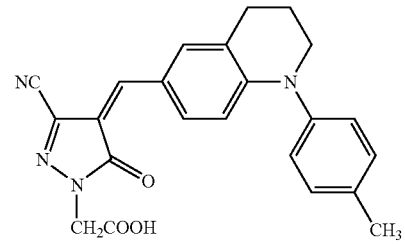
(253)
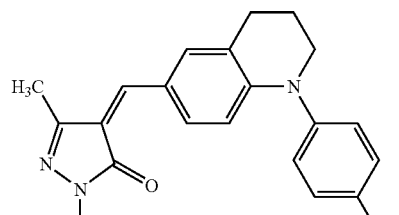
(254)
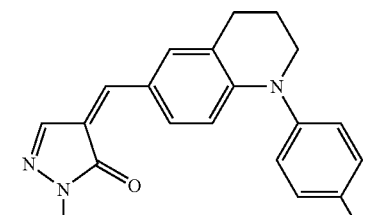
(255)
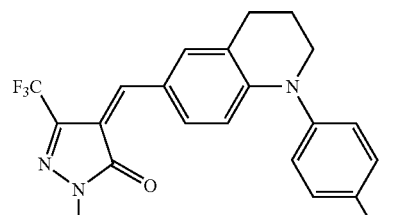
(256)

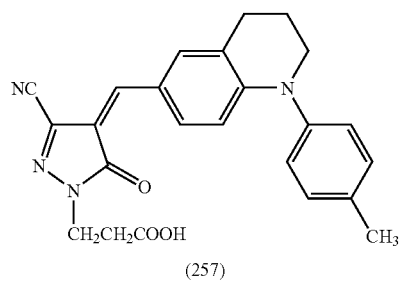
(257)
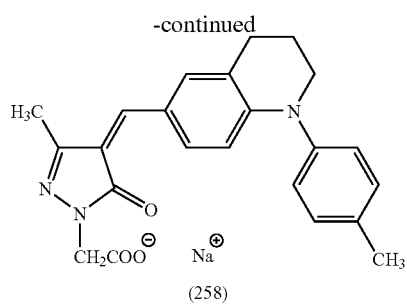
(258)
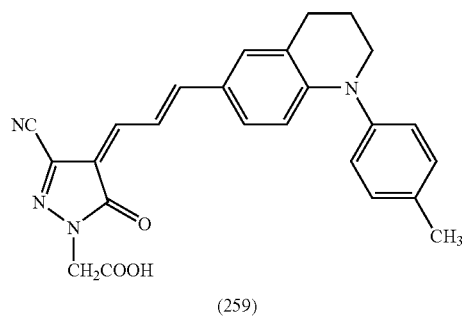
(259)
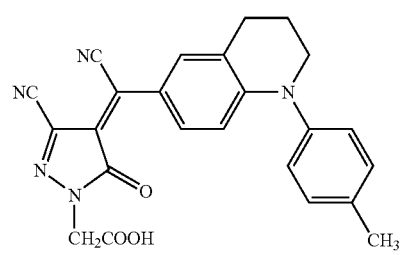
(260)
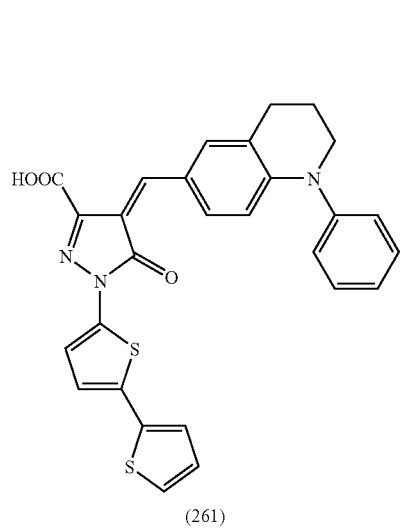
(261)
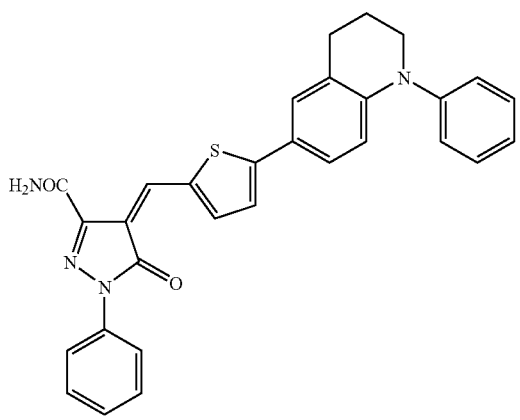
(262)
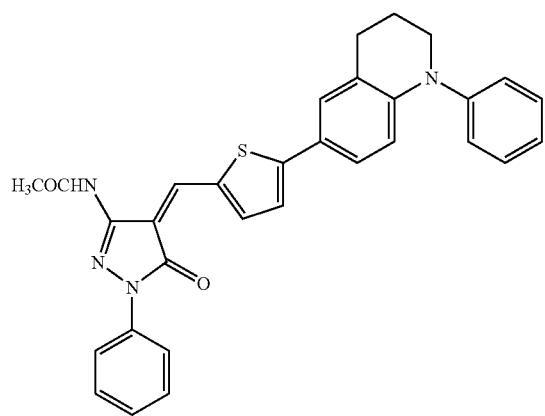
(263)
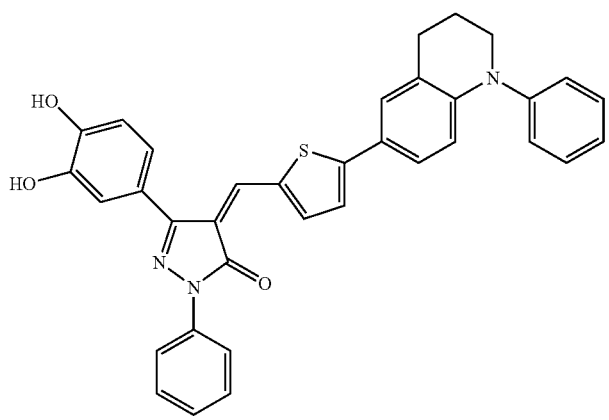
(264)

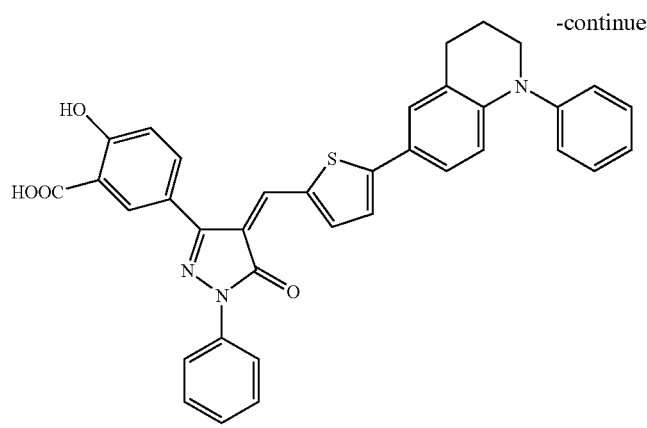
(265)
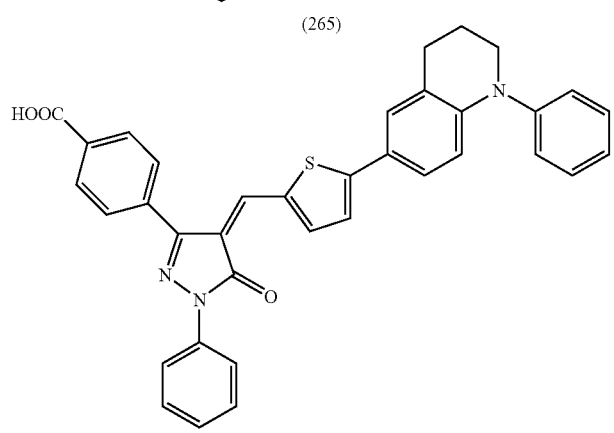
(266)
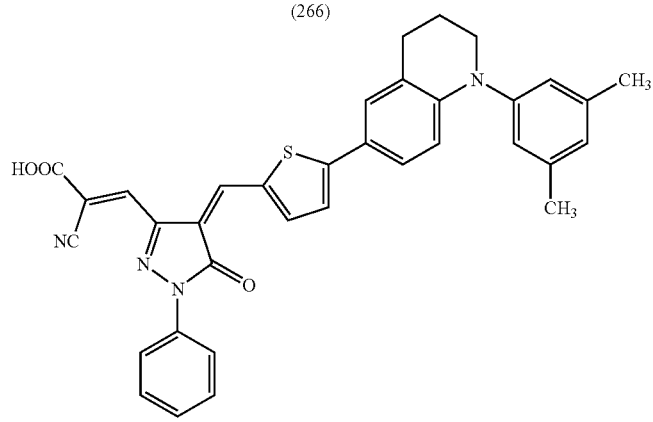
(267)
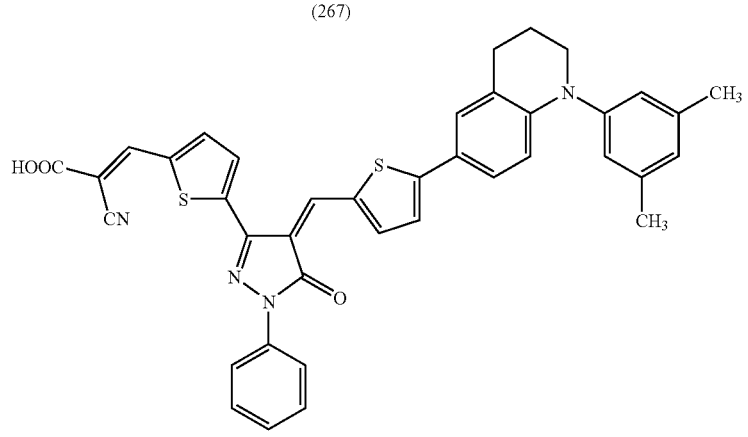
(268)

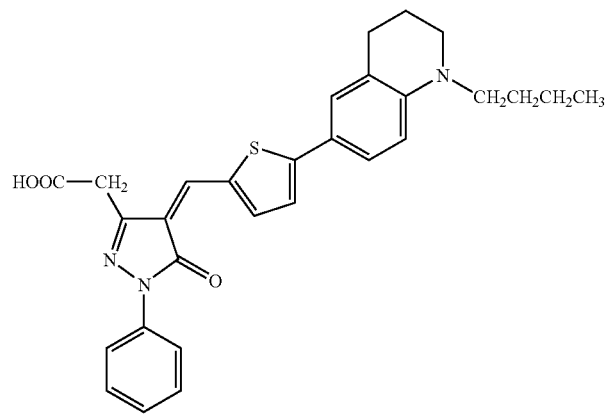
(269)
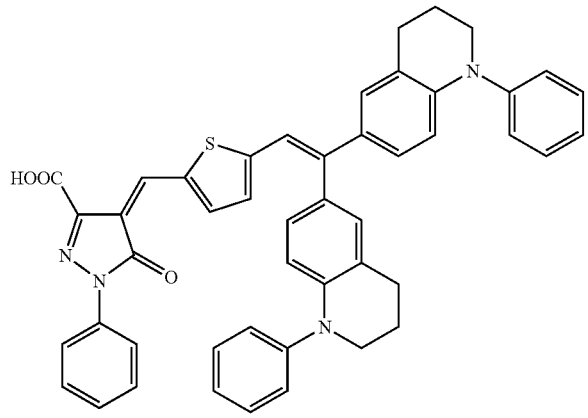
[KA 21]
(270)
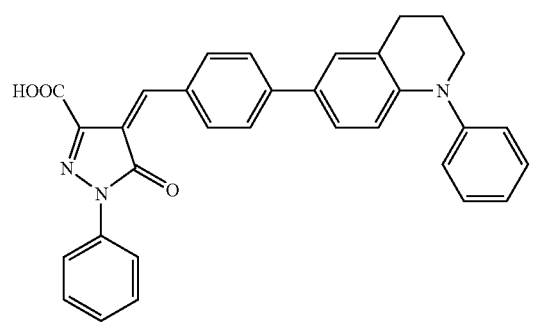
(271)
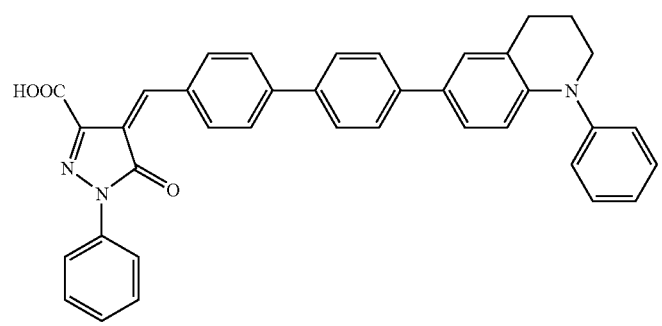
(272)
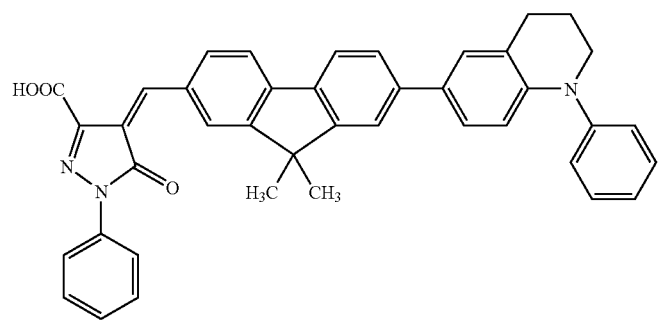
(273)

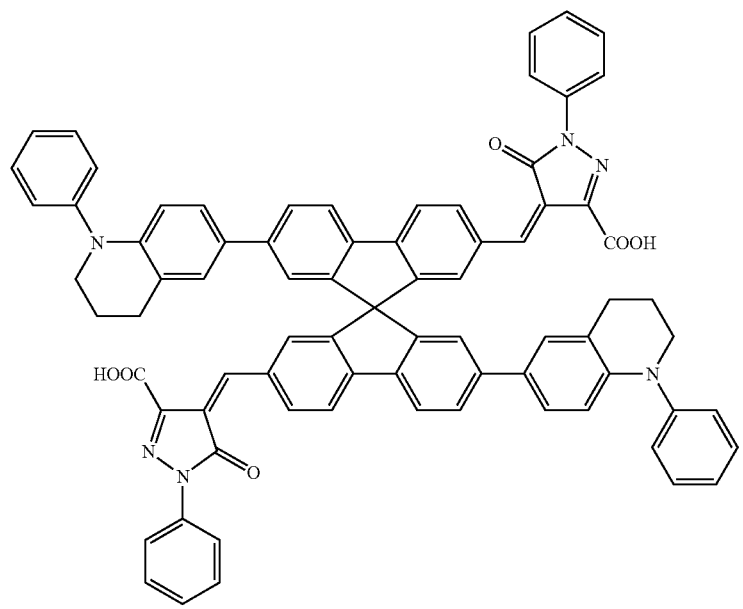
(274)
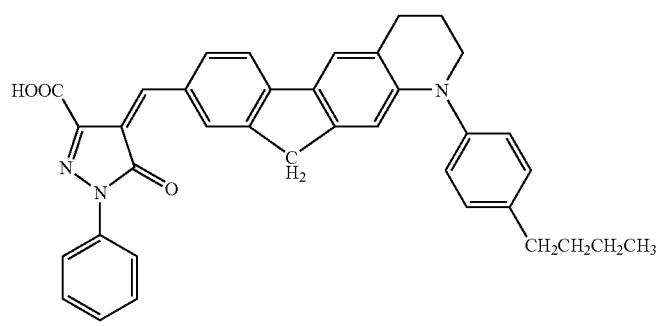
(275)
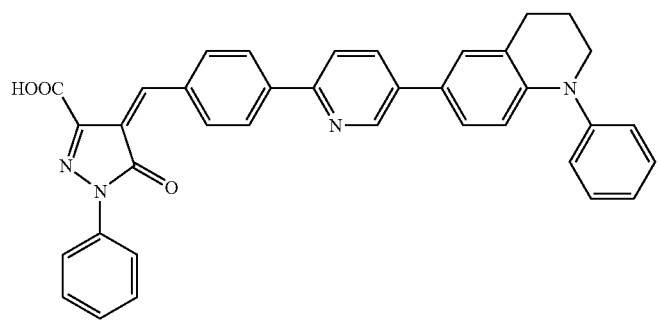
(276)

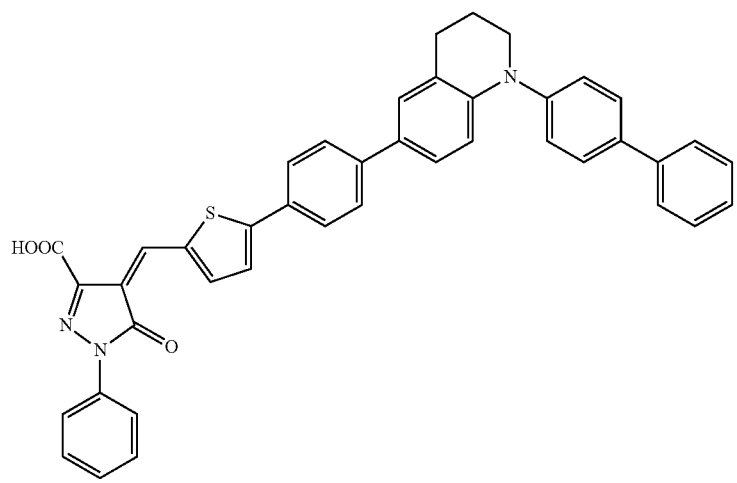
(277)
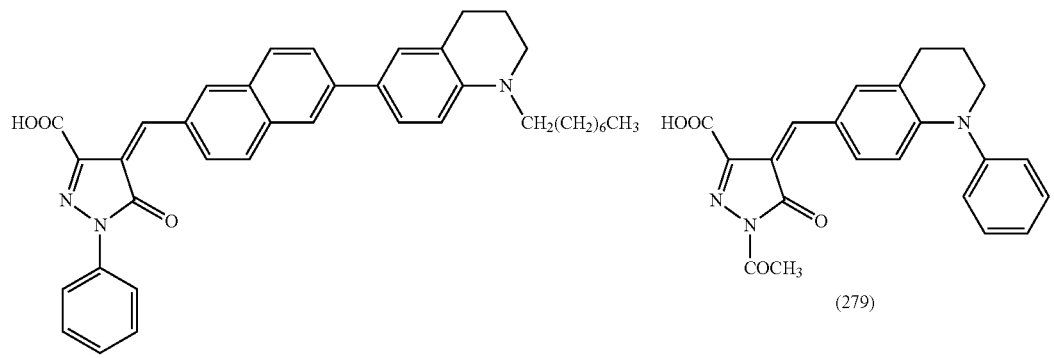
(278)  (279)
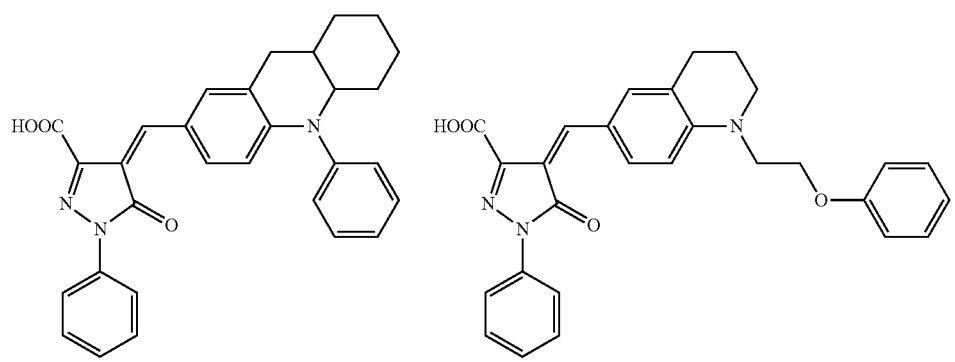
(280)  (281)

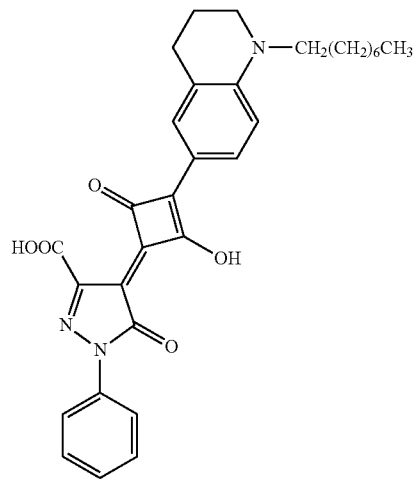
(282)
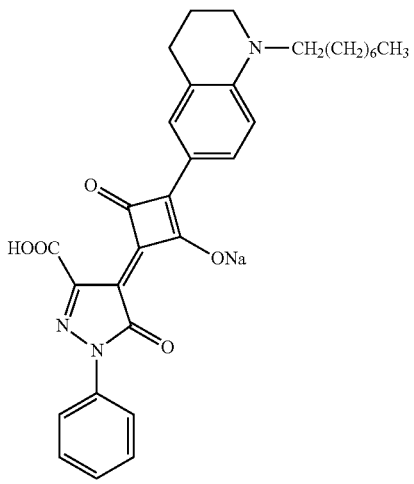
(283)
[KA 22]
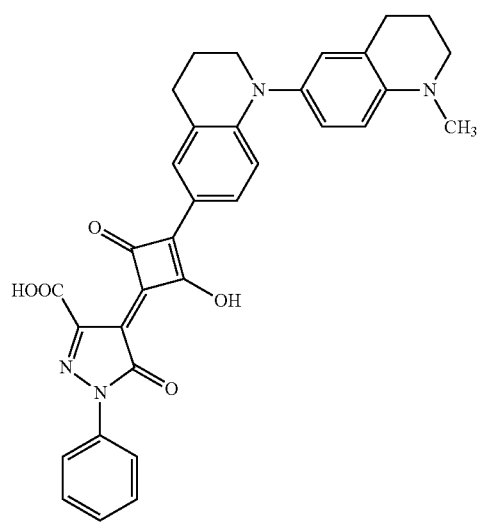
(284)
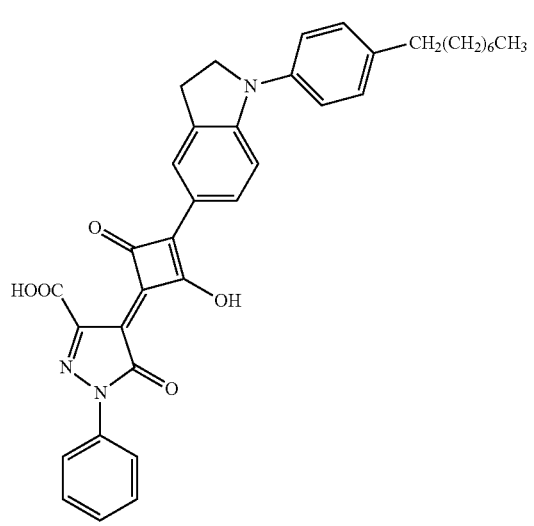
(285)
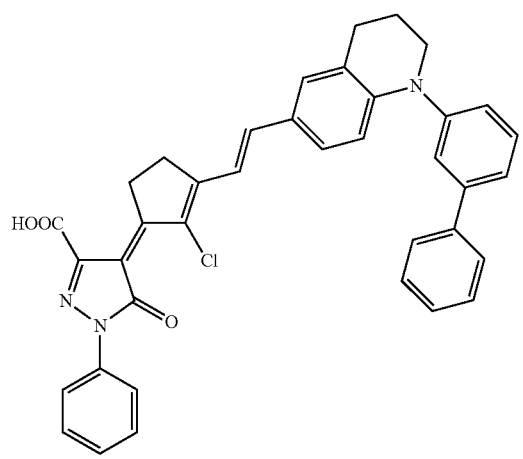
(286)
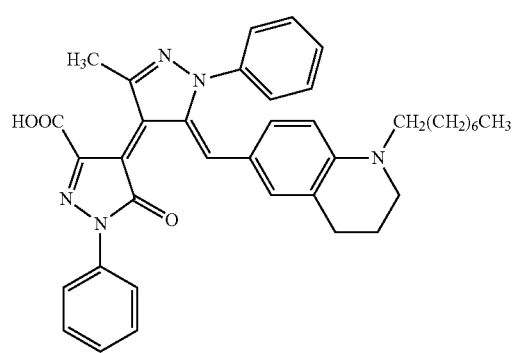
(287)

-continued
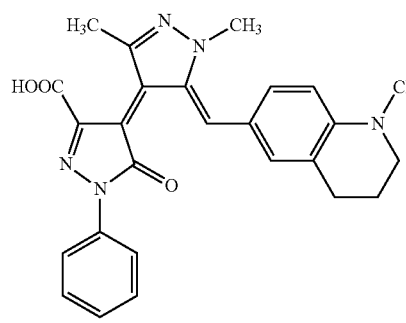
(288)
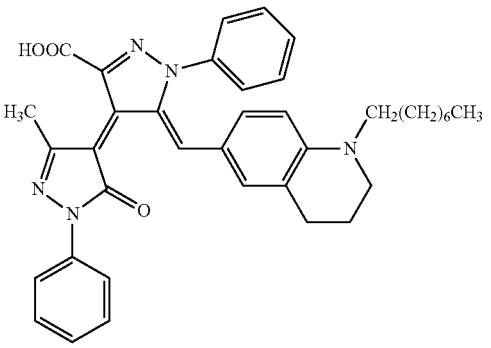
(289)
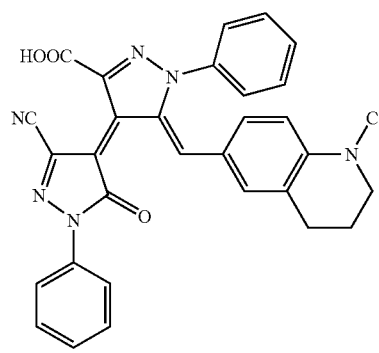
(290)
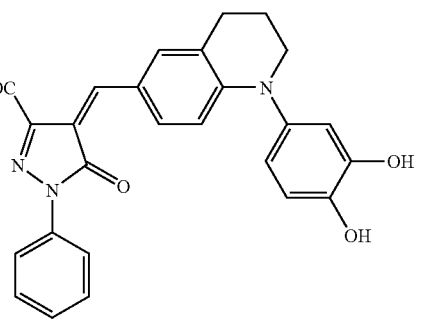
(291)
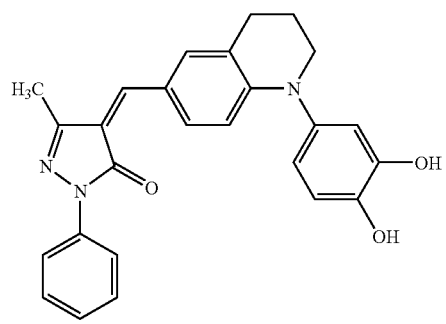
(292)
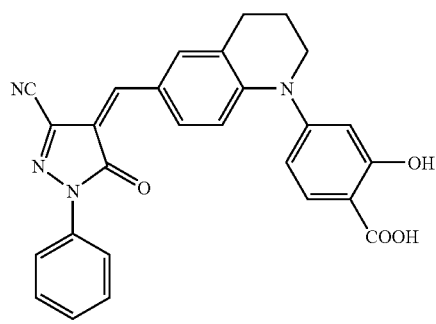
(293)
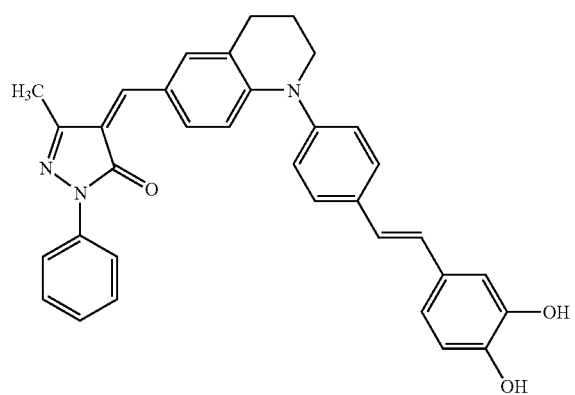
(294)
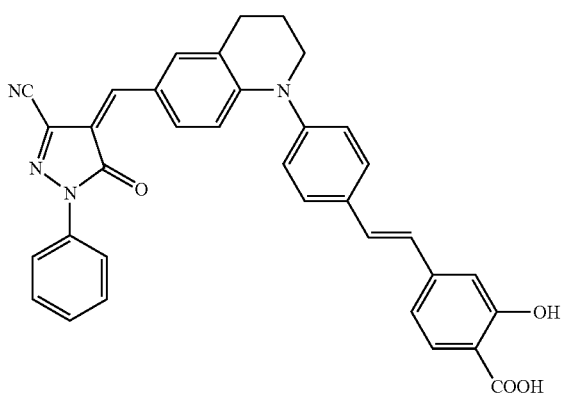
(295)

-continued

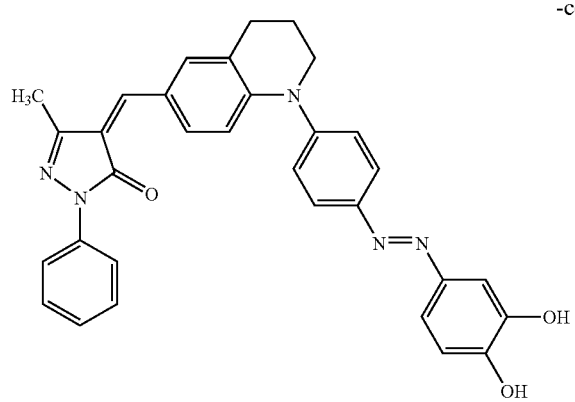
(296)

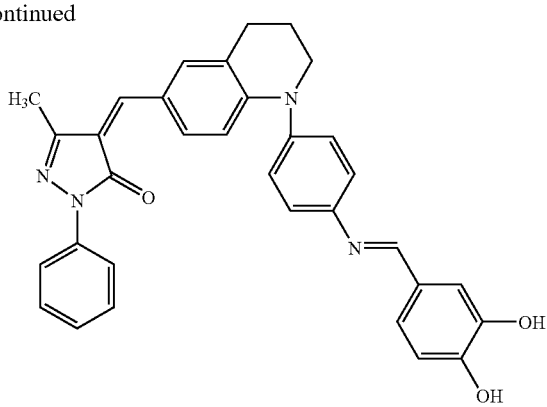
(297)

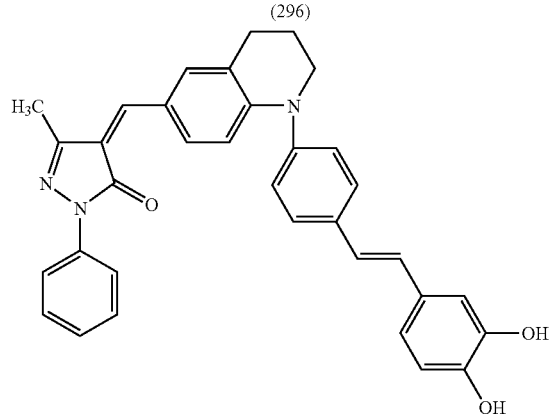
(298)

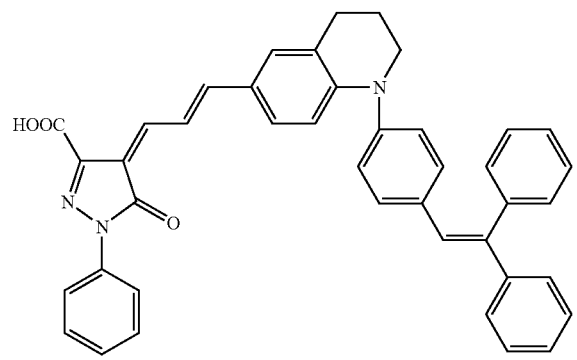
(299)

The dye-sensitized photoelectric conversion device of the invention is a photoelectric conversion device sensitized with a methine dye represented by the general formula (1), and is obtained, for example, by using oxide semiconductor fine particles to form a thin film of the oxide semiconductor fine particles on a substrate, and subsequently carrying the methine dye of the formula (1) onto this thin film.

In the invention, the substrate on which the thin film of the oxide semiconductor fine particles is formed is preferably a substrate having an electroconductive surface. Such a substrate is commercially available with ease. For example, the following can be used: a substrate wherein a thin film made of an electroconductive metal oxide, such as tin oxide doped with indium, fluorine, antimony or the like, or a metal, such as copper, silver or gold, is formed on a surface of a glass or a transparent polymeric material, such as polyethylene terephthalate or polyethersulfone. Usually, the electroconductivity thereof should be 1000Ω or less, and is in particular preferably 100Ω or less.

Specific examples of the metal oxide for the oxide semiconductor fine particle thin film include oxides of titanium, tin, zinc, tungsten, zirconium, gallium, indium, yttrium, niobium, tantalum, and vanadium. Out of these, preferred are oxides of titanium, tin, zinc, niobium, and indium. Particularly preferred are titanium oxide, zinc oxide, and tin oxide. These oxide semiconductors can be used alone or in a mixture form. About the particle diameters of the oxide semiconductor fine particles, the average particle diameter thereof is usually from 1 to 500 nm, preferably from 1 to 100 nm. About the oxide semiconductor fine particles, ones having large particle diameters and ones having small particle diameters may be mixed, or may be into a multi-layered form.

The oxide semiconductor fine particle thin film can be produced by: a method of forming the oxide semiconductor fine particles into a thin film form directly onto the above described substrate, which is made of the polymeric material or the like, by spraying or the like; a method of using the substrate as an electrode to precipitate a thin film of the semiconductor fine particles electrically thereon; a method of coating a slurry of the semiconductor fine particles or a paste containing fine particles obtained by hydrolyzing a precursor of the semiconductor fine particles such as a semiconductor alkoxide onto the substrate, drying, and then curing or calcining the resultant; or some other method. Out of these, the method using the slurry is preferred from the viewpoint of performances of the oxide semiconductor electrode. In this method, the slurry supplied for use is obtained by dispersing secondarily-aggregating oxide semiconductor fine particles into a dispersing medium to give an average primary particle diameter of 1 to 200 nm in an ordinary manner.

The dispersing medium, in which the slurry is to be dispersed, may be any dispersing medium in which the semiconductor fine particles can be dispersed. For example, the following is used: water, an alcohol such as ethanol, a ketone such as acetone or acetylacetone, or a hydrocarbon such as hexane. These may be used in a mixture form. The use of water is preferred since a change in the viscosity of the slurry is made small. A dispersion stabilizer can be used to stabilize a dispersion state of the oxide semiconductor fine particles. Examples of the dispersion stabilizer which can be used include acids such as acetic acid, hydrochloric acid and nitric acid, acetylacetone, acrylic acid, polyethylene glycol, and polyvinyl alcohol.

The substrate on which the slurry is coated may be calcined, and the calcining temperature thereof is usually 100° C. or higher, preferably 200° C. or higher. The upper limit thereof is roughly not higher than the melting point (softening point) of the substrate, and is usually 900° C., preferably 600° C. or lower. The time for the calcining is not particularly limited, and is preferably about 4 hours or less. The thickness of the thin film on the substrate is usually from 1 to 200 μm, preferably from 1 to 50 μm.

The secondary treatment may be applied to the thin film of the oxide semiconductor fine particles. For example, when the substrate on which the thin film is formed is immersed directly into a solution of an alkoxide, a chloride, a nitride, a sulfide or the like of the same metal in the metal oxide semiconductor and then the resultant is dried or re-calcined, performances of the semiconductor thin film can be improved. Examples of the metal alkoxide which can be used include titanium ethoxide, titanium isopropoxide, titanium-t-butoxide, and n-dibutyl-diacetyltin. Alcohol solutions thereof can be used. Examples of the chloride include titanium tetrachloride, tin tetrachloride, and zinc chloride. Aqueous solution thereof can be used. In the thus-obtained secondarily-treated oxide semiconductor thin film also, the fine particle state of the oxide semiconductor is maintained.

The following will describe the method for carrying the dye onto the oxide semiconductor thin film.

An example of the method for carrying the methine dye represented by the formula (1) is a method of immersing the above described substrate on which the oxide semiconductor thin film is formed into a solution obtained by dissolving the methine dye of the formula (1) into a solvent in which the dye can be dissolved or a liquid dispersion obtained by dispersing the methine dye which is low in solubility. The concentration in the solution or the liquid dispersion is appropriately decided dependently on the methine dye of the formula (1). The time for the immersion is about from ordinary temperature to the boiling point of the solvent used to dissolve the dye, and the time for the immersion is from about 1 minute to 48 hours. Specific examples of the solvent which can be used to dissolve the methine dye of the formula (1) include methanol, ethanol, acetonitrile, dimethylsulfoxide, dimethylformamide, acetone, and t-butanol. The concentration of the dye in the solution is usually from $1\times10^{-6}$ to 1 M, preferably from $1\times10^{-5}$ to $1\times10^{-1}$ M. Such a way makes it possible to yield a photoelectric conversion device of the invention, which has an oxide semiconductor fine particle thin film sensitized with the methine dye of the formula (1).

About the methine dye of the formula (1) to be carried, a single species thereof may be used, or two or more species thereof may be mixed. The methine dye of the formula (1) in the invention and a different metal complex dye or organic dye may be used in a mixture form. By using, in particular, a mixture of the methine dye and a dye having a different absorption wavelength, broad range of absorption wavelengths can be used and a solar cell high in conversion efficiency can be obtained. Examples of the metal complex dye which can be mixed are not particularly limited, and include ruthenium complexes or quaternary salts thereof phthalocyanine, and porphyrin described in Non-Patent Document 2. Examples of the organic dye which can be mixed include metal-free compounds of phthalocyanine, porphyrin, and cyanine; merocyanine; oxonol; triphenylmethane dyes; methine dyes described in Patent Document 2 such as acrylic acid based dyes; xanthene dyes; azo dyes; anthraquinone dyes; and perylene dyes. Preferred examples thereof include the ruthenium complexes, merocyanine dyes, and methine dyes such as acrylic acid based dyes. When two or more dyes are used, it is allowable to cause the individual dyes to be successively adsorbed onto the semiconductor thin film, or mix the dyes to prepare a solution, and cause the dyes therein to be simultaneously adsorbed onto the film.

The ratio between the dyes to be mixed is not particularly limited, and is optimally selected dependently on the individual dyes. It is generally preferred to mix the dyes in equimolar amounts, or use each of the dyes in an amount of about 10% or more by mole. In the case of using a solution wherein the mixed dyes are mixed/dissolved or dispersed to carry the dyes onto the oxide semiconductor fine particle thin film, the total concentration of the dyes in the solution may be the same as in the above-mentioned case of carrying only one dye. As the solvent when the mixed dyes are used, solvents as descried above can be used. The solvents to be used for the individual dyes may be the same or different.

When the dye(s) are carried onto the thin film of the oxide semiconductor fine particles, it is effective to carry the dye(s) in the presence of an inclusion compound in order to prevent the dye(s) from aggregating. Examples of the inclusion compound include steroid compounds such as cholic acid, crown ether, cyclodextrin, calyx arene, and polyethylene oxide. Preferred examples thereof include cholic acid derivatives such as deoxycholic acid, dehydrodeoxycholic acid, chenodeoxycholic acid, methyl cholate and sodium cholate; and polyethylene oxide. After the dye(s) is/are carried, the semiconductor thin film surface may be treated with an amine compound such as 4-t-butylpyridine. The method for the treatment may be, for example, a method of immersing the substrate on which the semiconductor fine particle thin film on which the dye(s) is/are carried is formed into a solution of the amine compound in ethanol.

The solar cell of the invention is composed of: an electrode of a photoelectric conversion device obtained by carrying, onto the above-mentioned oxide semiconductor thin film, a methine dye of the formula (1) and so on; a counter electrode; a redox electrolyte; a hole transporting material; a p-type semiconductor; and others. The form of the redox electrolyte, the hole transporting material, the p-type semiconductor and the others may be a liquid form, coagulated form (gel or gel-like), solid form, or the like. Examples of such substances in a liquid form include a substance wherein each of a redox electrolyte, a molten salt, a hole transporting material, a p-type semiconductor and others is dissolved in a solvent; and an ordinary-temperature molten salt. Examples of such substance in a coagulated (gel or gel-like) form include substances wherein these are each incorporated into a polymer matrix, a low molecular weight gelatinizing agent, or the like. As such substances in a solid form, a redox electrolyte, a molten salt which is thermally melted, a hole transporting material, a p-type semiconductor or the like is used as it is. Examples of the hole transporting material include amine derivatives; electroconductive polymers such as polyacetylene, polyaniline, and polythiophene; and substances wherein a discotic liquid crystal phase is used, such as triphenylene compounds. Examples of the p-type semiconductor include CuI, and CuSCN. The counter electrode is preferably an electroconductive electrode which acts catalytically onto reduction reaction of the redox electrolyte. For example, the following can be used: an electrode wherein platinum, carbon, rhodium, ruthenium or the like is evaporated onto a glass or a polymeric film, or an electrode wherein the same are coated with electroconductive fine particles.

Examples of the redox electrolyte which can be used in the solar cell of the invention include halogen oxidation-reduction electrolytes each made of a halogen compound having a halogen ion as a counter ion and a halogen molecule; metallic oxidation-reduction electrolytes such as a ferrocyanic acid salt/ferricyanic acid salt, a ferrocene/ferricinium ion, and metal complex including a cobalt complex; and organic oxidation-reduction electrolytes such as alkylthiol/alkyldisulfide, a viologen dye, and hydroquinone/quinone. The halogen oxidation-reduction electrolytes are preferred. In the halogen oxidation-reduction electrolytes, which are each made of a halogen compound and a halogen molecule, the halogen molecule is, for example, a iodine molecule, a bromine molecule or the like. A iodine molecule is preferred. Examples of the halogen compound, which has a halogen ion as a counter ion, include metal halide salts such as LiBr, NaBr, KBr, LiI, NaI, KI, CsI, $CaI_2$, $MgI_2$, and CuI; and quaternary ammonium salts of a halogen such as tetraalkylammonium iodide, imidazolium iodide, and pyridinium iodide. Salts having a iodide ion as a counter ion are preferred. It is also preferred to use an electrolyte having, as a counter ion, an imide ion, such as bis(trifluoromethanesulfonyl) imide ion or a dicyanoimide ion, in addition to the above-mentioned iodine ion.

When the redox electrolyte is constructed in the form of a solution containing the electrolyte, an electrochemically inactive solvent is used as the solvent therein. Examples thereof include acetonitrile, propylene carbonate, ethylene carbonate, 3-methoxypropionitrile, methoxy acetonitrile, ethylene glycol, propylene glycol, diethylene glycol, triethylene glycol, γ-butyrolactone, dimethoxyethane, diethyl carbonate, diethyl ether, diethyl carbonate, dimethyl carbonate, 1,2-dimethoxyethane, dimethylformamide, dimethylsulfoxide, 1,3-dioxolane, methyl formate, 2-methyltetrahydrofuran, 3-methoxy-oxaziridine-2-one, sulfolane, tetrahydrofuran, and water. Out of these, preferred are acetonitrile, propylene carbonate, ethylene carbonate, 3-methoxypropionitrile, methoxy acetonitrile, ethylene glycol, 3-methyl-oxaziridine-2-one, γ-butyrolactone and others. These may be used alone or in combination of two or more thereof. Examples of the gel-like electrolyte include electrolytes wherein an electrolyte or an electrolytic solution is incorporated into a matrix made of an oligomer, a polymer or the like; and electrolytes wherein an electrolyte or an electrolytic solution is incorporated into a low molecular weight gelatinizing agent described in Non-Patent Document 3. The concentration of the redox electrolyte is usually from 0.01 to 99% by weight, preferably from 0.1 to 90% by weight.

The solar cell of the invention is obtained by arranging an electrode of a photoelectric conversion device wherein the dye is carried onto an oxide semiconductor thin film on a substrate and a counter electrode so as to sandwich it therebetween, and filling a solution containing a redox electrolyte into a gap therebetween.

EXAMPLES

The invention will be described in more detail by way of the following examples; however, invention is not limited to these examples. In the examples, the word "part(s)" represents "a part or parts by mass" unless otherwise specified.

The number of each compound is a Compound Number in Table 1 or 2. Each maximum absorption wavelength was measured with a UV-3150 spectrophotometer (manufactured by SHIMADZU CORPORATION), and nuclear magnetic resonance was measured with a Gemini 300 (manufactured by Varian Inc.).

Example 1

Into 20 parts of ethanol were dissolved 1 part of the compound (300) illustrated below and 1.6 parts of the compound (301) illustrated below. To this solution was added 0.01 part of piperidine, and the resultant was heated and refluxed for 2 hours. After the reaction, the solution was cooled, and the precipitated crystal was separated and purified by column chromatography, and then recrystallized from ethanol to yield 1.2 parts of the compound (27). The maximum absorption wavelength and values measured by the nuclear magnetic resonance machine of this compound are as follows:

Maximum absorption wavelength: λmax=566 nm (water: acetonitrile=7:3)

Values measured by the nuclear magnetic resonance; 1H-NMR (PPM: d6-DMSO): 0.85 (t. 3H), 1.27 (m. 10H), 1.55 (m. 2H), 1.87 (m. 2H), 2.73 (m. 2H), 3.35 (m. 4H), 6.73 (d. 1H), 7.25 (m. 1H), 7.35 (d. 1H), 7.46 (m. 3H), 7.62 (d. 1H), 7.94 (m. 2H), 8.26 (m, 2H).

[KA 23]

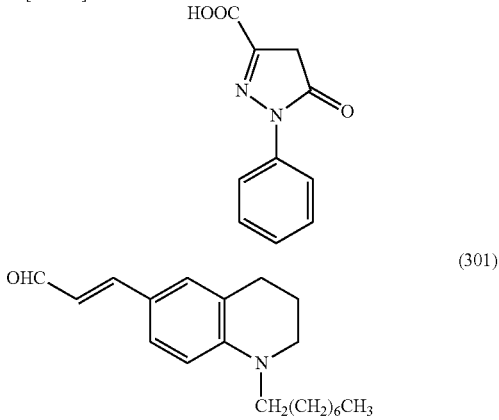

(300)

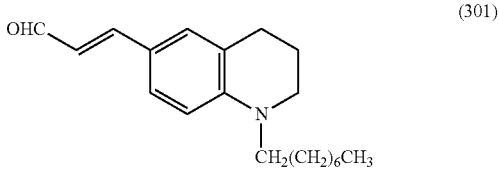

(301)

Synthesis of Starting Compound (301)

Under the atmosphere of nitrogen, 4 parts of 1,2,3,4-tetrahydroquinoline, 6.4 parts of 1-bromooctane, 5 parts of dimethylformamide (DMF), and 5 parts of potassium carbonate were stirred at 130° C. for 4 hours. After the reaction, the resultant was extracted with water/ethyl acetate, and the ethyl acetate phase was dried over magnesium sulfate. Ethyl acetate was distilled off, and the residue was separated and purified by column chromatography to yield 3 parts of a precursor of the compound (301), 1,2,3,4-tetrahydro-1-octylquinoline as a colorless liquid. Next, 1.7 parts of phosphorus oxychloride were dropwise added to 10 parts of chloroform and 1 part of N,N-dimethylacrolein, the temperature of which was adjusted to 5° C., while the temperature of the reaction solution was kept at 10° C. or lower. The reaction solution was then stirred at 5° C. for 1 hour. Thereafter, 2.5 parts of 1,2,3,4-tetrahydro-1-octylquinoline described above were added thereto, and then the reactive components were caused to react at 25° C. for 1 hour. The reaction solution was then stirred at 70° C. for 1 hour. Thereafter, a 20% solution of sodium hydroxide in water was added to the reaction solution until the pH turned to 12. The precipitated crystal was filtrated, and the resultant crystal was washed with water. The crystal was then separated by column chromatography (hexane/ethyl acetate), and recrystallized from ethanol to yield 2.7 parts of the compound (301) as a yellow crystal.

Example 2

The same process as in Example 1 was performed except that parts of the compound (301) were changed to 2.5 parts of the compound (302) illustrated below, so as to yield 0.9 part of the compound (3302).

Maximum absorption wavelength: λmax=526 nm (water: acetonitrile=7:3).

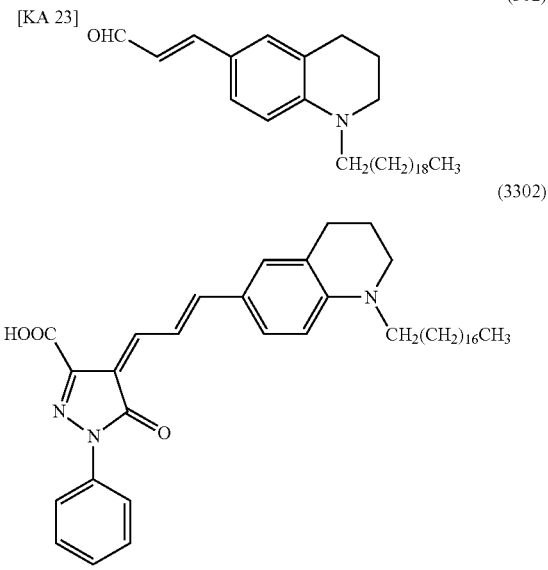

Synthesis of Starting Compound (302)

The same process as in the synthesis of the compound (301) was performed except that 6.4 parts of 1-bromooctane were changed to 11 parts of 1-bromooctadecane, so as to yield 3 parts of the compound (302) as a yellow crystal.

Example 3

The same process as in Example 1 was performed except that 1.6 parts of the compound (301) were changed to 1.5 parts of the compound (303) illustrated below, so as to yield 0.9 part of the compound (146).

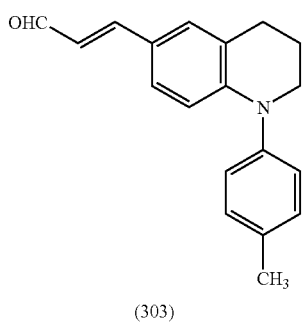

Maximum absorption wavelength: λmax=546 nm (water: acetonitrile=7:3)

Values measured by the nuclear magnetic resonance; 1H-NMR (PPM: d6-DMSO): 2.03 (m. 2H), 2.36 (s. 3H), 2.87 (m, 2H), 3.66 (m. 2H), 6.40 (d. 1H), 7.26 (m, 6H), 7.47 (m. 3H), 7.63 (d. 1H), 7.92 (m. 2H), 8.28 (m. 2H).

Synthesis of Starting Compound (303)

Under the atmosphere of nitrogen, 4 parts of 1,2,3,4-tetrahydroquinoline, 20 parts of 4-iodotoluene, 20 parts of dimethylformamide (DMF), 10 parts of potassium carbonate, and 1 part of copper powder (200 mesh) were stirred at 160° C. for 10 hours. After the reaction, the resultant was extracted with water/ethyl acetate, and the ethyl acetate phase was dried over magnesium sulfate. Ethyl acetate was distilled off, and the residue was separated and purified by column chromatography to yield 5 parts of a precursor of the compound (303), 1,2,3,4-tetrahydro-1-p-tolylquinoline as a colorless crystal. Next, 1.7 parts of phosphorus oxychloride were dropwise added to 10 parts of chloroform and 1 part of N,N-dimethylacrolein, the temperature of which was adjusted to 5° C., while the temperature of the reaction solution was kept at 10° C. or lower. The reaction solution was then stirred at 5° C. for 1 hour. Thereafter, 2.0 parts of 1,2,3,4-tetrahydro-1-p-tolylquinoline described above were added thereto, and then the reactive components were caused to react at 25° C. for 1 hour. The reaction solution was then stirred at 70° C. for 1 hour. Thereafter, a 20% solution of sodium hydroxide in water was added to the reaction solution until the pH turned to 12. The precipitated crystal was filtrated, and the resultant crystal was washed with water. The crystal was then separated by column chromatography (hexane/ethyl acetate), and recrystallized from ethanol to yield 1.8 parts of the compound (303) as a yellow crystal.

Example 4

The same process as in Example 1 was performed except that 1.6 parts of the compound (301) were changed to 1.5 parts of the compound (304) illustrated below, so as to yield 0.9 part of the compound (12).

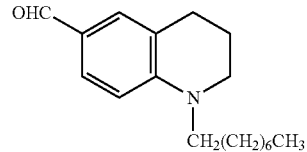

Maximum absorption wavelength: λmax=501 nm (water: acetonitrile=7:3).

Values measured by the nuclear magnetic resonance; $^1$H-NMR (PPM: d6-DMSO): 1.74 (s. $CH_3$, 6H), 3.11 (s. $CH_3$.6H), 3.87 (s. $CH_3$.3H), 6.85 (d. 2H), 6.93 (d. 1H), 7.31 (m. 1H), 7.62 (d. 2H), 7.76 (d. 1H), 7.81 (d. 1H), 8.10 (dd. 1H), 8.27 (d. 1H), 8.37 (m. 1H).

Synthesis of Starting Compound (304)

The same process as in the synthesis of the compound (301) was performed except that 10 parts of chloroform and 1 part of N,N-dimethylacrolein were changed to 10 parts of DMF, so as to yield 2 parts of the compound (304) as a yellow crystal.

Example 5

A methine dye of Compound Number 12 was dissolved into ethanol (EtOH) to give a concentration of $3.2\times10^{-4}$ M. Into this solution was immersed a porous substrate (semiconductor thin film electrode obtained by calcining porous titanium oxide onto a transparent electroconductive glass electrode at 450° C. for 30 minutes) (about 0.25 cm$^2$) at room temperature from 3 hours to one night, so as to carry the dye thereon. The resultant was washed with the solvent (ethanol), and dried to yield a photoelectric conversion device of the invention having the semiconductor thin film (titanium oxide fine particle thin film) sensitized with the dye (the substrate on which the semiconductor thin film sensitized with the dye was formed).

On the thus-obtained substrate, on which the semiconductor thin film sensitized with the dye was formed, an electro-conductive glass sputtered with platinum was fixed to oppose the semiconductor thin film and the sputtered face of the glass so as to have a gap of 20 micrometers. A solution containing an electrolyte (electrolytic liquid) was poured and filled into the gap to yield a solar cell of the invention.

The used electrolytic liquid was a liquid wherein iodine, lithium iodide, 1,2-dimethyl-3-n-propylimidazolium iodide and t-butylpyridine were dissolved into 3-methoxypropionitrile to give concentrations of 0.1 M, 0.1 M, 0.6 M and 1 M, respectively.

About the size of the cell to be measured, its effective area was set to 0.25 cm$^2$. A 500 W xenon lamp was used as a light source to radiate light at 100 mW/cm$^2$ through an AM (atmosphere passage air mass) 1.5 filter. A solar simulator WXS-155S-10, AM 1.5 G (manufactured by WACOM ELECTRIC CO., LTD.) was used to measure the short circuit current, the open circuit voltage, and the conversion efficiency. The results are shown in Table 3.

Example 6

To the titanium oxide thin film portion of the porous substrate (semiconductor thin film electrode) (about 0.25 cm$^2$) used in Example 5 was dropwise added about 1 cc of a 0.2 M solution of titanium tetrachloride in water, and then the substrate was allowed to stand still at room temperature for 24 hours. Thereafter, the substrate was washed with water, and again calcined at 450° C. for 30 minutes to yield a titanium tetrachloride treated semiconductor thin film electrode (porous substrate). The same process as in Example 5 was performed to carry the dyes except that this electrode was used, so as to yield a photoelectric conversion device of the invention having the semiconductor thin film (titanium oxide fine particle thin film) sensitized with the dye. Thereafter, a solar cell was formed and performances thereof were measured in the same manner as in Example 5. The results are shown in Table 3.

Example 7

A dye was carried onto a semiconductor thin film in the same way as in Example 5 except that the titanium tetrachloride treated semiconductor thin film electrode (porous substrate) used in Example 6 was used instead of the porous substrate (semiconductor thin film electrode) used in Example 5, and at the time of carrying the dye, cholic acid was added as an inclusion compound to give a concentration of 3×10$^{-2}$ M to prepare a dye solution. In this way, a photoelectric conversion device of the invention having a cholic-acid-treated, dye-sensitized semiconductor thin film was yielded.

Thereafter, a solar cell of the invention was formed and performances thereof were measured in the same manner as in Example 5. The results are shown in Table 3.

Examples 8 to 10

Each photoelectric conversion device of the invention and each solar cell of the invention were prepared in the same way as in Example 6 except that the methine dye in Example 6 was changed to a methine dye described in each Example in Table 3. Performances of the resultant solar cells were then measured. The results are shown in Table 3.

Example 11

A photoelectric conversion device of the invention and a solar cell of the invention were prepared in the same way as in Example 7 except that the methine dye in Example 7 was changed to the methine dye of Compound Number 146. Performances of the resultant solar cells were then measured. The results are shown in Table 3.

Example 12

A photoelectric conversion device of the invention and a solar cell of the invention were prepared in the same way as in Example 6 except that the methine dye of Compound Number 146 and the dye of Compound Number 305, which will be illustrated below, were used to give concentrations of 1.6×10$^{-4}$ M and 1.6×10$^{-4}$ M, respectively. Performances of the resultant solar cells were then measured. The results are shown in Table 3.

Example 13

A photoelectric conversion device of the invention and a solar cell of the invention were prepared in the same way as in Example 12 except that the dye of Compound Number 306, which will be illustrated below, was used at a concentration of 3.2×10$^{-4}$ M instead of the dye of Compound Number 305 in Example 12. Performances of the resultant solar cells were then measured. The results are shown in Table 3.

Example 14

The same process as in Example 1 was performed except that parts of the compound (301) in Example 1 were changed to 1.9 parts of the compound (307) illustrated below, so as to yield parts of the compound (308).

[KA 27]

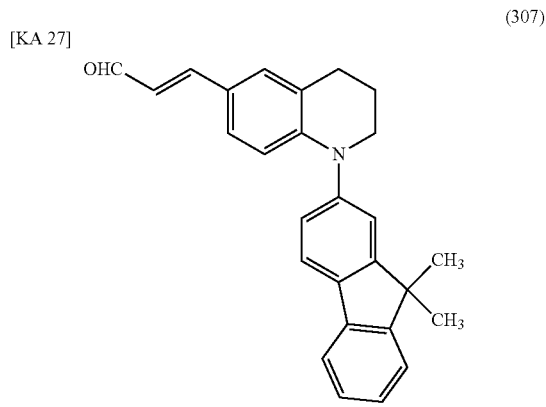

(307)

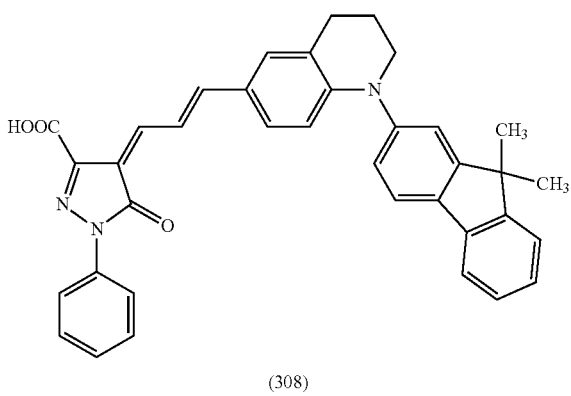

(308)

Synthesis Example of Starting Compound (307)

The same process as in the synthesis of the above-mentioned (303) was performed except that 20 parts of 4-iodotoluene were changed to 30 parts of 2-iodo-9,9-dimethyl-9H-fluorene, so as to yield 2.5 parts of the compound (307) as a yellow crystal.

Example 15

The same process as in Example 1 was performed except that 1.6 parts of the compound (301) in Example 1 were changed to 1.8 parts of the compound (309) illustrated below, so as to yield 1.5 parts of the compound (310).

[KA 28]

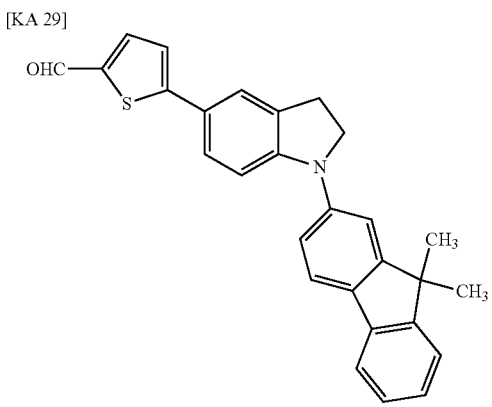

(309)

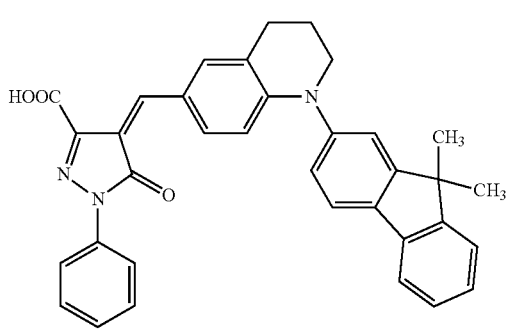

(310)

Synthesis Example of Starting Compound (309)

The same process as in the synthesis of the above-mentioned (303) was performed except that 20 parts of 4-iodotoluene were changed to 30 parts of 2-iodo-9,9-dimethyl-9H-fluorene and subsequently 10 parts of chloroform and 1 part of N,N-dimethylacrolein were changed to 10 parts of DMF, so as to yield 1.8 parts of the compound (309) as a light yellow crystal.

Example 16

The same process as in Example 1 was performed except that 1.6 parts of the compound (301) in Example 1 were changed to 2.0 parts of the compound (311) illustrated below, so as to yield 1.6 parts of the compound (312).

Maximum absorption wavelength: λmax=549 nm (water: acetonitrile=1:1)

[KA 29]

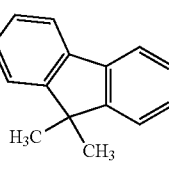

(311)

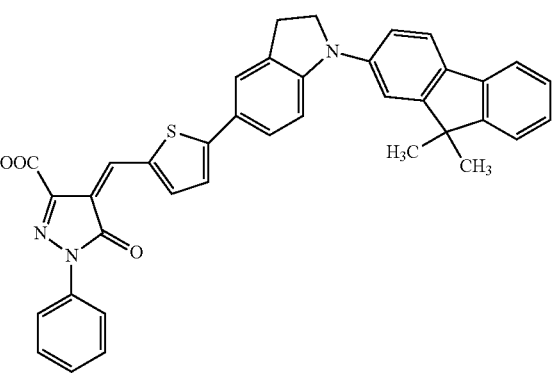

(312)

Synthesis of Starting Compound (311)

Under the atmosphere of nitrogen, a mixed solution made of 2 parts of 2-thipheneboric acid, 3 mL of ethanol and 10 mL of 2M sodium carbonate was dropwise added to a mixed solution of 2 parts of 5-bromoindoline and 20 parts of toluene, and the reactive components were caused to react for 1 hour. Thereafter, thereto was added 0.3 part of tetra-triphenylphosphine palladium (0), and the reactive components were caused to react at 80° C. for 12 hours. After the reaction, the reaction solution was extracted with water/ethyl acetate, and the ethyl acetate phase was dried over magnesium sulfate. Ethyl acetate was distilled off, and the residue was separated and purified by column chromatography (hexane/ethyl acetate) to yield 2 parts of a precursor of the compound (311), 5-(thiophene-2-yl)indoline as a colorless crystal. Next, under the atmosphere of nitrogen, 2 parts of this 5-(thiophene-2-yl) indoline, 6 parts of 2-iodo-9,9-dimethyl-9H-fluorene, 30 parts of dimethylformamide (DMF), 10 parts of potassium carbonate, and 1 part of copper powder (200 mesh) were stirred at 160° C. for 10 hours. After the reaction, the resultant was extracted with water/ethyl acetate, and the ethyl acetate phase was dried over magnesium sulfate. Ethyl acetate was distilled off, and the residue was separated and purified by column chromatography to yield 2 parts of 1-(9,9-dimethyl-9H-fluorene-2-yl)-5-(thiophene-2-yl)indoline, which is a precursor of the compound (311) in the same manner, as a colorless crystal. Next, 1.7 parts of phosphorus oxychloride were dropwise added to 10 parts of DMF, the temperature of which was adjusted to 5° C., while the temperature of the reaction solution was kept at 10° C. or lower. The reaction solution was then stirred at 5° C. for 1 hour. Thereafter, 2 parts of 1-(9,9-dimethyl-9H-fluorene-2-yl)-5-(thiophene-2-yl)indoline described above were added thereto, and then the reactive components were caused to react at 25° C. for 1 hour. The reaction solution was then stirred at 70° C. for 1 hour.

Thereafter, a 20% solution of sodium hydroxide in water was added to the reaction solution until the pH turned to 12. The precipitated crystal was filtrated, and the resultant crystal was washed with water. The crystal was then separated by column chromatography (hexane/ethyl acetate), and recrystallized from ethanol to yield 2 parts of the compound (311) as a yellow crystal.

Examples 17 to 20

Each photoelectric conversion device of the invention and each solar cell of the invention were prepared in the same way as in Example 7 except that the methine dye in Example 7 was changed to each of the compounds obtained in Examples 14 to 16. Performances of the resultant solar cells were then measured. The results are shown in Table 3.

Chemical formulae of Compound Numbers 305 and 306 used together with the methine dye of the formula (1) in Examples 12 and 13, respectively, are illustrated below.

TABLE 3

[KA 30]

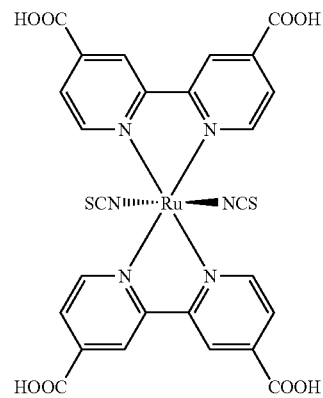
(305)

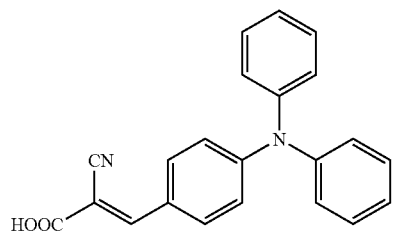
(306)

| Example | Compound Number(s) | Short circuit current (mA/cm$^2$) | Open circuit voltage (V) | Conversion efficiency (%) | TiCl$_4$ treatment of thin film | Cholic acid |
|---|---|---|---|---|---|---|
| 5 | (12) | 12.9 | 0.61 | 5.4 | Not conducted | Absent |
| 6 | (12) | 15.1 | 0.6 | 6.2 | Conducted | Absent |
| 7 | (12) | 15.5 | 0.63 | 6.8 | Conducted | Present |
| 8 | (27) | 14.5 | 0.59 | 5.8 | Conducted | Absent |
| 9 | (3302) | 13.5 | 0.61 | 5.7 | Conducted | Absent |
| 10 | (146) | 15 | 0.56 | 5.7 | Conducted | Absent |
| 11 | (146) | 15.2 | 0.62 | 6.6 | Conducted | Present |
| 12 | (305) + (146) | 17.2 | 0.61 | 7.2 | Conducted | Absent |
| 13 | (306) + (146) | 15.9 | 0.61 | 6.8 | Conducted | Absent |
| 17 | (27) | 16.5 | 0.67 | 7.2 | Conducted | Present |
| 18 | (308) | 16.8 | 0.66 | 7.2 | Conducted | Present |
| 19 | (310) | 14.3 | 0.7 | 6.8 | Conducted | Present |
| 20 | (312) | 15.9 | 0.65 | 6.5 | Conducted | Present |

From the results in Table 3, it is understood that the use of photoelectric conversion devices sensitized with a methine dye represented by the formula (1) makes it possible to convert visible rays effectively to electricity. It has also been verified that the use of a combination of the dye as a sensitizing dye with a known compound makes the conversion efficiency better.

INDUSTRIAL APPLICABILITY

The solar cell of the invention, wherein there is used a photoelectric conversion device comprising oxide semiconductor fine particles sensitized by carrying a methine dye of the formula (1) thereon, is high in photoelectric conversion efficiency, and good in stability; therefore, there is a possibility that effective solar cells can be produced at low costs. Thus, the invention is very useful for industries. Moreover, the methine dye represented by the formula (1) is a novel compound, and is very useful as a sensitizing dye for the production of dye-sensitized photoelectric conversion devices and for other purposes.

The invention claimed is:

1. A photoelectric conversion device, using oxide semiconductor fine particles sensitized with a methine dye represented by the following formula (1):

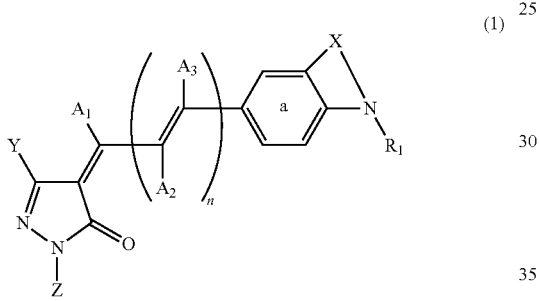

(1)

wherein
n represents an integer of 0 to 7;
$R_1$ represents an optionally-substituted aromatic residue, an optionally-substituted aliphatic hydrocarbon residue, or an acyl group;
X is a linking group which is combined with a nitrogen atom bonded to a benzene ring a to form a heteroring, and represents —$CH_2CH_2$— or —$(CH_2)_3$—;
Y represents a hydrogen atom, an optionally-substituted aromatic residue, an optionally-substituted aliphatic hydrocarbon residue, a carboxyl group, a phosphoric acid group, a sulfonic acid group, a cyano group, an amide group, or an alkoxycarbonyl group;
Z represents an optionally-substituted aromatic residue, an optionally-substituted aliphatic hydrocarbon residue, or an acyl group;
$A_1$, $A_2$ and $A_3$ each independently represent an optionally-substituted aromatic residue, an optionally-substituted aliphatic hydrocarbon residue, a hydroxyl group, a phosphoric acid group, a cyano group, a hydrogen atom, a halogen atom, a carboxyl group, a carbonamide group, an alkoxycarbonyl group, an arylcarbonyl group, or an acyl group, provided that when n is 2 or more and plural $A_2$s and $A_3$s are present, each of $A_2$s and $A_3$s may be identical to or different from each other, and when n is a value other than 0, plurals selected from $A_1$ and/or $A_2$(s) and/or $A_3$(s) may form an optionally-substituted ring;
the benzene ring a may have, as substituent(s) other than X and the nitrogen atom shown in the formula (1), 1 to 3 substituents selected from a group consisting of: halogen atoms; amide, hydroxyl, cyano, nitro, alkoxyl, acyl, and substituted or unsubstituted amino groups; and optionally-substituted aliphatic hydrocarbon residues and optionally-substituted aromatic residues, provided that when plural said substituents are plural, these substituents may be bonded with each other, thereby forming an optionally-substituted ring.

2. The photoelectric conversion device according to claim 1, wherein Z in the methine dye represented by the formula (1) is an optionally-substituted aromatic residue.

3. The photoelectric conversion device according to claim 2, wherein the methine dye represented by the formula (1) is a methine dye represented by the following formula (2):

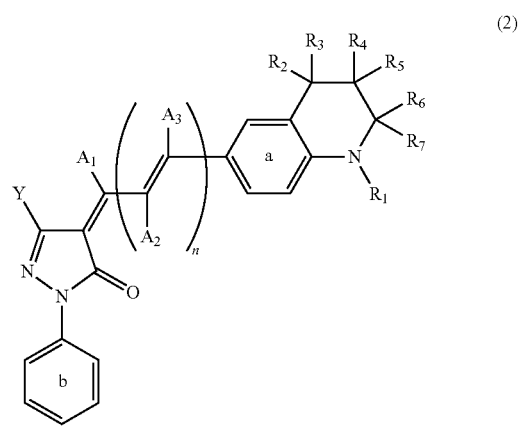

(2)

wherein n, $R_1$, Y, $A_1$, $A_2$(s), $A_3$(s), and the benzene ring a are the same as in the formula (1) illustrated in claim 1;
$R_2$ to $R_7$ each independently represent a hydrogen atom;
a benzene ring b may have 1 to 5 substituents selected from a group consisting of: halogen atoms; amide, hydroxyl, cyano, nitro, sulfonic acid, carboxyl, phosphoric acid, alkoxyl, acyl, and substituted or unsubstituted amino groups; optionally-substituted aliphatic hydrocarbon residues and optionally-substituted aromatic residues;
provided that when plural substituents are present, these substituents may be bonded to each other to form an optionally-substituted ring.

4. The photoelectric conversion device according to claim 3, wherein the methine dye represented by the formula (2) is a methine dye represented by the following formula (3):

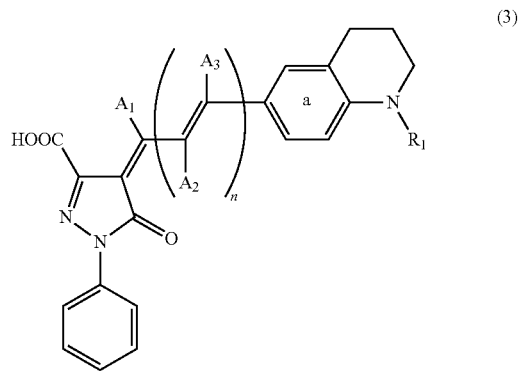

(3)

wherein n, $R_1$, $A_1$, $A_2$(s), $A_3$(s) and a benzene ring a are each the same as in the formula (1) illustrated in claim 1.

5. The photoelectric conversion device according to any one of claims 1 to 4, wherein n is from 0 to 6.

6. The photoelectric conversion device according to any one of claims 1 to 4, wherein $R_1$ is an optionally-substituted aliphatic hydrocarbon residue.

7. The photoelectric conversion device according to claim 6, wherein the optionally-substituted aliphatic hydrocarbon residue is an optionally-substituted aliphatic hydrocarbon residue having 5 to 36 carbon atoms.

8. The photoelectric conversion device according to any one of claims 1 to 4, wherein $R_1$ is an optionally-substituted aromatic hydrocarbon residue.

9. The photoelectric conversion device according to claim 8, wherein the optionally-substituted aromatic hydrocarbon residue is an aromatic hydrocarbon residue which has, as a substituent, an aliphatic hydrocarbon residue having 1 to 36 carbon atoms.

10. The photoelectric conversion device, using oxide semiconductor fine particles sensitized with one or more methine dyes each represented by the formula (1) illustrated in claim 1, and a metal complex and/or an organic dye having a structure other than the formula (1) illustrated in claim 1.

11. The photoelectric conversion device according to any one of claim 1-4 or 10, wherein the oxide semiconductor fine particles comprise titanium dioxide, zinc oxide or tin oxide.

12. The photoelectric conversion device according to any one of claims 1 to 4, wherein the oxide semiconductor fine particles sensitized with the methine dye represented by the formula (1) are a product wherein the methine dye represented by the formula (1) illustrated in claim 1 is carried on oxide semiconductor fine particles in the presence of an inclusion compound.

13. The photoelectric conversion device according to any one of claims 1 to 4, wherein the oxide semiconductor fine particles sensitized with the methine dye represented by the formula (1) are a product wherein the methine dye represented by the formula (1) is carried on a thin film of oxide semiconductor fine particles.

14. The photoelectric conversion device, wherein a methine dye represented by the formula (1) illustrated in claim 1 is carried on a semiconductor thin film surface of an oxide semiconductor thin film electrode.

15. The photoelectric conversion device according to claim 1, wherein in the formula (1),
n is from 0 to 6;
$R_1$ is an aliphatic hydrocarbon residue having 5 to 36 carbon atoms, a phenyl group having, as a substituent, a hydrocarbon residue having 1 to 36 carbon atoms, or an aromatic hydrocarbon residue of 9 to 14 carbon atoms, comprising two or three 5-membered or 6-membered rings comprising an aromatic ring, the residue may contain one nitrogen atom, and may be substituted with an alkyl group having 1 to 8 carbon atoms as a substituent;
X is —$CH_2CH_2$— or —$(CH_2)_3$—;
Y is a carboxyl group;
Z is a phenyl group;
$A_1$, $A_2$(s) and $A_3$(s) are each a hydrogen atom, or $A_1$ and $A_3$ are bonded to each other or adjacent ones out of $A_2$s or adjacent ones out of $A_3$s are bonded to each other to become a linking group having 2 to 3 carbon atoms or a linking group of an aliphatic chain having 2 carbon atoms and an oxygen atom, thereby forming a single 5- to 6-membered ring (which may have a methyl group as a substituent) and the remaining $A_1$, $A_2$(s) and $A_3$(s) are each a hydrogen atom, or $A_2$ and the next $A_3$ but the adjacent $A_3$ are bonded to each other to become a linking group consisting of one heteroatom selected from a group consisting of sulfur, nitrogen and oxygen atoms, thereby forming a 5-membered ring, and the number of the rings is one to three, and the remaining $A_1$, $A_2$(s) and $A_3$(s) are each a hydrogen atom; and the benzene ring a does not have any other substituent than X and nitrogen atom described in the formula (1).

16. The photoelectric conversion device according to claim 15, wherein n is from 0 to 4;
$R_1$ is an alkyl group having 6 to 18 carbon atoms, a phenyl group having a hydrocarbon residue having 1 to 8 carbon atoms as a substituent, carbazole-2-yl (being bonded to the nitrogen atom at the 2-position) having a hydrocarbon residue having 1 to 8 carbon atoms as a substituent on its nitrogen atom, fluorene-2-yl which may have a 9,9-dimethyl substituent; and
$A_1$, $A_2$(s) and $A_3$(s) are each a hydrogen atom, or $A_2$ and the next $A_3$ but the adjacent $A_3$ are bonded to each other to become a linking group comprising a sulfur atom, thereby forming a single thiophene ring, and the remaining $A_1$, $A_2$(s) and $A_3$(s) are each a hydrogen atom.

17. The photoelectric conversion device according to claim 15, wherein n is from 0 to 2;
$R_1$ is an alkyl group having 6 to 18 carbon atoms, a phenyl group having an alkyl group having 1 to 8 carbon atoms as a substituent, fluorene-2-yl (being bonded to the nitrogen atom at the 2-position) which may have a 9,9-dimethyl substituent; X is —$CH_2CH_2$— or —$(CH_2)_3$—; and
$A_1$, $A_2$(s) and $A_3$(s) are each a hydrogen atom, or $A_2$ and the next $A_3$ but the adjacent $A_3$ are bonded to each other to become a linking group comprising a sulfur atom, thereby forming a single thiophene ring, and the remaining $A_1$, $A_2$(s) and $A_3$(s) are each a hydrogen atom.

18. The photoelectric conversion device according to claim 1, wherein the benzene ring a does not have any substituents other than X and the nitrogen atom shown in the formula (1).

19. The photoelectric conversion device according to claim 15, wherein in the formula (1), $R_1$ is an aliphatic hydrocarbon residue having 5 to 36 carbon atoms, a phenyl group having, as a substituent, a hydrocarbon residue having 1 to 36 carbon atoms, or an aromatic hydrocarbon residue of 9 to 14 carbon atoms, comprising two or three 5-membered or 6-membered rings comprising a benzene ring, the residue may contain one nitrogen atom, and may be substituted with an alkyl group having 1 to 8 carbon atoms as a substituent.

* * * * *